(12) United States Patent
Pickard

(10) Patent No.: US 10,253,948 B1
(45) Date of Patent: Apr. 9, 2019

(54) LIGHTING SYSTEMS HAVING MULTIPLE EDGE-LIT LIGHTGUIDE PANELS

(71) Applicant: EcoSense Lighting Inc., Los Angeles, CA (US)

(72) Inventor: Paul Pickard, Acton, CA (US)

(73) Assignee: ECOSENSE LIGHTING, INC., Los Angeles, CA (US)

( * ) Notice: Subject to any disclaimer, the term of this patent is extended or adjusted under 35 U.S.C. 154(b) by 0 days.

(21) Appl. No.: 15/937,843

(22) Filed: Mar. 27, 2018

Related U.S. Application Data

(60) Provisional application No. 62/477,408, filed on Mar. 27, 2017.

(51) Int. Cl.
*F21V 8/00* (2006.01)
*F21V 7/00* (2006.01)

(52) U.S. Cl.
CPC ............ *F21V 7/0091* (2013.01); *G02B 6/003* (2013.01); *G02B 6/0031* (2013.01)

(58) Field of Classification Search
None
See application file for complete search history.

(56) References Cited

U.S. PATENT DOCUMENTS

| | | |
|---|---|---|
| 4,001,571 A | 1/1977 | Martin |
| 4,698,734 A | 10/1987 | Ngai |
| 5,032,960 A | 7/1991 | Katoh |
| 5,521,801 A | 5/1996 | Pesau |
| 5,577,492 A | 11/1996 | Parkyn |
| 5,676,453 A | 10/1997 | Parkyn, Jr. |
| 5,806,955 A | 9/1998 | Parkyn, Jr. |
| D483,510 S | 12/2003 | Fritze |
| 7,422,347 B2 | 9/2008 | Miyairi |
| 7,431,481 B2 | 10/2008 | Stefanov |
| 7,494,259 B2 | 2/2009 | Hayashi |
| 7,690,810 B2 | 4/2010 | Saitoh |

(Continued)

FOREIGN PATENT DOCUMENTS

| | | |
|---|---|---|
| WO | 2015089517 A1 | 6/2015 |
| WO | 2016003551 A1 | 7/2016 |

OTHER PUBLICATIONS

"Customized Optics Product Information—Edgelit technology," Karl Jungbecker GmbH, downloaded on Feb. 3, 2017 from www.jungbecker.de, 2pp.

(Continued)

*Primary Examiner* — Elmito Breval
(74) *Attorney, Agent, or Firm* — Jay M. Brown

(57) ABSTRACT

Lighting system including: two edge-lit lightguide panels; three visible-light sources; and total internal reflection lens or bowl reflector. Each edge-lit lightguide panel is extended along longitudinal axis, has pair of mutually-opposing panel surfaces, and has peripheral edge extended along and spaced transversely away from longitudinal axis. Panel surfaces include first and second light output interfaces. Two visible-light sources located along panel peripheral edges for directing light into panels. Lens or reflector has reflective side surface and central axis transverse to longitudinal axis for directing light to third light output interface located between the others. Output interfaces cooperatively define emission aperture forming shielding zone for redirecting combined light emissions.

111 Claims, 16 Drawing Sheets

(56) References Cited

U.S. PATENT DOCUMENTS

| | | | |
|---|---|---|---|
| 7,717,598 B2 | 5/2010 | Kakizaki | |
| 7,731,395 B2 | 6/2010 | Parkyn | |
| 7,766,508 B2 | 8/2010 | Villard | |
| 7,857,482 B2 | 12/2010 | Reo | |
| 7,918,589 B2 | 4/2011 | Mayfield, III | |
| 7,967,477 B2 | 6/2011 | Bloemen | |
| 8,100,551 B2 | 1/2012 | Mayfield, III | |
| 8,109,647 B2 | 2/2012 | Soo | |
| 8,246,219 B2 | 8/2012 | Teng | |
| 8,328,403 B1 | 12/2012 | Morgan | |
| 8,388,180 B2 | 3/2013 | Chang | |
| 8,403,522 B2 | 3/2013 | Chang | |
| 8,408,739 B2 | 4/2013 | Villard | |
| 8,408,775 B1 | 4/2013 | Coleman | |
| 8,540,394 B2 | 9/2013 | Veerasamy | |
| 8,657,467 B2 | 2/2014 | Hsieh | |
| 8,657,479 B2 | 2/2014 | Morgan | |
| 8,690,382 B2 | 4/2014 | Farmer | |
| 8,702,265 B2 | 4/2014 | May | |
| 8,754,589 B2 | 6/2014 | Chemel | |
| 8,757,834 B2 | 6/2014 | Chang | |
| 8,757,835 B2 | 6/2014 | Chang | |
| 8,764,220 B2 | 7/2014 | Chan | |
| 8,764,226 B2 | 7/2014 | Roberts | |
| 8,764,237 B2 | 7/2014 | Wang | |
| 8,789,966 B2 | 7/2014 | McCanless | |
| 8,805,550 B2 | 8/2014 | Chemel | |
| 8,823,277 B2 | 9/2014 | Chemel | |
| 8,827,487 B2 | 9/2014 | Farmer | |
| 8,841,859 B2 | 9/2014 | Chemel | |
| 8,866,408 B2 | 10/2014 | Chemel | |
| 8,882,298 B2 | 11/2014 | Gershaw | |
| 8,888,316 B2 | 11/2014 | Handsaker | |
| 8,954,170 B2 | 2/2015 | Chemel | |
| 8,956,010 B2 | 2/2015 | Huang | |
| 9,072,133 B2 | 6/2015 | Chemel | |
| 9,116,274 B2 | 8/2015 | Parker | |
| 9,125,254 B2 | 9/2015 | Chemel | |
| 9,459,396 B1 | 10/2016 | Householder | |
| 9,519,095 B2 | 12/2016 | Wilcox | |
| 9,645,303 B2 | 5/2017 | Tarsa | |
| 9,746,173 B2 | 8/2017 | Dau | |
| 10,161,610 B2 | 12/2018 | Quilici et al. | |
| 2005/0135115 A1* | 6/2005 | Lamb | G02B 6/0068 362/613 |
| 2005/0281023 A1 | 12/2005 | Gould | |
| 2005/0281024 A1 | 12/2005 | Mayfield, III | |
| 2006/0203494 A1 | 9/2006 | Ohkawa | |
| 2007/0041171 A1 | 2/2007 | Ohkawa | |
| 2007/0047229 A1 | 3/2007 | Lee | |
| 2007/0183148 A1 | 8/2007 | Mayfield, III | |
| 2007/0211457 A1 | 9/2007 | Mayfield, III | |
| 2007/0291481 A1 | 12/2007 | Gould | |
| 2008/0043490 A1 | 2/2008 | Coleman | |
| 2008/0285267 A1 | 11/2008 | Santoro | |
| 2009/0073683 A1 | 3/2009 | Chen | |
| 2009/0129084 A1 | 5/2009 | Tsao | |
| 2009/0244893 A1 | 10/2009 | Villard | |
| 2011/0013387 A1 | 1/2011 | Kanade | |
| 2011/0141721 A1 | 6/2011 | Kato | |
| 2011/0285314 A1 | 11/2011 | Carney | |
| 2012/0170258 A1 | 7/2012 | Vanduinen | |
| 2013/0003370 A1 | 1/2013 | Watanabe | |
| 2013/0208495 A1* | 8/2013 | Dau | F21V 7/0008 362/551 |
| 2014/0078728 A1 | 3/2014 | Rodgers | |
| 2014/0119015 A1 | 5/2014 | Morgan | |
| 2014/0168961 A1 | 6/2014 | Dubord | |
| 2014/0177209 A1 | 6/2014 | Carney | |
| 2014/0226322 A1 | 8/2014 | Chan | |
| 2014/0268728 A1 | 9/2014 | Hussell | |
| 2014/0268869 A1* | 9/2014 | Blessitt | G02B 6/0055 362/607 |
| 2015/0055371 A1 | 2/2015 | Van De Ven | |
| 2015/0247633 A1* | 9/2015 | Dau | F21S 8/033 362/608 |
| 2016/0195225 A1 | 7/2016 | Carney | |
| 2016/0363769 A1* | 12/2016 | Masuda | G02B 27/02 |
| 2018/0113244 A1 | 4/2018 | Vasylyev | |

OTHER PUBLICATIONS

"Fusion Optix MicroTEK tm Platform," Fusion Optix, dated 2016, downloaded on Feb. 3, 2017 from www.fusionoptix.com, 4pp.

"GLT Technology," GLT, downloaded on Feb. 3, 2017 from www.glthome.com, 6pp.

"Lucent Optics—Planar Optical Light Guides for Light Collection and Collimation," Lucent Optics, Inc., downloaded on Feb. 3, 2017 from www.lucentoptics.com, 3pp.

"Sylvania—OSRAM OmniPoint Wins Two Innovation Awards at LIGHTFAIR International 2015," dated May 5, 2015, downloaded on Feb. 3, 2017 from www.sylvania.com, 3pp.

PCT International Patent Application No. PCT/US18/16662, filed on Feb. 2, 2018, titled "Lighting Systems Generating Partially-Collimated Light Emissions," 90pp.

"Choosing lenses for Power LED based luminaire," Intra-Lighting, downloaded on Mar. 19, 2018 from www.intra-lighting.com; 8pp.

"How to choose TIR lenses for high power LEDs," 612 Photonics, downloaded on Mar. 19, 2018 from www.612photonics.com; 7pp.

Alice Liao, "LEDs: Understanding Optical Performance," dated Oct. 13, 2014, downloaded on Mar. 19, 2018 from www.archlighting.com; 12pp.

Brett Shriver, "Current and future projection of edge-lit LED panel adoption in lighting," Global Lighting Technologies Inc., dated 2014, downloaded on Mar. 19, 2018 from www.glthome.com, 4pp.

"Mellow Light—Recessed and surface-mounted luminaire," dated Jan. 2017; Zumtobel Lighting Inc.; downloaded on May 17, 2017 from www.zumtobel.us; 5pp.

\* cited by examiner

LIGHTING SYSTEMS HAVING MULTIPLE EDGE-LIT LIGHTGUIDE PANELS

CROSS-REFERENCE TO RELATED APPLICATIONS

This application claims the benefit of commonly-owned U.S. provisional patent application Ser. No. 62/477,408 filed on Mar. 27, 2017, the entirety of which hereby is incorporated herein by reference.

BACKGROUND OF THE INVENTION

1. Field of the Invention

The present invention relates to the field of lighting systems that include semiconductor light-emitting devices, and processes related to such lighting systems.

2. Background of the Invention

Numerous lighting systems that include semiconductor light-emitting devices have been developed. As examples, some of such lighting systems may control the propagation of light emitted by the semiconductor light-emitting devices. Despite the existence of these lighting systems, further improvements are still needed in lighting systems that include semiconductor light-emitting devices and that control the propagation of some of the emitted light, and in processes related to such lighting systems.

SUMMARY

In an example of an implementation, a lighting system is provided that includes: an edge-lit lightguide panel; a visible-light source; another edge-lit lightguide panel; another visible-light source; a total internal reflection lens; and a further visible-light source. In the example, the edge-lit lightguide panel is extended along a longitudinal axis of the lighting system. Further in the example of the lighting system, the edge-lit lightguide panel has a pair of mutually-opposing panel surfaces, and has a peripheral edge being extended along and spaced transversely away from the longitudinal axis. In the example of the lighting system, a one of the pair of panel surfaces includes a first light output interface. The visible-light source in the example of the lighting system includes a plurality of semiconductor light-emitting devices. Further in the example of the lighting system, the visible-light source is configured for generating visible-light emissions from the plurality of semiconductor light-emitting devices; and is located along the peripheral edge for directing the visible-light emissions into the edge-lit lightguide panel. In the example of the lighting system, the another edge-lit lightguide panel is extended along the longitudinal axis. Further in the example of the lighting system, the another edge-lit lightguide panel has another pair of mutually-opposing panel surfaces, and has another peripheral edge being extended along and spaced transversely away from the longitudinal axis. In the example of the lighting system, a one of the another pair of panel surfaces includes a second light output interface. In the example of the lighting system, the another visible-light source includes another plurality of semiconductor light-emitting devices. Further in the example of the lighting system, the another visible-light source is configured for generating additional visible-light emissions from the another plurality of semiconductor light-emitting devices, and is located along the another peripheral edge for directing the additional visible-light emissions into the another edge-lit lightguide panel. In the example of the lighting system, the total internal reflection lens has a central light-emission axis being transverse to the longitudinal axis. Further in the example of the lighting system, the total internal reflection lens includes a third light output interface being located between the first and second light output interfaces. In the example of the lighting system, the third light output interface is spaced apart from a central light input interface by a total internal reflection side surface. Further in the example of the lighting system, the total internal reflection side surface is extended along the central light-emission axis. In the example of the lighting system, the total internal reflection lens has a further visible-light source including a further plurality of semiconductor light-emitting devices. The further visible-light source in the example of the lighting system is configured for generating further visible-light emissions from the further plurality of semiconductor light-emitting devices; and is located at the central light input interface for directing the further visible-light emissions through the total internal reflection lens to the third light output interface. In the example of the lighting system, the first, second and third light output interfaces cooperatively define an emission aperture for forming combined visible-light emissions including the visible-light emissions, the additional visible-light emissions, and the further visible-light emissions; and the emission aperture forms a shielding zone for redirecting some of the combined visible-light emissions.

In another example of an implementation, a lighting system is provided that includes: an edge-lit lightguide panel; a visible-light source; another edge-lit lightguide panel; another visible-light source; a bowl reflector; and a further visible-light source. In the example, the edge-lit lightguide panel is extended along a longitudinal axis of the lighting system. Further in the example of the lighting system, the edge-lit lightguide panel has a pair of mutually-opposing panel surfaces, and has a peripheral edge being extended along and spaced transversely away from the longitudinal axis. In the example of the lighting system, a one of the pair of panel surfaces includes a first light output interface. The visible-light source in the example of the lighting system includes a plurality of semiconductor light-emitting devices. Further in the example of the lighting system, the visible-light source is configured for generating visible-light emissions from the plurality of semiconductor light-emitting devices; and is located along the peripheral edge for directing the visible-light emissions into the edge-lit lightguide panel. In the example of the lighting system, the another edge-lit lightguide panel is extended along the longitudinal axis. Further in the example of the lighting system, the another edge-lit lightguide panel has another pair of mutually-opposing panel surfaces, and has another peripheral edge being extended along and spaced transversely away from the longitudinal axis. In the example of the lighting system, a one of the another pair of panel surfaces includes a second light output interface. In the example of the lighting system, the another visible-light source includes another plurality of semiconductor light-emitting devices. Further in the example of the lighting system, the another visible-light source is configured for generating additional visible-light emissions from the another plurality of semiconductor light-emitting devices, and is located along the another peripheral edge for directing the additional visible-light emissions into the another edge-lit lightguide panel. In the example of the lighting system, the bowl reflector has a central light-emission axis being transverse to the longitudinal axis. Further in the example of the lighting system, the bowl reflector includes a third light output interface being located between the first and second light output interfaces. In the example of the lighting system, the third light output interface is spaced apart from a central light input interface by a visible-light-reflective side surface. Further in the example of the lighting system, the visible-light-reflective side surface is extended along the central light-emission axis and defines a portion of a cavity. In the example of the lighting system, the bowl reflector has a further visible-light source including a further plurality of semiconductor light-emitting devices. The further visible-light source in the example of the lighting system is configured for generating further visible-light emissions from the further plurality of semiconductor light-emitting devices; and is located at the central light input interface for directing the further visible-light emissions through the cavity to the third light output interface. In the example of the lighting system, the first, second and third light output interfaces cooperatively define an emission aperture for forming combined visible-light emissions including the visible-light emissions, the additional visible-light emissions, and the further visible-light emissions; and the emission aperture forms a shielding zone for redirecting some of the combined visible-light emissions.

Other systems, processes, features and advantages of the invention will be or will become apparent to one with skill in the art upon examination of the following figures and detailed description. It is intended that all such additional systems, processes, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
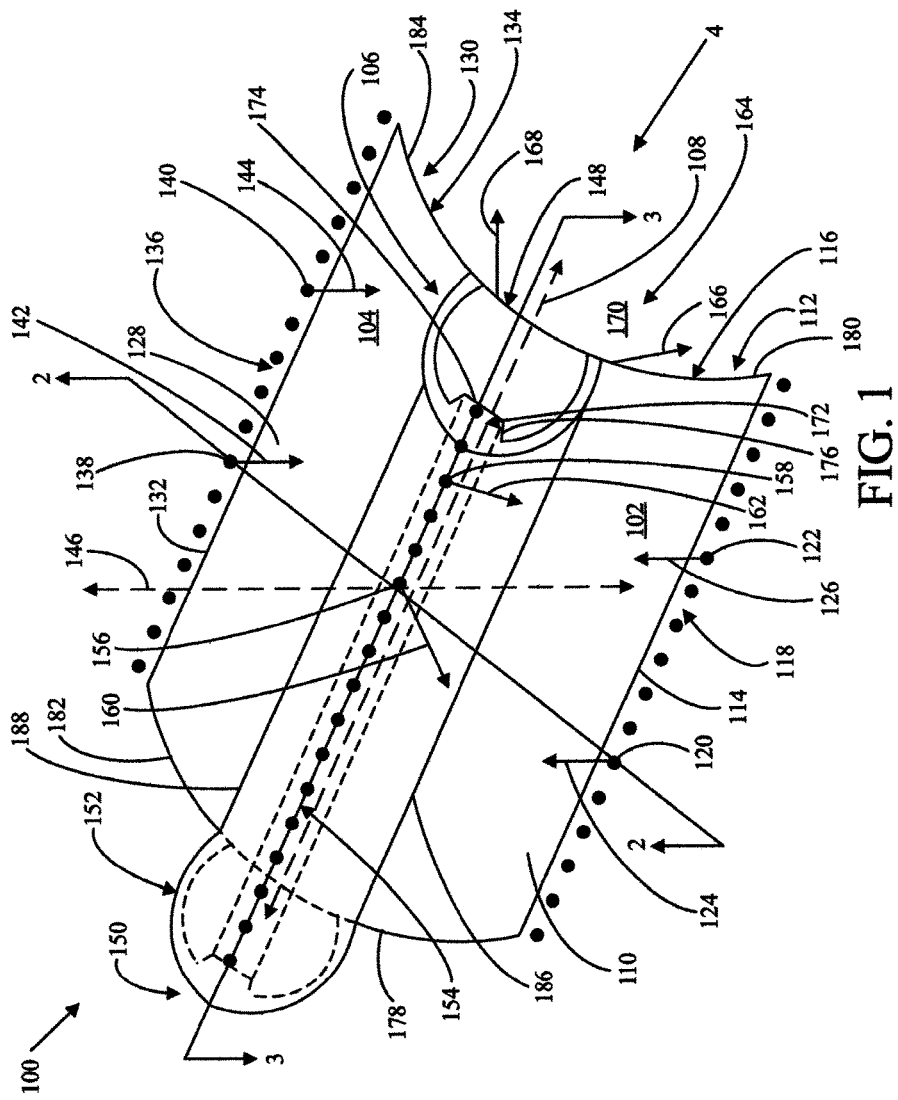
FIG. 1 is a schematic top perspective view showing an example [100] of an implementation of a lighting system.

Various lighting systems and processes that utilize semiconductor light-emitting devices have been designed. Many such lighting systems and processes exist that are capable of emitting light for illumination of a defined area, such as a room or hallway. However, existing lighting systems and processes often have demonstrably failed to effectively provide appropriate illumination for defined areas, or to take into account the purpose for the illumination, or to be adaptable for a wide variety of area types and purposes, or to provide light emissions having an appropriate and controllable perceived brightness and color(s) and propagating with a controllable beam angle range and a controllable field angle range; and often have generated light emissions being perceived as having aesthetically-unpleasing glare.

Lighting systems accordingly are provided herein, that include an edge-lit lightguide panel; a visible-light source; another edge-lit lightguide panel; another visible-light source; a total internal reflection lens or a bowl reflector; and a further visible-light source. The edge-lit lightguide panel is extended along a longitudinal axis of the lighting system. Further, the edge-lit lightguide panel has a pair of mutually-opposing panel surfaces, and has a peripheral edge being extended along and spaced transversely away from the longitudinal axis. A one of the pair of panel surfaces includes a first light output interface. The visible-light source includes a plurality of semiconductor light-emitting devices. Further, the visible-light source is configured for generating visible-light emissions from the plurality of semiconductor light-emitting devices; and is located along the peripheral edge for directing the visible-light emissions into the edge-lit lightguide panel. The another edge-lit lightguide panel is also extended along the longitudinal axis. The another edge-lit lightguide panel has another pair of mutually-opposing panel surfaces, and has another peripheral edge being extended along and spaced transversely away from the longitudinal axis. A one of the another pair of panel surfaces includes a second light output interface. The another visible-light source includes another plurality of semiconductor light-emitting devices. Further, the another visible-light source is configured for generating additional visible-light emissions from the another plurality of semiconductor light-emitting devices, and is located along the another peripheral edge for directing the additional visible-light emissions into the another edge-lit lightguide panel. The total internal reflection lens or bowl reflector has a central light-emission axis being transverse to the longitudinal axis; and includes a third light output interface being located between the first and second light output interfaces. The third light output interface is spaced apart from a central light input interface by a total internal reflection side surface of the lens or a visible-light-reflective side surface of the bowl reflector, being extended along the central light-emission axis. The total internal reflection lens or bowl reflector has a further visible-light source including a further plurality of semiconductor light-emitting devices. The further visible-light source is configured for generating further visible-light emissions from the further plurality of semiconductor light-emitting devices. The further visible-light source is located at the central light input interface for directing the further visible-light emissions through the total internal reflection lens or bowl reflector to the third light output interface. The first, second and third light output interfaces cooperatively define an emission aperture for forming combined visible-light emissions including the visible-light emissions, the additional visible-light emissions, and the further visible-light emissions; and the emission aperture forms a shielding zone for redirecting some of the combined visible-light emissions.

The following definitions of terms, being stated as applying "throughout this specification", are hereby deemed to be incorporated throughout this specification, including but not limited to the Summary, Brief Description of the Figures, Detailed Description, and Claims.

Throughout this specification, the term "semiconductor" means: a substance, examples including a solid chemical element or compound, that can conduct electricity under some conditions but not others, making the substance a good medium for the control of electrical current.

Throughout this specification, the term "semiconductor light-emitting device" (also being abbreviated as "SLED") means: a light-emitting diode; an organic light-emitting diode; a laser diode; or any other light-emitting device having one or more layers containing inorganic and/or organic semiconductor(s). Throughout this specification, the term "light-emitting diode" (herein also referred to as an "LED") means: a two-lead semiconductor light source having an active pn-junction. As examples, an LED may include a series of semiconductor layers that may be epitaxially grown on a substrate such as, for example, a substrate that includes sapphire, silicon, silicon carbide, gallium nitride or gallium arsenide. Further, for example, one or more semiconductor p-n junctions may be formed in these epitaxial layers. When a sufficient voltage is applied across the p-n junction, for example, electrons in the n-type semiconductor layers and holes in the p-type semiconductor layers may flow toward the p-n junction. As the electrons and holes flow toward each other, some of the electrons may recombine with corresponding holes, and emit photons. The energy release is called electroluminescence, and the color of the light, which corresponds to the energy of the photons, is determined by the energy band gap of the semiconductor. As examples, a spectral power distribution of the light generated by an LED may generally depend on the particular semiconductor materials used and on the structure of the thin epitaxial layers that make up the "active region" of the device, being the area where the light is generated. As examples, an LED may have a light-emissive electroluminescent layer including an inorganic semiconductor, such as a Group III-V semiconductor, examples including: gallium nitride; silicon; silicon carbide; and zinc oxide. Throughout this specification, the term "organic light-emitting diode" (herein also referred to as an "OLED") means: an LED having a light-emissive electroluminescent layer including an organic semiconductor, such as small organic molecules or an organic polymer. It is understood throughout this specification that a semiconductor light-emitting device may include: a non-semiconductor-substrate or a semiconductor-substrate; and may include one or more electrically-conductive contact layers. Further, it is understood throughout this specification that an LED may include a substrate formed of materials such as, for example: silicon carbide; sapphire; gallium nitride; or silicon. It is additionally understood throughout this specification that a semiconductor light-emitting device may have a cathode contact on one side and an anode contact on an opposite side, or may alternatively have both contacts on the same side of the device.

Further background information regarding semiconductor light-emitting devices is provided in the following documents, the entireties of all of which hereby are incorporated by reference herein: U.S. Pat. Nos. 7,564,180; 7,456,499; 7,213,940; 7,095,056; 6,958,497; 6,853,010; 6,791,119; 6,600,175; 6,201,262; 6,187,606; 6,120,600; 5,912,477; 5,739,554; 5,631,190; 5,604,135; 5,523,589; 5,416,342; 5,393,993; 5,359,345; 5,338,944; 5,210,051; 5,027,168; 5,027,168; 4,966,862; and 4,918,497; and U.S. Patent Application Publication Nos. 2014/0225511; 2014/0078715; 2013/0241392; 2009/0184616; 2009/0080185; 2009/0050908; 2009/0050907; 2008/0308825; 2008/0198112; 2008/0179611; 2008/0173884; 2008/0121921; 2008/0012036; 2007/0253209; 2007/0223219; 2007/0170447; 2007/0158668; 2007/0139923; and 2006/0221272.

Throughout this specification, the term "spectral power distribution" means: the emission spectrum of the one or more wavelengths of light emitted by a semiconductor light-emitting device. Throughout this specification, the term "peak wavelength" means: the wavelength where the spectral power distribution of a semiconductor light-emitting device reaches its maximum value as detected by a photo-detector. As an example, an LED may be a source of nearly monochromatic light and may appear to emit light having a single color. Thus, the spectral power distribution of the light emitted by such an LED may be centered about its peak wavelength. As examples, the "width" of the spectral power distribution of an LED may be within a range of between about 10 nanometers and about 30 nanometers, where the width is measured at half the maximum illumination on each side of the emission spectrum.

Throughout this specification, both of the terms "beam width" and "full-width-half-maximum" ("FWHM") mean: the measured angle, being collectively defined by two mutually-opposed angular directions away from a center emission direction of a visible-light beam, at which an intensity of the visible-light emissions is half of a maximum intensity measured at the center emission direction. Throughout this specification, in the case of a visible-light beam having a non-circular shape, e.g. a visible-light beam having an elliptical shape, then the terms "beam width" and "full-width-half-maximum" ("FWHM") mean: the measured maximum and minimum angles, being respectively defined in two mutually-orthogonal pairs of mutually-opposed angular directions away from a center emission direction of a visible-light beam, at which a respective intensity of the visible-light emissions is half of a corresponding maximum intensity measured at the center emission direction. Throughout this specification, the term "field angle" means: the measured angle, being collectively defined by two opposing angular directions away from a center emission direction of a visible-light beam, at which an intensity of the visible-light emissions is one-tenth of a maximum intensity measured at the center emission direction. Throughout this specification, in the case of a visible-light beam having a non-circular shape, e.g. a visible-light beam having an elliptical shape, then the term "field angle" means: the measured maximum and minimum angles, being respectively defined in two mutually-orthogonal pairs of mutually-opposed angular directions away from a center emission direction of a visible-light beam, at which a respective intensity of the visible-light emissions is one-tenth of a corresponding maximum intensity measured at the center emission direction.

Throughout this specification, the term "dominant wavelength" means: the wavelength of monochromatic light that has the same apparent color as the light emitted by a semiconductor light-emitting device, as perceived by the human eye. As an example, since the human eye perceives yellow and green light better than red and blue light, and because the light emitted by a semiconductor light-emitting device may extend across a range of wavelengths, the color perceived (i.e., the dominant wavelength) may differ from the peak wavelength.

Throughout this specification, the term "luminous flux", also referred to as "luminous power", means: the measure in lumens of the perceived power of light, being adjusted to reflect the varying sensitivity of the human eye to different wavelengths of light. Throughout this specification, the term "radiant flux" means: the measure of the total power of electromagnetic radiation without being so adjusted. Throughout this specification, the term "central light-emission axis" means a direction along which the light emissions of a semiconductor light-emitting device have a greatest radiant flux. It is understood throughout this specification that light emissions "along a central light-emission axis" means light emissions that: include light emissions in the direction of the central light-emission axis; and may further include light emissions in a plurality of other generally similar directions.

It is understood throughout this specification that light emissions "along the longitudinal axis" means light emissions that: include light emissions in the directions of the longitudinal axis; and may further include light emissions in a plurality of other generally similar directions. It is understood throughout this specification that light emissions "in directions transverse to the longitudinal axis" means light emissions that: include light emissions in the directions being orthogonal to the longitudinal axis; and may further include light emissions in a plurality of other generally similar directions. It is understood throughout this specification that light emissions "in directions spaced apart from directions along the longitudinal axis" means light emissions in directions being similar to and spaced apart from the directions along the longitudinal axis. It is understood throughout this specification that light emissions "in directions spaced apart from directions transverse to the longitudinal axis" means light emissions in directions being similar to and spaced apart from the directions being transverse to the longitudinal axis.

Throughout this specification, the term "color bin" means: the designated empirical spectral power distribution and related characteristics of a particular semiconductor light-emitting device. For example, individual light-emitting diodes (LEDs) are typically tested and assigned to a designated color bin (i.e., "binned") based on a variety of characteristics derived from their spectral power distribution. As an example, a particular LED may be binned based on the value of its peak wavelength, being a common metric to characterize the color aspect of the spectral power distribution of LEDs. Examples of other metrics that may be utilized to bin LEDs include: dominant wavelength; and color point.

Throughout this specification, the term "luminescent" means: characterized by absorption of electromagnetic radiation (e.g., visible-light, UV light or infrared light) causing the emission of light by, as examples: fluorescence; and phosphorescence.

Throughout this specification, the term "object" means a material article or device. Throughout this specification, the term "surface" means an exterior boundary of an object. Throughout this specification, the term "incident visible-light" means visible-light that propagates in one or more directions towards a surface. Throughout this specification, the term "any incident angle" means any one or more directions from which visible-light may propagate towards a surface. Throughout this specification, the term "reflective surface" means a surface of an object that causes incident visible-light, upon reaching the surface, to then propagate in one or more different directions away from the surface without passing through the object. Throughout this specification, the term "planar reflective surface" means a generally flat reflective surface.

Throughout this specification, the term "reflection value" means a percentage of a radiant flux of incident visible-light having a specified wavelength that is caused by a reflective surface of an object to propagate in one or more different directions away from the surface without passing through the object. Throughout this specification, the term "reflected light" means the incident visible-light that is caused by a reflective surface to propagate in one or more different directions away from the surface without passing through the object. Throughout this specification, the term "Lambertian reflection" means diffuse reflection of visible-light from a surface, in which the reflected light has uniform radiant flux in all of the propagation directions. Throughout this specification, the term "specular reflection" means mirror-like reflection of visible-light from a surface, in which light from a single incident direction is reflected into a single propagation direction. Throughout this specification, the term "spectrum of reflection values" means a spectrum of values of percentages of radiant flux of incident visible-light, the values corresponding to a spectrum of wavelength values of visible-light, that are caused by a reflective surface to propagate in one or more different directions away from the surface without passing through the object. Throughout this specification, the term "transmission value" means a percentage of a radiant flux of incident visible-light having a specified wavelength that is permitted by a reflective surface to pass through the object having the reflective surface. Throughout this specification, the term "transmitted light" means the incident visible-light that is permitted by a reflective surface to pass through the object having the reflective surface. Throughout this specification, the term "spectrum of transmission values" means a spectrum of values of percentages of radiant flux of incident visible-light, the values corresponding to a spectrum of wavelength values of visible-light, that are permitted by a reflective surface to pass through the object having the reflective surface. Throughout this specification, the term "absorption value" means a percentage of a radiant flux of incident visible-light having a specified wavelength that is permitted by a reflective surface to pass through the reflective surface and is absorbed by the object having the reflective surface. Throughout this specification, the term "spectrum of absorption values" means a spectrum of values of percentages of radiant flux of incident visible-light, the values corresponding to a spectrum of wavelength values of visible-light, that are permitted by a reflective surface to pass through the reflective surface and are absorbed by the object having the reflective surface. Throughout this specification, it is understood that a reflective surface, or an object, may have a spectrum of reflection values, and a spectrum of transmission values, and a spectrum of absorption values. The spectra of reflection values, absorption values, and transmission values of a reflective surface or of an object may be measured, for example, utilizing an ultraviolet-visible-near infrared (UV-VIS-NIR) spectrophotometer. Throughout this specification, the term "visible-light reflector" means an object having a reflective surface. In examples, a visible-light reflector may be selected as having a reflective surface characterized by light reflections that are more Lambertian than specular.

Throughout this specification, the term "lightguide" means a visible-light-transmissive body having a boundary being subject to the condition that visible-light rays traveling within the body to reach the boundary at an angle of incidence α that is larger than the critical angle will be reflected by the boundary and remain within the body. In a lightguide, visible-light rays will be subject to total internal reflection ("TIR") and so remain within the body if their angle of incidence α at the boundary satisfies the following condition derived from Snell's Law: $\alpha > \sin^{-1}(n_2/n_1)$ where $n_1$ is the refractive index of the body of the lightguide and $n_2$ is the refractive index of a medium outside the lightguide. In an example, the medium outside a lightguide may be air, having a refractive index $n_z$ being about 1. As another example, the medium outside of a lightguide may be another material having a lower refractive index than that of the body of the lightguide.

Throughout this specification, the term "lumiphor" means: a medium that includes one or more luminescent materials being positioned to absorb light that is emitted at a first spectral power distribution by a semiconductor light-emitting device, and to re-emit light at a second spectral power distribution in the visible or ultra violet spectrum being different than the first spectral power distribution, regardless of the delay between absorption and re-emission. Lumiphors may be categorized as being down-converting, i.e., a material that converts photons to a lower energy level (longer wavelength); or up-converting, i.e., a material that converts photons to a higher energy level (shorter wavelength). As examples, a luminescent material may include: a phosphor; a quantum dot; a quantum wire; a quantum well; a photonic nanocrystal; a semiconducting nanoparticle; a scintillator; a lumiphoric ink; a lumiphoric organic dye; a day glow tape; a phosphorescent material; or a fluorescent material. Throughout this specification, the term "quantum material" means any luminescent material that includes: a quantum dot; a quantum wire; or a quantum well. Some quantum materials may absorb and emit light at spectral power distributions having narrow wavelength ranges, for example, wavelength ranges having spectral widths being within ranges of between about 25 nanometers and about 50 nanometers. In examples, two or more different quantum materials may be included in a lumiphor, such that each of the quantum materials may have a spectral power distribution for light emissions that may not overlap with a spectral power distribution for light absorption of any of the one or more other quantum materials. In these examples, cross-absorption of light emissions among the quantum materials of the lumiphor may be minimized. As examples, a lumiphor may include one or more layers or bodies that may contain one or more luminescent materials that each may be: (1) coated or sprayed directly onto an semiconductor light-emitting device; (2) coated or sprayed onto surfaces of a lens or other elements of packaging for an semiconductor light-emitting device; (3) dispersed in a matrix medium; or (4) included within a clear encapsulant (e.g., an epoxy-based or silicone-based curable resin or glass or ceramic) that may be positioned on or over an semiconductor light-emitting device. A lumiphor may include one or multiple types of luminescent materials. Other materials may also be included with a lumiphor such as, for example, fillers, diffusants, colorants, or other materials that may as examples improve the performance of or reduce the overall cost of the lumiphor. In examples where multiple types of luminescent materials may be included in a lumiphor, such materials may, as examples, be mixed together in a single layer or deposited sequentially in successive layers.

Throughout this specification, the term "volumetric lumiphor" means a lumiphor being distributed in an object having a shape including defined exterior surfaces. In some examples, a volumetric lumiphor may be formed by dispersing a lumiphor in a volume of a matrix medium having suitable spectra of visible-light transmission values and visible-light absorption values. As examples, such spectra may be affected by a thickness of the volume of the matrix medium, and by a concentration of the lumiphor being distributed in the volume of the matrix medium. In examples, the matrix medium may have a composition that includes polymers or oligomers of: a polycarbonate; a silicone; an acrylic; a glass; a polystyrene; or a polyester such as polyethylene terephthalate. Throughout this specification, the term "remotely-located lumiphor" means a lumiphor being spaced apart at a distance from and positioned to receive light that is emitted by a semiconductor light-emitting device.

Throughout this specification, the term "light-scattering particles" means small particles formed of a non-luminescent, non-wavelength-converting material. In some examples, a volumetric lumiphor may include light-scattering particles being dispersed in the volume of the matrix medium for causing some of the light emissions having the first spectral power distribution to be scattered within the volumetric lumiphor. As an example, causing some of the light emissions to be so scattered within the matrix medium may cause the luminescent materials in the volumetric lumiphor to absorb more of the light emissions having the first spectral power distribution. In examples, the light-scattering particles may include: rutile titanium dioxide; anatase titanium dioxide; barium sulfate; diamond; alumina; magnesium oxide; calcium titanate; barium titanate; strontium titanate; or barium strontium titanate. In examples, light-scattering particles may have particle sizes being within a range of about 0.01 micron (10 nanometers) and about 2.0 microns (2,000 nanometers).

In some examples, a visible-light reflector may be formed by dispersing light-scattering particles having a first index of refraction in a volume of a matrix medium having a second index of refraction being suitably different from the first index of refraction for causing the volume of the matrix medium with the dispersed light-scattering particles to have suitable spectra of reflection values, transmission values, and absorption values for functioning as a visible-light reflector. As examples, such spectra may be affected by a thickness of the volume of the matrix medium, and by a concentration of the light-scattering particles being distributed in the volume of the matrix medium, and by physical characteristics of the light-scattering particles such as the particle sizes and shapes, and smoothness or roughness of exterior surfaces of the particles. In an example, the smaller the difference between the first and second indices of refraction, the more light-scattering particles may need to be dispersed in the volume of the matrix medium to achieve a given amount of light-scattering. As examples, the matrix medium for forming a visible-light reflector may have a composition that includes polymers or oligomers of: a polycarbonate; a silicone; an acrylic; a glass; a polystyrene; or a polyester such as polyethylene terephthalate. In further examples, the light-scattering particles may include: rutile titanium dioxide; anatase titanium dioxide; barium sulfate; diamond; alumina; magnesium oxide; calcium titanate; barium titanate; strontium titanate; or barium strontium titanate. In other examples, a visible-light reflector may include a reflective polymeric or metallized surface formed on a visible-light-transmissive polymeric or metallic object such as, for example, a volume of a matrix medium. Additional examples of visible-light reflectors may include microcellular foamed polyethylene terephthalate sheets ("MCPET"). Suitable visible-light reflectors may be commercially available under the trade names White Optics® and MIRO® from WhiteOptics LLC, 243-G Quigley Blvd., New Castle, Del. 19720 USA. Suitable MCPET visible-light reflectors may be commercially available from the Furukawa Electric Co., Ltd., Foamed Products Division, Tokyo, Japan. Additional suitable visible-light reflectors may be commercially available from CVI Laser Optics, 200 Dorado Place SE, Albuquerque, N. Mex. 87123 USA.

In some examples, a converging or diverging lens may be formed as a volume of a matrix medium having a suitable shape for functioning as a lens. In further examples, forming a diverging lens may include dispersing light-scattering particles having a first index of refraction in a volume of a matrix medium having a second index of refraction being suitably different from the first index of refraction for causing the volume of the matrix medium with the dispersed light-scattering particles to have suitable light-scattering value for functioning as a diverging lens. As examples, the matrix medium for forming a lens may have a composition that includes polymers or oligomers of: a polycarbonate; a silicone; an acrylic; a glass; a polystyrene; or a polyester such as polyethylene terephthalate. In further examples, the light-scattering particles may include: rutile titanium dioxide; anatase titanium dioxide; barium sulfate; diamond; alumina; magnesium oxide; calcium titanate; barium titanate; strontium titanate; or barium strontium titanate.

In further examples, a volumetric lumiphor and a visible-light reflector may be integrally formed. As examples, a volumetric lumiphor and a visible-light reflector may be integrally formed in respective layers of a volume of a matrix medium, including a layer of the matrix medium having a dispersed lumiphor, and including another layer of the same or a different matrix medium having light-scattering particles being suitably dispersed for causing the another layer to have suitable spectra of reflection values, transmission values, and absorption values for functioning as the visible-light reflector. In other examples, an integrally-formed volumetric lumiphor and visible-light reflector may incorporate any of the further examples of variations discussed above as to separately-formed volumetric lumiphors and visible-light reflectors.

Throughout this specification, the term "phosphor" means: a material that exhibits luminescence when struck by photons. Examples of phosphors that may utilized include: $CaAlSiN_3$:Eu, $SrAlSiN_3$:Eu, $CaAlSiN_3$:Eu, $Ba_3Si_6O_{12}N_2$:Eu, $Ba_2SiO_4$:Eu, $Sr_2SiO_4$:Eu, $Ca_2SiO_4$:Eu, $Ca_3Sc_2Si_3O_{12}$:Ce, $Ca_3Mg_2Si_3O_{12}$:Ce, $CaSc_2O_4$:Ce, $CaSi_2O_2N_2$:Eu, $SrSi_2O_2N_2$:Eu, $BaSi_2O_2N_2$:Eu, $Ca_5(PO_4)_3Cl$:Eu, $Ba_5(PO_4)_3Cl$:Eu, $Cs_2CaP_2O_7$, $Cs_2SrP_2O_7$, $SrGa_2S_4$:Eu, $Lu_3Al_5O_{12}$:Ce, $Ca_8Mg(SiO_4)_4Cl_2$:Eu, $Sr_8Mg(SiO_4)_4Cl_2$:Eu, $La_3Si_6N_{11}$:Ce, $Y_3Al_5O_{12}$:Ce, $Y_3Ga_5O_{12}$:Ce, $Gd_3Al_5O_{12}$:Ce, $Gd_3Ga_5O_{12}$:Ce, $Tb_3Al_5O_{12}$:Ce, $Tb_3Ga_5O_{12}$:Ce, $Lu_3Ga_5O_{12}$:Ce, $(SrCa)AlSiN_3$:Eu, LuAG:Ce, $(Y,Gd)_2Al_5)_{12}$:Ce, CaS:Eu, SrS:Eu, $SrGa_2S_4$:$E_4$, $Ca_2(Sc,Mg)_2SiO_{12}$:Ce, $Ca_2Sc_2Si_2)_{12}$:C2, $Ca_2Sc_2O_4$:Ce, $Ba_2Si_6O_{12}N_2$:Eu, $(Sr,Ca)AlSiN_2$:Eu, and $CaAlSiN_2$:Eu.

Throughout this specification, the term "quantum dot" means: a nanocrystal made of semiconductor materials that are small enough to exhibit quantum mechanical properties, such that its excitons are confined in all three spatial dimensions.

Throughout this specification, the term "quantum wire" means: an electrically conducting wire in which quantum effects influence the transport properties.

Throughout this specification, the term "quantum well" means: a thin layer that can confine (quasi-)particles (typically electrons or holes) in the dimension perpendicular to the layer surface, whereas the movement in the other dimensions is not restricted.

Throughout this specification, the term "photonic nanocrystal" means: a periodic optical nanostructure that affects the motion of photons, for one, two, or three dimensions, in much the same way that ionic lattices affect electrons in solids.

Throughout this specification, the term "semiconducting nanoparticle" means: a particle having a dimension within a range of between about 1 nanometer and about 100 nanometers, being formed of a semiconductor.

Throughout this specification, the term "scintillator" means: a material that fluoresces when struck by photons.

Throughout this specification, the term "lumiphoric ink" means: a liquid composition containing a luminescent material. For example, a lumiphoric ink composition may contain semiconductor nanoparticles. Examples of lumiphoric ink compositions that may be utilized are disclosed in Cao et al., U.S. Patent Application Publication No. 20130221489 published on Aug. 29, 2013, the entirety of which hereby is incorporated herein by reference.

Throughout this specification, the term "lumiphoric organic dye" means an organic dye having luminescent up-converting or down-converting activity. As an example, some perylene-based dyes may be suitable.

Throughout this specification, the term "day glow tape" means: a tape material containing a luminescent material.

Throughout this specification, the term "CIE 1931 XY chromaticity diagram" means: the 1931 International Commission on Illumination two-dimensional chromaticity diagram, which defines the spectrum of perceived color points of visible-light by (x, y) pairs of chromaticity coordinates that fall within a generally U-shaped area that includes all of the hues perceived by the human eye. Each of the x and y axes of the CIE 1931 XY chromaticity diagram has a scale of between 0.0 and 0.8. The spectral colors are distributed around the perimeter boundary of the chromaticity diagram, the boundary encompassing all of the hues perceived by the human eye. The perimeter boundary itself represents maximum saturation for the spectral colors. The CIE 1931 XY chromaticity diagram is based on the three-dimensional CIE 1931 XYZ color space. The CIE 1931 XYZ color space utilizes three color matching functions to determine three corresponding tristimulus values which together express a given color point within the CIE 1931 XYZ three-dimensional color space. The CIE 1931 XY chromaticity diagram is a projection of the three-dimensional CIE 1931 XYZ color space onto a two-dimensional (x, y) space such that brightness is ignored. A technical description of the CIE 1931 XY chromaticity diagram is provided in, for example, the "Encyclopedia of Physical Science and Technology", vol. 7, pp. 230-231 (Robert A Meyers ed., 1987); the entirety of which hereby is incorporated herein by reference. Further background information regarding the CIE 1931 XY chromaticity diagram is provided in Harbers et al., U.S. Patent Application Publication No. 2012/0224177A1 published on Sep. 6, 2012, the entirety of which hereby is incorporated herein by reference.

Throughout this specification, the term "color point" means: an (x, y) pair of chromaticity coordinates falling within the CIE 1931 XY chromaticity diagram. Color points located at or near the perimeter boundary of the CIE 1931 XY chromaticity diagram are saturated colors composed of light having a single wavelength, or having a very small spectral power distribution. Color points away from the perimeter boundary within the interior of the CIE 1931 XY chromaticity diagram are unsaturated colors that are composed of a mixture of different wavelengths.

Throughout this specification, the term "combined light emissions" means: a plurality of different light emissions that are mixed together. Throughout this specification, the term "combined color point" means: the color point, as perceived by human eyesight, of combined light emissions. Throughout this specification, a "substantially constant" combined color points are: color points of combined light emissions that are perceived by human eyesight as being uniform, i.e., as being of the same color.

Throughout this specification, the term "Planckian—black-body locus" means the curve within the CIE 1931 XY chromaticity diagram that plots the chromaticity coordinates (i.e., color points) that obey Planck's equation: $E(\lambda)=A\lambda-5/(eB/T-1)$, where E is the emission intensity, X is the emission wavelength, T is the color temperature in degrees Kelvin of a black-body radiator, and A and B are constants. The Planckian—black-body locus corresponds to the locations of color points of light emitted by a black-body radiator that is heated to various temperatures. As a black-body radiator is gradually heated, it becomes an incandescent light emitter (being referred to throughout this specification as an "incandescent light emitter") and first emits reddish light, then yellowish light, and finally bluish light with increasing temperatures. This incandescent glowing occurs because the wavelength associated with the peak radiation of the black-body radiator becomes progressively shorter with gradually increasing temperatures, consistent with the Wien Displacement Law. The CIE 1931 XY chromaticity diagram further includes a series of lines each having a designated corresponding temperature listing in units of degrees Kelvin spaced apart along the Planckian—black-body locus and corresponding to the color points of the incandescent light emitted by a black-body radiator having the designated temperatures. Throughout this specification, such a temperature listing is referred to as a "correlated color temperature" (herein also referred to as the "CCT") of the corresponding color point. Correlated color temperatures are expressed herein in units of degrees Kelvin (K). Throughout this specification, each of the lines having a designated temperature listing is referred to as an "isotherm" of the corresponding correlated color temperature.

Throughout this specification, the term "chromaticity bin" means: a bounded region within the CIE 1931 XY chromaticity diagram. As an example, a chromaticity bin may be defined by a series of chromaticity (x,y) coordinates, being connected in series by lines that together form the bounded region. As another example, a chromaticity bin may be defined by several lines or other boundaries that together form the bounded region, such as: one or more isotherms of CCT's; and one or more portions of the perimeter boundary of the CIE 1931 chromaticity diagram.

Throughout this specification, the term "delta(uv)" means: the shortest distance of a given color point away from (i.e., above or below) the Planckian—black-body locus. In general, color points located at a delta(uv) of about equal to or less than 0.015 may be assigned a correlated color temperature (CCT).

Throughout this specification, the term "greenish-blue light" means: light having a perceived color point being within a range of between about 490 nanometers and about 482 nanometers (herein referred to as a "greenish-blue color point.").

Throughout this specification, the term "blue light" means: light having a perceived color point being within a range of between about 482 nanometers and about 470 nanometers (herein referred to as a "blue color point.").

Throughout this specification, the term "purplish-blue light" means: light having a perceived color point being within a range of between about 470 nanometers and about 380 nanometers (herein referred to as a "purplish-blue color point.").

Throughout this specification, the term "reddish-orange light" means: light having a perceived color point being within a range of between about 610 nanometers and about 620 nanometers (herein referred to as a "reddish-orange color point.").

Throughout this specification, the term "red light" means: light having a perceived color point being within a range of between about 620 nanometers and about 640 nanometers (herein referred to as a "red color point.").

Throughout this specification, the term "deep red light" means: light having a perceived color point being within a range of between about 640 nanometers and about 670 nanometers (herein referred to as a "deep red color point.").

Throughout this specification, the term "visible-light" means light having one or more wavelengths being within a range of between about 380 nanometers and about 670 nanometers; and "visible-light spectrum" means the range of wavelengths of between about 380 nanometers and about 670 nanometers.

Throughout this specification, the term "white light" means: light having a color point located at a delta(uv) of about equal to or less than 0.006 and having a CCT being within a range of between about 10000K and about 1800K (herein referred to as a "white color point."). Many different hues of light may be perceived as being "white." For example, some "white" light, such as light generated by a tungsten filament incandescent lighting device, may appear yellowish in color, while other "white" light, such as light generated by some fluorescent lighting devices, may appear more bluish in color. As examples, white light having a CCT of about 3000K may appear yellowish in color, while white light having a CCT of about equal to or greater than 8000K may appear more bluish in color and may be referred to as "cool" white light. Further, white light having a CCT of between about 2500K and about 4500K may appear reddish or yellowish in color and may be referred to as "warm" white light. "White light" includes light having a spectral power distribution of wavelengths including red, green and blue color points. In an example, a CCT of a lumiphor may be tuned by selecting one or more particular luminescent materials to be included in the lumiphor. For example, light emissions from a semiconductor light-emitting device that includes three separate emitters respectively having red, green and blue color points with an appropriate spectral power distribution may have a white color point. As another example, light perceived as being "white" may be produced by mixing light emissions from a semiconductor light-emitting device having a blue, greenish-blue or purplish-blue color point together with light emissions having a yellow color point being produced by passing some of the light emissions having the blue, greenish-blue or purplish-blue color point through a lumiphor to down-convert them into light emissions having the yellow color point. General background information on systems and processes for generating light perceived as being "white" is provided in "Class A Color Designation for Light Sources Used in General Illumination", Freyssinier and Rea, *J. Light & Vis. Env.*, Vol. 37, No. 2 & 3 (Nov. 7, 2013, Illuminating Engineering Institute of Japan), pp. 10-14; the entirety of which hereby is incorporated herein by reference.

Throughout this specification, the term "color rendition index" (herein also referred to as "CRT-Ra") means: the quantitative measure on a scale of 1-100 of the capability of a given light source to accurately reveal the colors of one or more objects having designated reference colors, in comparison with the capability of a black-body radiator to accurately reveal such colors. The CRT-Ra of a given light source is a modified average of the relative measurements of color renditions by that light source, as compared with color renditions by a reference black-body radiator, when illuminating objects having the designated reference color(s). The CRT is a relative measure of the shift in perceived surface color of an object when illuminated by a particular light source versus a reference black-body radiator. The CRI-Ra will equal 100 if the color coordinates of a set of test colors being illuminated by the given light source are the same as the color coordinates of the same set of test colors being irradiated by the black-body radiator. The CRT system is administered by the International Commission on Illumination (CIE). The CIE selected fifteen test color samples (respectively designated as $R_{1-15}$) to grade the color properties of a white light source. The first eight test color samples (respectively designated as $R_{1-8}$) are relatively low saturated colors and are evenly distributed over the complete range of hues. These eight samples are employed to calculate the general color rendering index Ra. The general color rendering index Ra is simply calculated as the average of the first eight color rendering index values, $R_{1-8}$. An additional seven samples (respectively designated as $R_{9-15}$) provide supplementary information about the color rendering properties of a light source; the first four of them focus on high saturation, and the last three of them are representative of well-known objects. A set of color rendering index values, $R_{1-15}$, can be calculated for a particular correlated color temperature (CCT) by comparing the spectral response of a light source against that of each test color sample, respectively. As another example, the CRI-Ra may consist of one test color, such as the designated red color of $R_9$.

As examples, sunlight generally has a CRI-Ra of about 100; incandescent light bulbs generally have a CRI-Ra of about 95; fluorescent lights generally have a CRI-Ra of about 70 to 85; and monochromatic light sources generally have a CRI-Ra of about zero. As an example, a light source for general illumination applications where accurate rendition of object colors may not be considered important may generally need to have a CRI-Ra value being within a range of between about 70 and about 80. Further, for example, a light source for general interior illumination applications may generally need to have a CRI-Ra value being at least about 80. As an additional example, a light source for general illumination applications where objects illuminated by the lighting device may be considered to need to appear to have natural coloring to the human eye may generally need to have a CRI-Ra value being at least about 85. Further, for example, a light source for general illumination applications where good rendition of perceived object colors may be considered important may generally need to have a CRI-Ra value being at least about 90.

Throughout this specification, the term "in contact with" means: that a first object, being "in contact with" a second object, is in either direct or indirect contact with the second object. Throughout this specification, the term "in indirect contact with" means: that the first object is not in direct contact with the second object, but instead that there are a plurality of objects (including the first and second objects), and each of the plurality of objects is in direct contact with at least one other of the plurality of objects (e.g., the first and second objects are in a stack and are separated by one or more intervening layers). Throughout this specification, the term "in direct contact with" means: that the first object, which is "in direct contact" with a second object, is touching the second object and there are no intervening objects between at least portions of both the first and second objects.

Throughout this specification, the term "spectrophotometer" means: an apparatus that can measure a light beam's intensity as a function of its wavelength and calculate its total luminous flux.

Throughout this specification, the term "integrating sphere-spectrophotometer" means: a spectrophotometer operationally connected with an integrating sphere. An integrating sphere (also known as an Ulbricht sphere) is an optical component having a hollow spherical cavity with its interior covered with a diffuse white reflective coating, with small holes for entrance and exit ports. Its relevant property is a uniform scattering or diffusing effect. Light rays incident on any point on the inner surface are, by multiple scattering reflections, distributed equally to all other points. The effects of the original direction of light are minimized. An integrating sphere may be thought of as a diffuser which preserves power but destroys spatial information. Another type of integrating sphere that can be utilized is referred to as a focusing or Coblentz sphere. A Coblentz sphere has a mirror-like (specular) inner surface rather than a diffuse inner surface. Light scattered by the interior of an integrating sphere is evenly distributed over all angles. The total power (radiant flux) of a light source can then be measured without inaccuracy caused by the directional characteristics of the source. Background information on integrating sphere-spectrophotometer apparatus is provided in Liu et al., U.S. Pat. No. 7,532,324 issued on May 12, 2009, the entirety of which hereby is incorporated herein by reference. It is understood throughout this specification that color points may be measured, for example, by utilizing a spectrophotometer, such as an integrating sphere-spectrophotometer. The spectra of reflection values, absorption values, and transmission values of a reflective surface or of an object may be measured, for example, utilizing an ultraviolet-visible-near infrared (UV-VIS-NIR) spectrophotometer.

Throughout this specification, the term "diffuse refraction" means refraction from an object's surface that scatters the visible-light emissions, casting multiple jittered light rays forming combined light emissions having a combined color point.

Throughout this specification, each of the words "include", "contain", and "have" is interpreted broadly as being open to the addition of further like elements as well as to the addition of unlike elements.

It is understood throughout this specification that numbering of the names of elements as being "first", "second"

etcetera, is solely for purposes of clarity in referring to such elements in connection with various examples of lighting systems.

Figure 2:
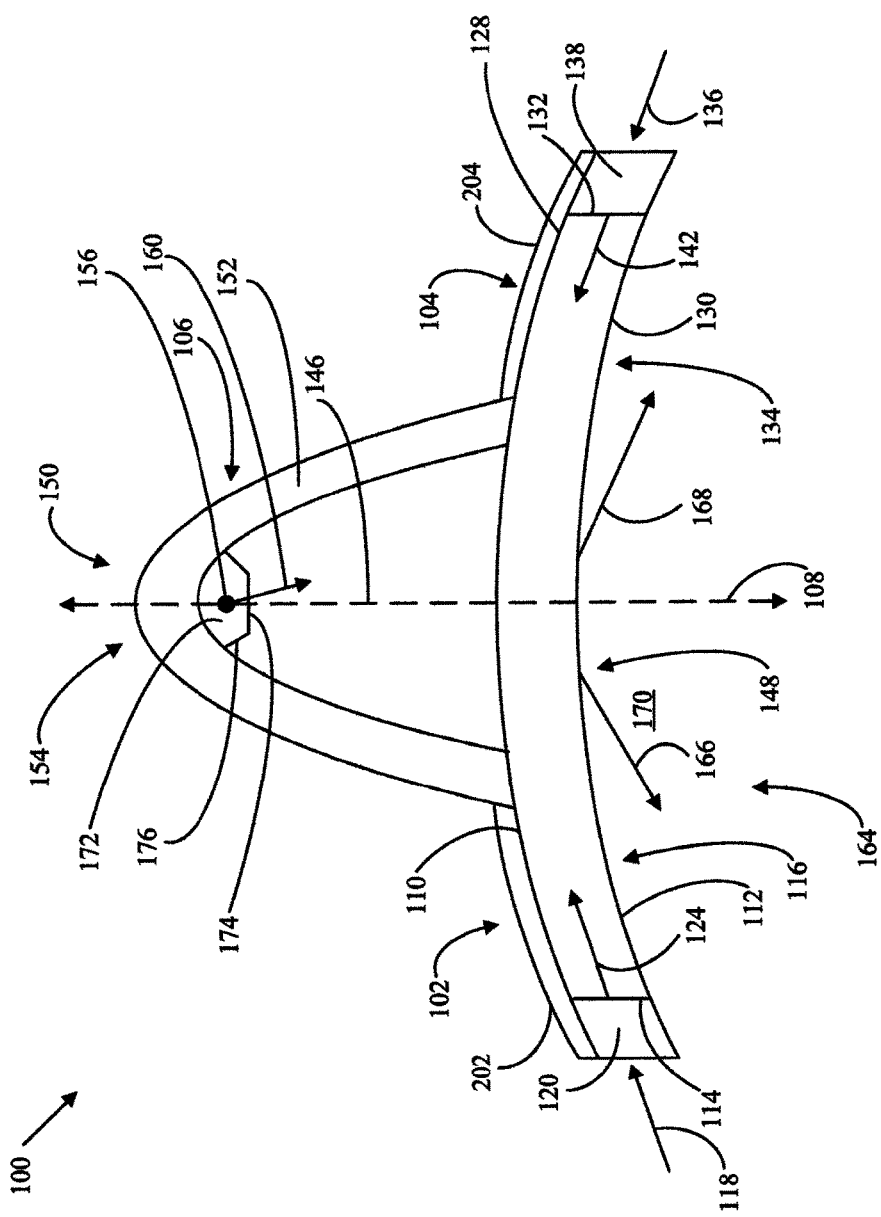
FIG. 2 is a schematic cross-sectional view taken along the line 2-2 showing the example of the lighting system.
Figure 3:
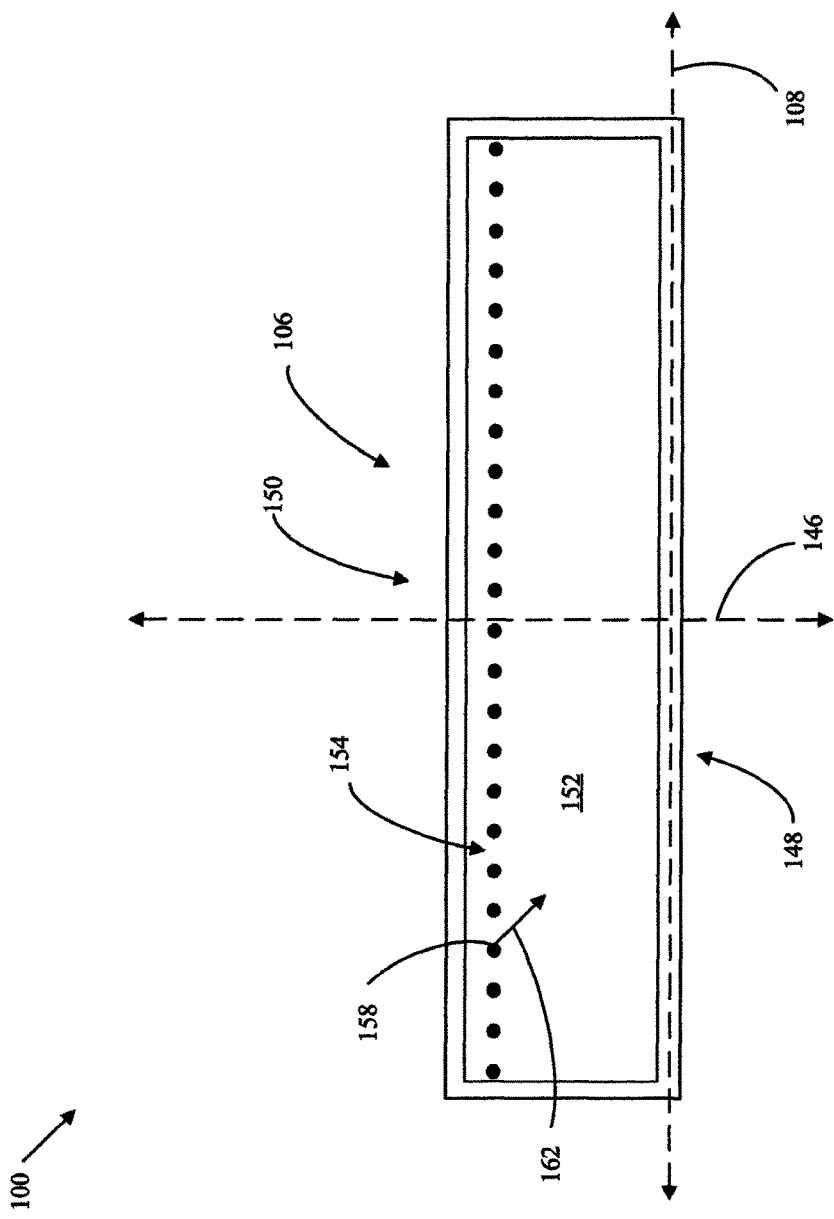
FIG. 3 is a schematic cross-sectional view taken along the line 3-3 showing the example of the lighting system.
Figure 4:
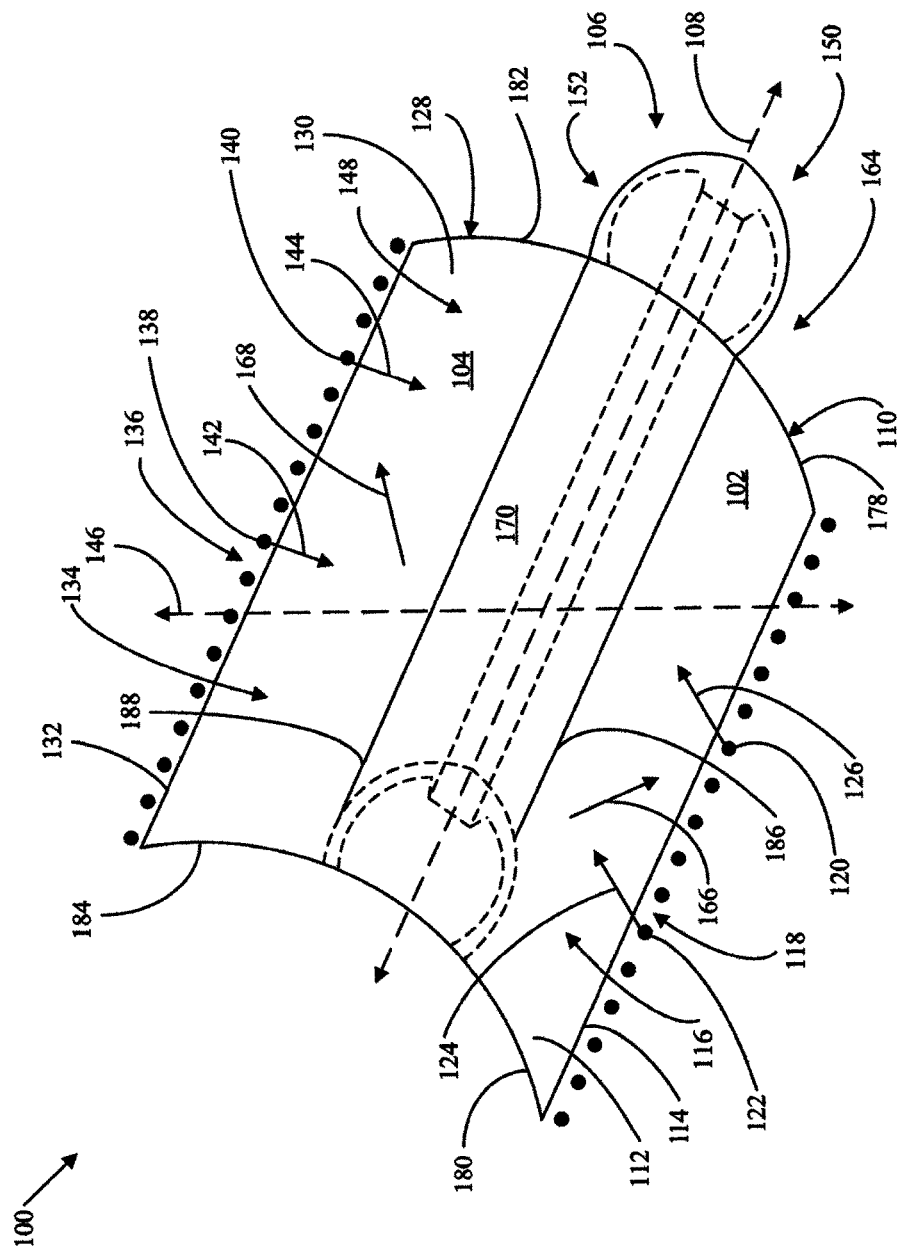
FIG. 4 is a schematic bottom perspective view taken along the line 4 showing the example of an implementation of a lighting system.

FIG. 1 is a schematic top perspective view showing an example [100] of an implementation of a lighting system. FIG. 2 is a schematic cross-sectional view taken along the line 2-2 showing the example [100] of the lighting system. FIG. 3 is a schematic cross-sectional view taken along the line 3-3 showing the example [100] of the lighting system. FIG. 4 is a schematic bottom perspective view taken along the line 4 showing the example [100] of an implementation of a lighting system. Another example [500] of an implementation of the lighting system will subsequently be discussed in connection with FIGS. 5-8. A further example [900] of an implementation of the lighting system will subsequently be discussed in connection with FIGS. 9-12. An additional example [1300] of an implementation of the lighting system will subsequently be discussed in connection with FIGS. 13-16. It is understood throughout this specification that the example [100] of an implementation of the lighting system may be modified as including any of the features or combinations of features that are disclosed in connection with: the another example [500] of an implementation of the lighting system; and the further example [900] of an implementation of the lighting system; and the additional example [1300] of an implementation of the lighting system. Accordingly, FIGS. 5-16 and the entireties of the subsequent discussions of the examples [500], [900], [1300] of implementations of the lighting system are hereby incorporated into the following discussion of the example [100] of an implementation of the lighting system.

As shown in FIGS. 1-4, the example [100] of the implementation of the lighting system includes: an edge-lit lightguide panel [102]; another edge-lit lightguide panel [104]; and a total internal reflection lens [106]. In the example [100], the edge-lit lightguide panel [102] is extended along a longitudinal axis [108] of the lighting system. The edge-lit lightguide panel [102] in the example [100] of the lighting system further has a pair of mutually-opposing panel surfaces [110], [112]. The edge-lit lightguide panel [102] in the example [100] of the lighting system also has a peripheral edge [114] being extended along and spaced transversely away from the longitudinal axis [108]. In the example [100] of the lighting system, a one [112] of the pair of panel surfaces includes a first light output interface [116].

The example [100] of the lighting system also includes a visible-light source [118] including a plurality of semiconductor light-emitting devices [120], [122]. In the example [100] of the lighting system, the visible-light source [118] is configured for generating visible-light emissions [124], [126] from the plurality of semiconductor light-emitting devices [120], [122]. Further in the example [100] of the lighting system, the visible-light source [118] is located along the peripheral edge [114] for directing the visible-light emissions [124], [126] into the edge-lit lightguide panel [102].

In the example [100] of the lighting system, the another edge-lit lightguide panel [104] is extended along the longitudinal axis [108]. Additionally in the example [100] of the lighting system, the another edge-lit lightguide panel [104] has another pair of mutually-opposing panel surfaces [128], [130]. In the example [100] of the lighting system, the another edge-lit lightguide panel [104] has another peripheral edge [132] being extended along and spaced transversely away from the longitudinal axis [108]. Further, a one [130] of the another pair of panel surfaces in the example [100] of the lighting system includes a second light output interface [134].

The example [100] of the lighting system additionally includes another visible-light source [136] including another plurality of semiconductor light-emitting devices [138], [140]. In the example [100] of the lighting system, the another visible-light source [136] is configured for generating additional visible-light emissions [142], [144] from the another plurality of semiconductor light-emitting devices [138], [140]. Further in the example [100] of the lighting system, the another visible-light source [136] is located along the another peripheral edge [132] for directing the additional visible-light emissions [142], [144] into the another edge-lit lightguide panel [104].

In the example [100] of the lighting system, the total internal reflection lens [106] has a central light-emission axis [146] being transverse to the longitudinal axis [108]. The total internal reflection lens [106] in the example [100] of the lighting system includes a third light output interface [148] being located between the first and second light output interfaces [116], [134]. In the example [100] of the lighting system, the third light output interface [148] is spaced apart from a central light input interface [150] by a total internal reflection side surface [152]. The total internal reflection side surface [152] in the example [100] of the lighting system is extended along the central light-emission axis [146]. In the example [100] of the lighting system, the total internal reflection lens [106] has a further visible-light source [154] including a further plurality of semiconductor light-emitting devices [156], [158]. The further visible-light source [154] in the example [100] of the lighting system is configured for generating further visible-light emissions [160], [162] from the further plurality of semiconductor light-emitting devices [156], [158]. In the example [100] of the lighting system, the further visible-light source [154] is located at the central light input interface [150] for directing the further visible-light emissions [160], [162] through the total internal reflection lens [106] to the third light output interface [148].

As examples, the edge-lit lightguide panel [102] may direct the visible-light emissions [124], [126] for emission from the first light output interface [116]; and the another edge-lit lightguide panel [104] may direct the additional visible-light emissions [142], [144] for emission from the second light output interface [134]; and the total internal reflection lens [106] may direct the further visible-light emissions [160], [162] for emission from the third light output interface [148].

In the example [100] of the lighting system, the first, second and third light output interfaces [116], [134], [148] cooperatively define an emission aperture [164] for forming combined visible-light emissions [166], [168] including the visible-light emissions [124], [126], the additional visible-light emissions [142], [144], and the further visible-light emissions [160], [162]. Further in the example [100] of the lighting system, the emission aperture [164] forms a shielding zone [170] for redirecting some of the combined visible-light emissions [166], [168].

In some examples [100] of the lighting system: the total internal reflection side surface [152] may be extended along the longitudinal axis [108] in addition to being extended along the central light-emission axis [146]; and the central light input interface [150] may be extended along the longitudinal axis [108]; and the further visible-light source [154] may be extended along the longitudinal axis [108]. Further in those examples [100] of the lighting system, the total internal reflection side surface [152] may have a frusto-conical cross-sectional profile in the direction of the line 2-2 being perpendicular to the longitudinal axis [108].

In some examples [100] of the lighting system, the central light input interface [150] of the total internal reflection lens [106] may include a lens cavity [172] formed by a lens face [174] being spaced apart along the central light-emission axis [146] from the further plurality of semiconductor light-emitting devices [156], [158] by a central side wall [176]. As examples [100] of the lighting system, portions of the further visible-light emissions [160], [162] entering into the total internal reflection lens [106] through the central side wall [176] may be refracted towards a normalized direction being orthogonal to a surface of the central side wall [176] and away from the central light-emission axis [146] because the refractive index of the total internal reflection lens [106] may be greater than the refractive index of an ambient atmosphere, e.g. air, filling the lens cavity [172]. Further in those examples [100] of the lighting system, the portions of the further visible-light emissions [160], [162] so entering into the total internal reflection lens [106] through the central side wall [176] may then undergo total internal reflection at the total internal reflection side surface [152], thereby being redirected toward the third light output interface [148].

In further examples [100] of the lighting system, the central light input interface [150] of the total internal reflection lens [106] may include a lens cavity [172] having a different shape (not shown). Further in those examples [100] of the lighting system, the total internal reflection lens [106] may include a lens cavity [172] having an otherwise angled or compound central side wall (not shown). In other examples [100] of the lighting system, the total internal reflection lens [106] may be a fresnel lens (not shown). Suitable fresnel lens structures that may be utilized as being the total internal reflection lens [106] are disclosed, for example, in Parkyn et al., U.S. Pat. No. 5,577,492 issued on Nov. 26, 1996, the entirety of which hereby is incorporated herein by reference.

In some examples [100] of the lighting system, the total internal reflection lens [106] may be a converging total internal reflection lens [106] being configured for causing convergence of the further visible-light emissions [160], [162] in their travel along the central light-emission axis [146] toward the third light output interface [148]. Further in those examples [100] of the lighting system, the total internal reflection lens [106] may be a converging total internal reflection lens [106] being configured for causing convergence of the further visible-light emissions [160], [162] along the central light-emission axis [146] as having a beam angle being within a range of between about thirty degrees (30°) and about ten degrees (10°).

In further examples [100] of the lighting system, the total internal reflection lens [106] may have a spectrum of transmission values of the further visible-light emissions [160], [162] having an average value being at least about ninety percent (90%). In additional examples [100] of the lighting system, the total internal reflection lens [106] may have a spectrum of transmission values of the further visible-light emissions [160], [162] having an average value being at least about ninety-five percent (95%). As some examples [100] of the lighting system, the total internal reflection lens [106] may have a spectrum of absorption values of the further visible-light emissions [160], [162] having an average value being no greater than about ten percent (10%). As further examples [100] of the lighting system, the total internal reflection lens [106] may have a spectrum of absorption values of the further visible-light emissions [160], [162] having an average value being no greater than about five percent (5%).

As additional examples [100] of the lighting system, the total internal reflection lens [106] may have a refractive index of at least about 1.41. In further examples [100] of the lighting system, the total internal reflection lens [106] may be formed of: a silicone composition having a refractive index of about 1.42; or a polymethyl-methacrylate composition having a refractive index of about 1.49; or a polycarbonate composition having a refractive index of about 1.58; or a silicate glass composition having a refractive index of about 1.67.

In some examples [100] of the lighting system, the edge-lit lightguide panel [102] may have a first pair of lateral edges [178], [180] being mutually spaced apart along the longitudinal axis [108]; and the another edge-lit lightguide panel [104] may have a second pair of lateral edges [182], [184] being mutually spaced apart along the longitudinal axis [108]. Further in those examples [100] of the lighting system, each one of the lateral edges [178], [180], [182], [184] may be curvilinear; and the one [112] of the pair of panel surfaces may be concave; and the one [130] of the another pair of panel surfaces may be concave.

In additional examples [100] of the lighting system, the edge-lit lightguide panel [102] may be configured for directing the visible-light emissions [124], [126] in first directions towards the longitudinal axis [108]; and the another edge-lit lightguide panel [104] may be configured for directing the additional visible-light emissions [142], [144] in second directions, being symmetrically opposed to the first directions, towards the longitudinal axis [108]. In those additional examples, the edge-lit lightguide panel [102] may further direct the visible-light emissions [124], [126] for emission from the first light output interface [116]; and the another edge-lit lightguide panel [104] may further direct the additional visible-light emissions [142], [144] for emission from the second light output interface [134]; and the total internal reflection lens [106] may direct the further visible-light emissions [160], [162] for emission from the third light output interface [148].

In some examples [100] of the lighting system, the edge-lit lightguide panel [102] and the another edge-lit lightguide panel [104] may be integrally formed together with the total internal reflection lens [106]. In other examples [100] of the lighting system, the edge-lit lightguide panel [102] may have a central edge represented by a dashed line [186] being extended along the longitudinal axis [108] and being spaced transversely away from the peripheral edge [114]; and the another edge-lit lightguide panel [104] may have another central edge represented by a dashed line [188] being extended along the longitudinal axis [108] and being spaced transversely away from the another peripheral edge [132]; and the total internal reflection lens [106] may be located between and attached to the central edge [186] and the another central edge [188].

In examples [100] of the lighting system, the edge-lit lightguide panel [102] may include internal light-dispersing features; and the another edge-lit lightguide panel [104] may include additional internal light-dispersing features. Further in those examples [100] of the lighting system, the internal light-dispersing features may include positive elements such as: particles having various shapes being e.g. spheroidal or polygonal; particles having various material compositions including, e.g., phosphors, quantum dots, and pigmented dots; micro-optical features such as spherical or elliptical lenses, and reflective micro-scale particles. Additionally in those examples [100] of the lighting system, the internal light-dispersing features may include negative elements such as hot-pressed micro-patterns e.g. micro-grooves, lenticular patterns, prisms, fresnels, conical arrays, pyramids, or domes. Also in those examples [100] of the lighting system, the internal light-dispersing features may have a gradually-increasing density in a direction from the peripheral edge [114] towards the longitudinal axis [108]; and the additional internal light-dispersing features may have a gradually-increasing density in another direction from the another peripheral edge [132] towards the longitudinal axis [108].

In examples [100] of the lighting system, the edge-lit lightguide panel [102] may include external light-dispersing features on the one [112] or the another one [110] of the pair of panel surfaces; and the another edge-lit lightguide panel [104] may include additional external light-dispersing features on the one [130] or the another one [128] of the another pair of panel surfaces. Further in those examples [100] of the lighting system, the external light-dispersing features may include positive elements such as: pigmented dots; or micro-optical features such as spherical or elliptical lenses. Also in those examples [100] of the lighting system, the external light-dispersing features may include negative elements such as hot-pressed textured surfaces such as micro-patterns e.g. micro-grooves, lenticular patterns, prisms, fresnels, conical arrays, pyramids, domes, or laser-ablated regions. In addition in those examples [100] of the lighting system, the external light-dispersing features may have a gradually-increasing density in a direction from the peripheral edge [114] towards the longitudinal axis [108]; and the additional external light-dispersing features may have a gradually-increasing density in another direction from the another peripheral edge [132] towards the longitudinal axis [108].

In examples [100] of the lighting system, the another one [110] of the pair of panel surfaces may have a light-reflective layer [202]; and the another one [128] of the another pair of panel surfaces may have another light-reflective layer [204]. Further in those examples [100] of the lighting system, the another one [110] of the pair of panel surfaces may have a specular light-reflective layer [202]; and the another one [128] of the another pair of panel surfaces may have another specular light-reflective layer [204]. Additionally in those examples [100] of the lighting system, the another one [110] of the pair of panel surfaces may have a metallic light-reflective layer [202]; and the another one [128] of the another pair of panel surfaces may have another metallic light-reflective layer [204]. In some of those examples [100] of the lighting system, the metallic light-reflective layers [202], [204] may have a composition that includes: silver, platinum, palladium, aluminum, zinc, gold, iron, copper, tin, antimony, titanium, chromium, nickel, or molybdenum. In additional examples [100] of the lighting system, the another one [110] of the pair of panel surfaces may have a light-reflective layer [202]; and the another one [128] of the another pair of panel surfaces may have another light-reflective layer [204]; and each of the light-reflective layers [202], [204] may have a minimum visible-light reflection value from any incident angle being at least about ninety percent (90%) or being at least about ninety-five percent (95%).

In examples [100] of the lighting system, the plurality of the semiconductor light-emitting devices [120], [122] may include an array of the semiconductor light-emitting devices [120], [122] being mutually spaced apart along the longitudinal axis [108]; and the another plurality of the semiconductor light-emitting devices [138], [140] may include another array of the semiconductor light-emitting devices [138], [140] being mutually spaced apart along the longitudinal axis [108]. Additionally in those examples [100] of the lighting system, the further plurality of the semiconductor light-emitting devices [156], [158] may include a further array of the semiconductor light-emitting devices [156], [158] being mutually spaced apart along the longitudinal axis [108].

In examples [100] of the lighting system, the plurality of the semiconductor light-emitting devices [120], [122] may be collectively configured for generating the visible-light emissions [124], [126] as having a selectable perceived color; and the another plurality of the semiconductor light-emitting devices [138], [140] may be collectively configured for generating the additional visible-light emissions [142], [144] as having another selectable perceived color. Additionally in those examples [100] of the lighting system, the further plurality of the semiconductor light-emitting devices [156], [158] may be collectively configured for generating the further visible-light emissions [160], [162] as having a further selectable perceived color.

In some examples [100] of the lighting system, the plurality of the semiconductor light-emitting devices [120], [122] may include a plurality of clusters of the semiconductor light-emitting devices [120], [122] being co-located together, each one of the plurality of clusters being collectively configured for generating the visible-light emissions [124], [126] as having a selectable perceived color; and the another plurality of the semiconductor light-emitting devices [138], [140] may include another plurality of clusters of the semiconductor light-emitting devices [138], [140] being co-located together, each one of the another plurality of clusters being collectively configured for generating the additional visible-light emissions [142], [144] as having another selectable perceived color. Also in that example [100] of the lighting system, the further plurality of the semiconductor light-emitting devices [156], [158] may include a further plurality of clusters of the semiconductor light-emitting devices [156], [158] being co-located together, each one of the further plurality of clusters being collectively configured for generating the further visible-light emissions [160], [162] as having a further selectable perceived color. As an example [100] of the lighting system, each of the pluralities of clusters of the semiconductor light-emitting devices [120], [122], [138], [140], [156], [158] may include two or three or more co-located semiconductor light-emitting devices being configured for collectively generating the visible-light emissions [124], [126] and the additional visible-light emissions [142], [144] and the further visible-light emissions [160], [162] as having the respective selectable perceived colors.

In examples [100] of the lighting system, a plurality of semiconductor light-emitting devices [120], [122], or a plurality of semiconductor light-emitting devices [138], [140], or a plurality of semiconductor light-emitting devices [156], [158] may be arranged in a chip-on-board (not shown) array, or in a discrete (not shown) array on a printed circuit board (not shown). Semiconductor light-emitting device arrays including chip-on-board arrays and discrete arrays may be conventionally fabricated by persons of ordinary skill in the art. Further, the semiconductor light-emitting devices [120], [122], [138], [140], [156], [158] of the example [100] of the lighting system may be provided with drivers (not shown) and power supplies (not shown) being conventionally fabricated and configured by persons of ordinary skill in the art.

In examples [100], the lighting system may be configured for causing emission of a portion of the further visible-light emissions [160], [162] as being within a field angle of the total internal reflection lens [106] and for causing emission of another portion of the further visible-light emissions [160], [162] as being outside the field angle of the total internal reflection lens [106]; and the emission aperture [164] may be configured for redirecting some of the another portion of the further visible-light emissions [160], [162]. Further in those examples [100] of the lighting system, the total internal reflection lens [106] may, as examples, have a beam angle being within a range of between about thirty degrees (30°) and about ten degrees (10°). Additionally in those examples [100] of the lighting system, the total internal reflection lens [106] may, as examples have a field angle being within a range of between about sixty degrees (60°) and about twenty degrees (20°).

In examples [100] of the lighting system, the emission aperture [164] may be positioned for redirecting a part of the another portion of the further visible-light emissions [160], [162] being emitted at the third light output interface [148] in directions deviating from the central light-emission axis [146] by greater than about seventy degrees (70°). In further examples [100] of the lighting system, the emission aperture [164] may be positioned for redirecting a part of the another portion of the further visible-light emissions [160], [162] being emitted at the third light output interface [148] in directions deviating from the central light-emission axis [146] by greater than about sixty degrees (60°).

As an example [100] of the lighting system, the lateral edges [178], [180], [182], [184] of the edge-lit lightguide panels [102], [104] may be curvilinear; and the one [112] of the pair of panel surfaces may be concave; and the one [130] of the another pair of panel surfaces may be concave. Further in that example [100] of the lighting system, as can be seen in FIG. 2, the concave panel surfaces [112], [130] of the emission aperture [164] may be positioned for mechanically shielding and thus redirecting some of the further visible-light emissions [160], [162] being emitted at the third light output interface [148] in directions deviating from the central light-emission axis [146] by greater than about sixty degrees (60°). Additionally in that example [100] of the lighting system, redirection of some of the further visible-light emissions [160], [162] being emitted at the third light output interface [148] in high-angle directions being greater than about sixty degrees (60°) or seventy degrees (70°) may substantially reduce objectionable glare.

In examples [100] of the lighting system, the total internal reflection lens [106] may have a beam angle being within a range of between about thirty degrees (30°) and about twenty degrees (20°). Further in those examples [100] of the lighting system, the total internal reflection lens [106] may have a field angle being within a range of between about sixty degrees (60°) and about forty degrees (40°). Additionally in those examples [100], the lighting system may be configured for causing emission of a portion of the further visible-light emissions [160], [162] as being within the field angle of the total internal reflection lens [106] and for causing emission of another portion of the further visible-light emissions [160], [162] as being outside the field angle of the total internal reflection lens [106]; and the emission aperture [164] may be configured for redirecting some of the another portion of the further visible-light emissions [160], [162]. Further in those examples [100], the emission aperture [164] may be positioned for redirecting a part of the another portion of the further visible-light emissions [160], [162] being emitted at the third light output interface [148] in directions deviating from the central light-emission axis [146] by greater than about sixty degrees (60°), or deviating from the central light-emission axis by greater than about seventy degrees (70°).

In other examples [100] of the lighting system, the total internal reflection lens [106] may have a beam angle being within a range of between about twenty degrees (20°) and about ten degrees (10°); or within a range of between about fifteen degrees (15°) and about ten degrees (10°). Further in those examples [100] of the lighting system, the total internal reflection lens [106] may have a field angle being respectively within a range of between about forty degrees (40°) and about twenty degrees (20°), or within a range of between about thirty degrees (30°) and about twenty degrees (20°). Further in those examples [100] of the lighting system, the third light output interface [148] may include internal or external light-dispersing features; and the third light output interface [148] may cause the total internal reflection lens [106] to have an effective field angle being within a range of between about sixty degrees (60°) and about forty degrees (40°). Additionally in those examples [100], the lighting system may be configured for causing emission of a portion of the further visible-light emissions [160], [162] as being within the effective field angle of the total internal reflection lens [106] and for causing emission of another portion of the further visible-light emissions [160], [162] as being outside the effective field angle of the total internal reflection lens [106]; and the emission aperture [164] may be configured for redirecting some of the another portion of the further visible-light emissions [160], [162]. Further in those examples [100], the emission aperture [164] may be positioned for redirecting a part of the another portion of the further visible-light emissions [160], [162] being emitted at the third light output interface [148] in directions deviating from the central light-emission axis [146] by greater than about sixty degrees (60°), or deviating from the central light-emission axis by greater than about seventy degrees (70°).

In examples [100], the lighting system may include a controller (not shown) for the visible-light source [118] and for the another visible-light source [136] and for the further visible-light source [154], the controller being configured for causing the visible-light emissions [124], [126] to have a selectable perceived color and for causing the additional visible-light emissions [142], [144] to have another selectable perceived color and for causing the further visible-light emissions [160], [162] to have a further selectable perceived color. Further in those examples [100] of the lighting system, the controller may be configured for causing the visible-light emissions [124], [126] to have a selectable and adjustable intensity and for causing the additional visible-light emissions [142], [144] to have another selectable and adjustable intensity and for causing the further visible-light emissions [160], [162] to have a further selectable and adjustable intensity. Additionally in those examples [100] of the lighting system, the controller may be configured for causing the combined visible-light emissions [166], [168] to generate a down-lighting pattern being: wall graze, table with wall fill, wall wash left, wall wash right, double wall wash, wall wash left plus floor, wall wash right plus floor, room, or batwing. Also in those examples [100] of the lighting system, the controller may be configured for selection among a plurality of different pre-programmed combinations of the intensities for the visible-light emissions [124], [126], the additional visible-light emissions [142], [144], and the further visible-light emissions [160], [162]. Further in those examples [100] of the lighting system, the controller may be configured for adjusting, over a selectable time period, the intensities for the visible-light emissions [124], [126], the additional visible-light emissions [142], [144], and the further visible-light emissions [160], [162] from a one of the plurality of pre-programmed combinations to another one of the plurality of pre-programmed combinations. Additionally in those examples [100], the lighting system may further include an ambient light sensor (not shown); and the controller may be configured, in response to the ambient light sensor, for adjusting the intensities for the visible-light emissions [124], [126], the additional visible-light emissions [142], [144], and the further visible-light emissions [160], [162].

In other examples [100], the lighting system may include a controller (not shown) for the visible-light source [118] being configured for causing the visible-light emissions [124], [126] to have a selectable perceived color; and may include another controller (not shown) for the another visible-light source [136] being configured for causing the additional visible-light emissions [142], [144] to have another selectable perceived color; and may include a further controller (not shown) for the further visible-light source [154] being configured for causing the further visible-light emissions [160], [162] to have a further selectable perceived color. Further in those examples [100] of the lighting system, the controller may be configured for causing the visible-light emissions [124], [126] to have a selectable and adjustable intensity; and the another controller may be configured for causing the additional visible-light emissions [142], [144] to have another selectable and adjustable intensity; and the further controller may be configured for causing the further visible-light emissions [160], [162] to have a further selectable and adjustable intensity. In those examples [100] of the lighting system, the controller and the another controller and the further controller may be collectively configured for causing the combined visible-light emissions [166], [168] to generate a down-lighting pattern being: wall graze, table with wall fill, wall wash left, wall wash right, double wall wash, wall wash left plus floor, wall wash right plus floor, room, or batwing. Additionally in those examples [100] of the lighting system, the controller and the another controller and the further controller may be collectively configured for selection among a plurality of different pre-programmed combinations of the intensities for the visible-light emissions [124], [126], the additional visible-light emissions [142], [144], and the further visible-light emissions [160], [162]. Further in those examples [100] of the lighting system, the controller and the another controller and the further controller may be collectively configured for adjusting, over a selectable time period, the intensities for the visible-light emissions [124], [126], the additional visible-light emissions [142], [144], and the further visible-light emissions [160], [162] from a one of the plurality of pre-programmed combinations to another one of the plurality of pre-programmed combinations. In those examples [100], the lighting system may also include an ambient light sensor; and the controller and the another controller and the further controller may be collectively configured, in response to the ambient light sensor, for adjusting the intensities for the visible-light emissions [124], [126], the additional visible-light emissions [142], [144], and the further visible-light emissions [160], [162].

Figure 5:
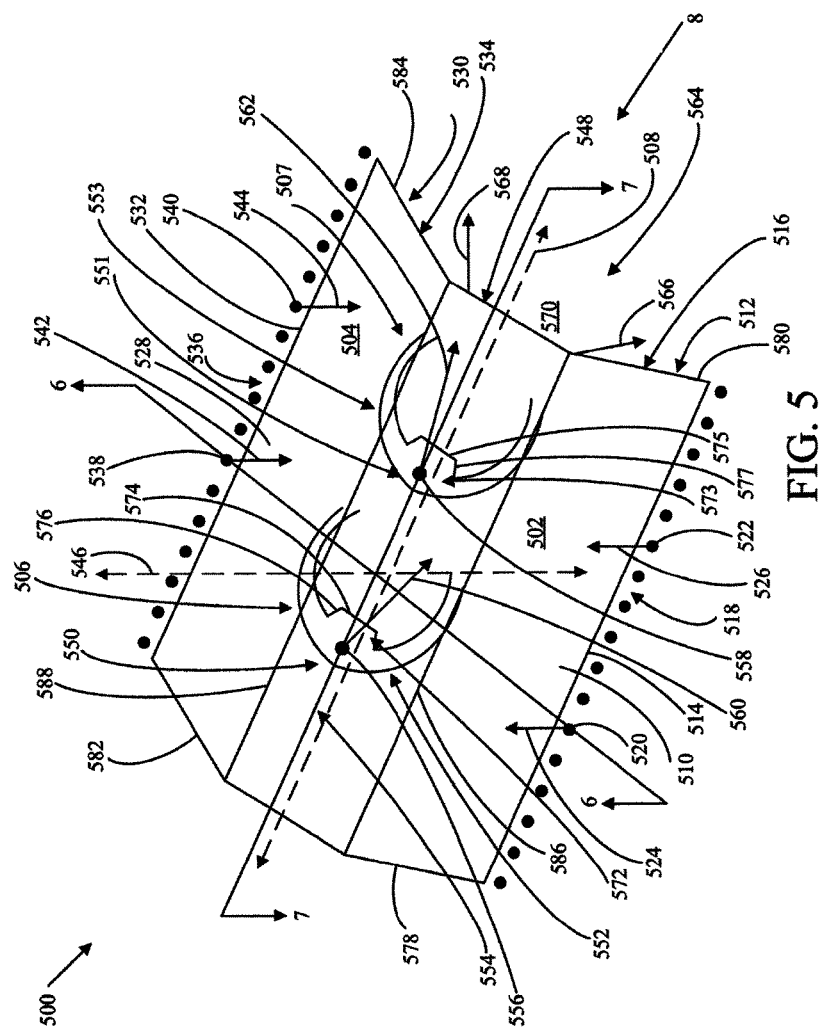
FIG. 5 is a schematic top perspective view showing an example [500] of an implementation of a lighting system.
Figure 6:
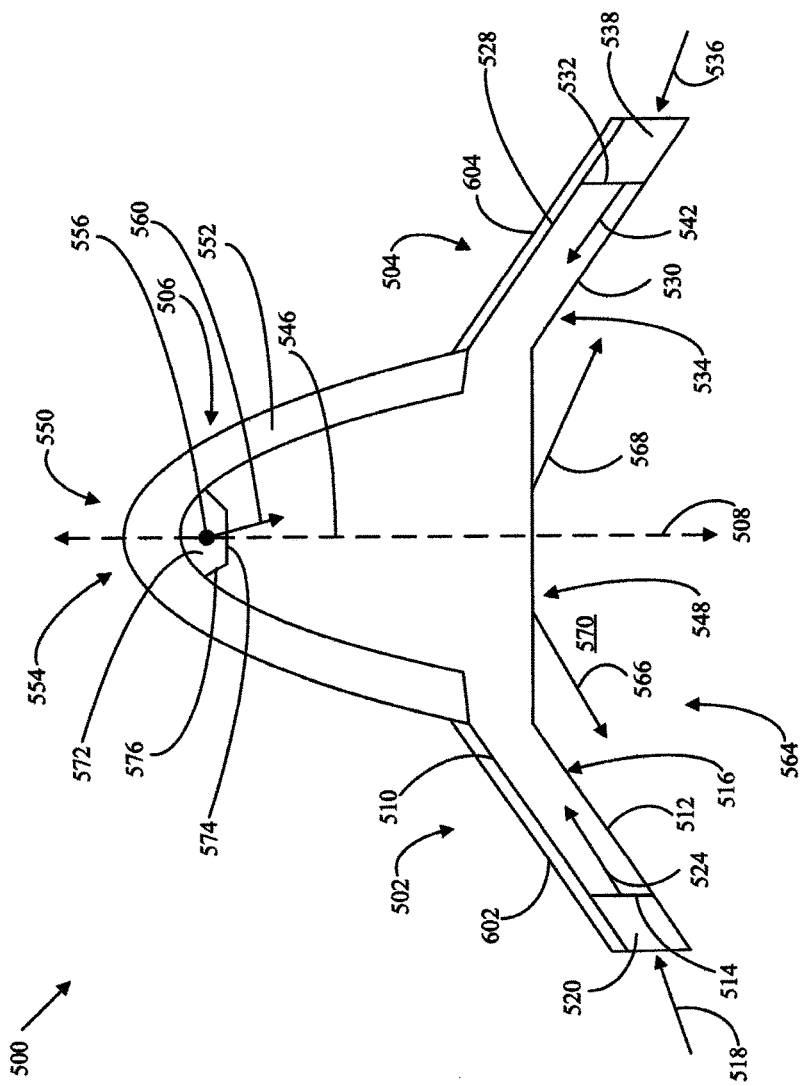
FIG. 6 is a schematic cross-sectional view taken along the line 6-6 showing the example of the lighting system.
Figure 7:
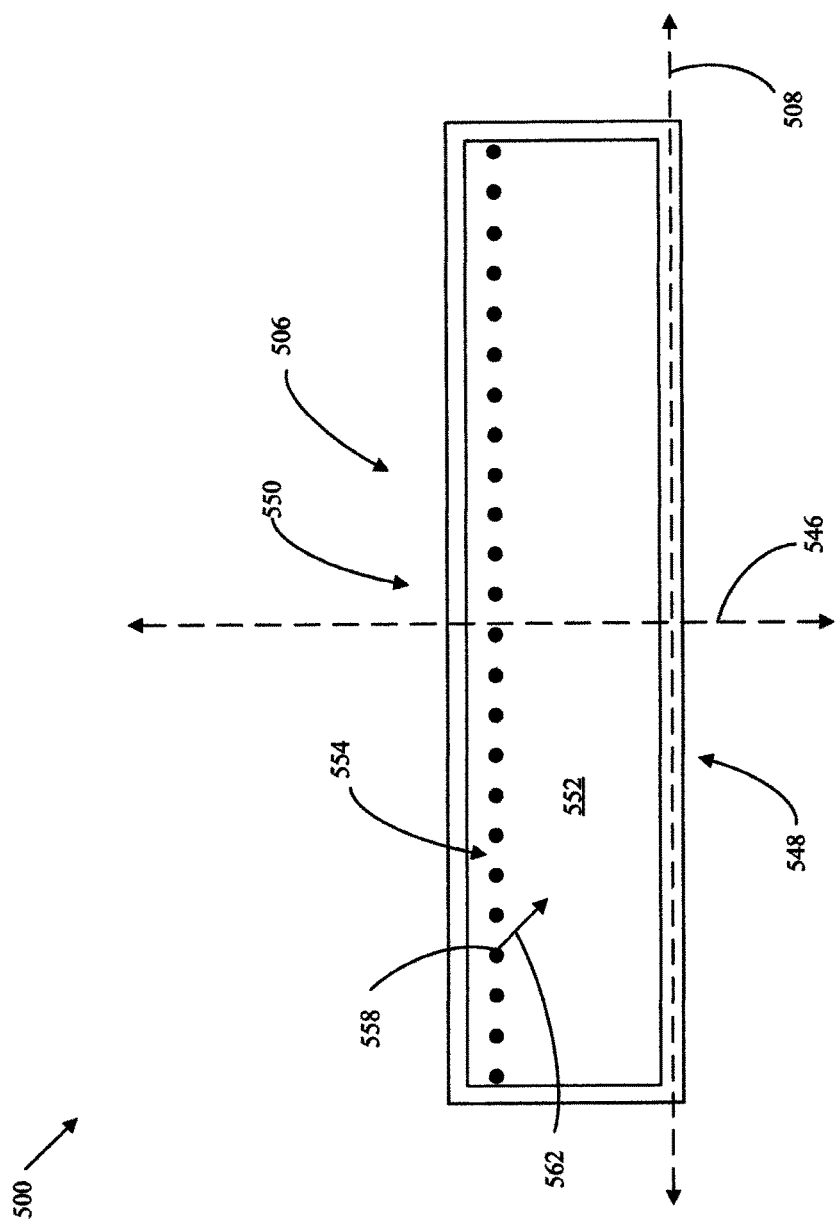
FIG. 7 is a schematic cross-sectional view taken along the line 7-7 showing the example of the lighting system.
Figure 8:
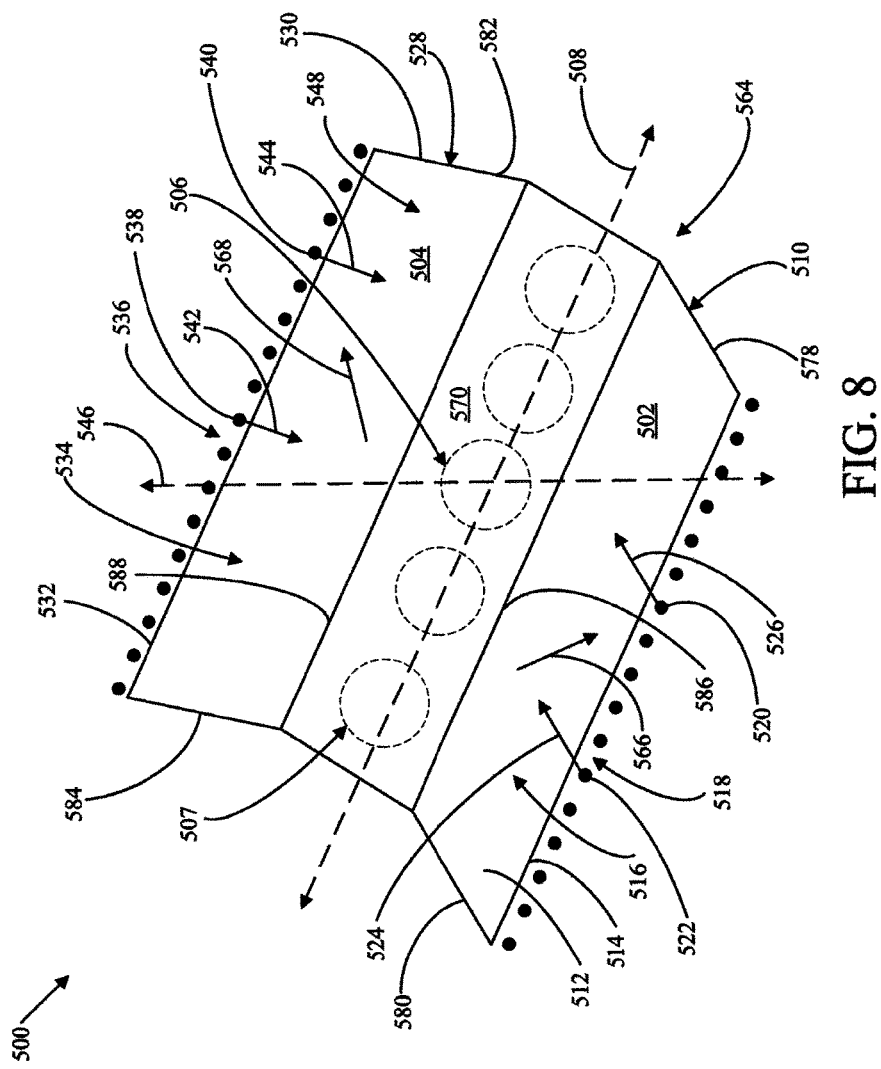
FIG. 8 is a schematic bottom perspective view taken along the line 8 showing the example of an implementation of a lighting system.

FIG. 5 is a schematic top perspective view showing an example [500] of an implementation of a lighting system. FIG. 6 is a schematic cross-sectional view taken along the line 6-6 showing the example [500] of the lighting system. FIG. 7 is a schematic cross-sectional view taken along the line 7-7 showing the example [500] of the lighting system. FIG. 8 is a schematic bottom perspective view taken along the line 8 showing the example [500] of an implementation of a lighting system. Another example [100] of an implementation of the lighting system was discussed in connection with FIGS. 1-4. A further example [900] of an implementation of the lighting system will subsequently be discussed in connection with FIGS. 9-12. An additional example [1300] of an implementation of the lighting system will subsequently be discussed in connection with FIGS. 13-16. It is understood throughout this specification that the example [500] of an implementation of the lighting system may be modified as including any of the features or combinations of features that are disclosed in connection with: the example [100] of an implementation of the lighting system; and the further example [900] of an implementation of the lighting system; and the additional example [1300] of an implementation of the lighting system. Accordingly, FIGS. 1-4 and 9-16 and the entireties of the discussions of the examples [100], [900], [1300] of implementations of the lighting system are hereby incorporated into the following discussion of the example [500] of an implementation of the lighting system.

As shown in FIGS. 5-8, the example [500] of the implementation of the lighting system includes: an edge-lit lightguide panel [502]; another edge-lit lightguide panel [504]; a total internal reflection lens [506]; and an additional total internal reflection lens [507]. In the example [500], the edge-lit lightguide panel [502] is extended along a longitudinal axis [508] of the lighting system. The edge-lit lightguide panel [502] in the example [500] of the lighting system further has a pair of mutually-opposing panel surfaces [510], [512]. The edge-lit lightguide panel [502] in the example [500] of the lighting system also has a peripheral edge [514] being extended along and spaced transversely away from the longitudinal axis [508]. In the example [500] of the lighting system, a one [512] of the pair of panel surfaces includes a first light output interface [516].

The example [500] of the lighting system also includes a visible-light source [518] including a plurality of semiconductor light-emitting devices [520], [522]. In the example [500] of the lighting system, the visible-light source [518] is configured for generating visible-light emissions [524], [526] from the plurality of semiconductor light-emitting devices [520], [522]. Further in the example [500] of the lighting system, the visible-light source [518] is located along the peripheral edge [514] for directing the visible-light emissions [524], [526] into the edge-lit lightguide panel [502].

In the example [500] of the lighting system, the another edge-lit lightguide panel [504] is extended along the longitudinal axis [508]. Additionally in the example [500] of the lighting system, the another edge-lit lightguide panel [504] has another pair of mutually-opposing panel surfaces [528], [530]. In the example [500] of the lighting system, the another edge-lit lightguide panel [504] has another peripheral edge [532] being extended along and spaced transversely away from the longitudinal axis [508]. Further, a one [530] of the another pair of panel surfaces in the example [500] of the lighting system includes a second light output interface [534].

The example [500] of the lighting system additionally includes another visible-light source [536] including another plurality of semiconductor light-emitting devices [538], [540]. In the example [500] of the lighting system, the another visible-light source [536] is configured for generating additional visible-light emissions [542], [544] from the another plurality of semiconductor light-emitting devices [538], [540]. Further in the example [500] of the lighting system, the another visible-light source [536] is located along the another peripheral edge [532] for directing the additional visible-light emissions [542], [544] into the another edge-lit lightguide panel [504].

In the example [500] of the lighting system, the total internal reflection lens [506] has a central light-emission axis [546] being transverse to the longitudinal axis [508]. The total internal reflection lens [506] in the example [500] of the lighting system includes a third light output interface [548] being located between the first and second light output interfaces [516], [534]. In the example [500] of the lighting system, the third light output interface [548] is spaced apart from a central light input interface [550] by a total internal reflection side surface [552]. The total internal reflection side surface [552] in the example [500] of the lighting system is extended along the central light-emission axis [546]. In the example [500] of the lighting system, the total internal reflection lens [506] has a further visible-light source [554] including a further plurality of semiconductor light-emitting devices [556], [558]. The further visible-light source [554] in the example [500] of the lighting system is configured for generating further visible-light emissions [560], [562] from the further plurality of semiconductor light-emitting devices [556], [558]. In the example [500] of the lighting system, the further visible-light source [554] is located at the central light input interface [550] for directing the further visible-light emissions [560], [562] through the total internal reflection lens [506] to the third light output interface [548].

In the example [500] of the lighting system, the additional total internal reflection lens [507] has an additional central light-emission axis [547] being transverse to the longitudinal axis [508]. The additional total internal reflection lens [507] in the example [500] of the lighting system includes a fourth light output interface [549] being spaced apart along the longitudinal axis [508] away from the third light output interface [548] and being located between the first and second light output interfaces [516], [534]. In the example [500] of the lighting system, the fourth light output interface [549] is spaced apart from an additional central light input interface [551] by an additional total internal reflection side surface [553]. The additional total internal reflection side surface [553] in the example [500] of the lighting system is extended along the additional central light-emission axis [547]. In the example [500] of the lighting system, the additional total internal reflection lens [507] has an additional visible-light source [555] including an additional plurality of semiconductor light-emitting devices [557], [559]. The additional visible-light source [555] in the example [500] of the lighting system is configured for generating other visible-light emissions [561], [563] from the additional plurality of semiconductor light-emitting devices [557], [559]. In the example [500] of the lighting system, the additional visible-light source [555] is located at the additional central light input interface [551] for directing the other visible-light emissions [561], [563] through the additional total internal reflection lens [507] to the fourth light output interface [549].

As examples, the edge-lit lightguide panel [502] may direct the visible-light emissions [524], [526] for emission from the first light output interface [516]; and the another edge-lit lightguide panel [504] may direct the additional visible-light emissions [542], [544] for emission from the second light output interface [534]; and the total internal reflection lens [506] may direct the further visible-light emissions [560], [562] for emission from the third light output interface [548]; and the another total internal reflection lens [507] may direct the other visible-light emissions [561], [563] for emission from the fourth light output interface [549].

In the example [500] of the lighting system, the first, second, third and fourth light output interfaces [516], [534], [548], [549] cooperatively define an emission aperture [564] for forming combined visible-light emissions [566], [568] including the visible-light emissions [524], [526], the additional visible-light emissions [542], [544], the further visible-light emissions [560], [562], and the other visible-light emissions [561], [563]. Further in the example [500] of the lighting system, the emission aperture [564] forms a shielding zone [570] for redirecting some of the combined visible-light emissions [566], [568].

In examples [500] of the lighting system, the total internal reflection side surface [552] and the additional total internal reflection side surface [553] each may have a frusto-conical cross-sectional profile in both of the directions of the lines 6-6 and 7-7 being perpendicular to the longitudinal axis [508]. In further examples [500] of the lighting system, the additional total internal reflection lens [507] may have any combination of the further structural and performance features discussed herein with regard to the total internal reflection lens [506]. As additional examples [500], the lighting system may include (not shown) further total internal reflection lenses in addition to the total internal reflection lenses [506], [507]. In examples [500] of the lighting system, such further total internal reflection lenses may have any combination of the further structural and performance features discussed herein with regard to the total internal reflection lenses [506] and [507], and may be mutually spaced apart in the same manner by which the total internal reflection lenses [506], [507] are spaced apart along the longitudinal axis [508].

In some examples [500] of the lighting system, the central light input interface [550] of the total internal reflection lens [506] (and likewise the additional total internal lens [507]) may include a lens cavity [572] formed by a lens face [574] being spaced apart along the central light-emission axis [546] from the further plurality of semiconductor light-emitting devices [556], [558] by a central side wall [576]. As examples [500] of the lighting system, portions of the further visible-light emissions [560], [562] entering into the total internal reflection lens [506] through the central side wall [576] may be refracted towards a normalized direction being orthogonal to a surface of the central side wall [576] and away from the central light-emission axis [546] because the refractive index of the total internal reflection lens [506] may be greater than the refractive index of an ambient atmosphere, e.g. air, filling the lens cavity [572]. Further in those examples [500] of the lighting system, the portions of the further visible-light emissions [560], [562] so entering into the total internal reflection lens [506] through the central side wall [576] may then undergo total internal reflection at the total internal reflection side surface [552], thereby being redirected toward the third light output interface [548].

In further examples [500] of the lighting system, the central light input interface [550] of the total internal reflection lens [506] (and likewise the additional total internal lens [507]) may include a lens cavity [572] having a different shape (not shown). Further in those examples [500] of the lighting system, the total internal reflection lens [506] may include a lens cavity [572] having an otherwise angled or compound central side wall (not shown). In other examples

[500] of the lighting system, the total internal reflection lens [506] may be a fresnel lens (not shown). Suitable fresnel lens structures that may be utilized as being the total internal reflection lens [506] are disclosed, for example, in Parkyn et al., U.S. Pat. No. 5,577,492 issued on Nov. 26, 1996, the entirety of which hereby is incorporated herein by reference.

In some examples [500] of the lighting system, the total internal reflection lens [506] (and likewise the additional total internal lens [507]) may be a converging total internal reflection lens [506] being configured for causing convergence of the further visible-light emissions [560], [562] in their travel along the central light-emission axis [546] toward the third light output interface [548]. Further in those examples [500] of the lighting system, the total internal reflection lens [506] may be a converging total internal reflection lens [506] being configured for causing convergence of the further visible-light emissions [560], [562] along the central light-emission axis [546] as having a beam angle being within a range of between about thirty degrees (30°) and about ten degrees (10°).

In further examples [500] of the lighting system, the total internal reflection lens [506] (and likewise the additional total internal lens [507]) may have a spectrum of transmission values of the further visible-light emissions [560], [562] having an average value being at least about ninety percent (90%). In additional examples [500] of the lighting system, the total internal reflection lens [506] may have a spectrum of transmission values of the further visible-light emissions [560], [562] having an average value being at least about ninety-five percent (95%). As some examples [500] of the lighting system, the total internal reflection lens [506] may have a spectrum of absorption values of the further visible-light emissions [560], [562] having an average value being no greater than about ten percent (10%). As further examples [500] of the lighting system, the total internal reflection lens [506] may have a spectrum of absorption values of the further visible-light emissions [560], [562] having an average value being no greater than about five percent (5%).

As additional examples [500] of the lighting system, the total internal reflection lens [506] (and likewise the additional total internal lens [507]) may have a refractive index of at least about 1.41. In further examples [500] of the lighting system, the total internal reflection lens [506] may be formed of: a silicone composition having a refractive index of about 1.42; or a polymethyl-methacrylate composition having a refractive index of about 1.49; or a polycarbonate composition having a refractive index of about 1.58; or a silicate glass composition having a refractive index of about 1.67.

In some examples [500] of the lighting system, the edge-lit lightguide panel [502] may have a first pair of lateral edges [578], [580] being mutually spaced apart along the longitudinal axis [508]; and the another edge-lit lightguide panel [504] may have a second pair of lateral edges [582], [584] being mutually spaced apart along the longitudinal axis [508]. Further in those examples [500] of the lighting system, each one of the lateral edges [578], [580], [582], [584] may be linear; and the one [512] of the pair of panel surfaces may be generally flat; and the one [530] of the another pair of panel surfaces may be generally flat.

In additional examples [500] of the lighting system, the edge-lit lightguide panel [502] may be configured for directing the visible-light emissions [524], [526] in first directions towards the longitudinal axis [508]; and the another edge-lit lightguide panel [504] may be configured for directing the additional visible-light emissions [542], [544] in second directions, being symmetrically opposed to the first directions, towards the longitudinal axis [508]. In those additional examples, the edge-lit lightguide panel [502] may further direct the visible-light emissions [524], [526] for emission from the first light output interface [516]; and the another edge-lit lightguide panel [504] may further direct the additional visible-light emissions [542], [544] for emission from the second light output interface [534]; and the total internal reflection lens [506] may direct the further visible-light emissions [560], [562] for emission from the third light output interface [548]; and the additional total internal reflection lens [507] may direct the other visible-light emissions [561], [563] for emission from the fourth light output interface [549].

In some examples [500] of the lighting system, the edge-lit lightguide panel [502] and the another edge-lit lightguide panel [504] may be integrally formed together with the total internal reflection lenses [506], [507]. In other examples [500] of the lighting system, the edge-lit lightguide panel [502] may have a central edge represented by a dashed line [586] being extended along the longitudinal axis [508] and being spaced transversely away from the peripheral edge [514]; and the another edge-lit lightguide panel [504] may have another central edge represented by a dashed line [588] being extended along the longitudinal axis [508] and being spaced transversely away from the another peripheral edge [532]; and the total internal reflection lenses [506], [507] may be located between and attached to the central edge [586] and the another central edge [588].

In examples [500] of the lighting system, the edge-lit lightguide panel [502] may include internal light-dispersing features; and the another edge-lit lightguide panel [504] may include additional internal light-dispersing features. Further in those examples [500] of the lighting system, the internal light-dispersing features may include positive elements such as: particles having various shapes being e.g. spheroidal or polygonal; particles having various material compositions including, e.g., phosphors, quantum dots, and pigmented dots; micro-optical features such as spherical or elliptical lenses, and reflective micro-scale particles. Additionally in those examples [500] of the lighting system, the internal light-dispersing features may include negative elements such as: hot-pressed micro-patterns e.g. micro-grooves, lenticular patterns, prisms, fresnels, conical arrays, pyramids, or domes. Also in those examples [500] of the lighting system, the internal light-dispersing features may have a gradually-increasing density in a direction from the peripheral edge [514] towards the longitudinal axis [508]; and the additional internal light-dispersing features may have a gradually-increasing density in another direction from the another peripheral edge [532] towards the longitudinal axis [508].

In examples [500] of the lighting system, the edge-lit lightguide panel [502] may include external light-dispersing features on the one [512] or the another one [510] of the pair of panel surfaces; and the another edge-lit lightguide panel [504] may include additional external light-dispersing features on the one [530] or the another one [528] of the another pair of panel surfaces. Further in those examples [500] of the lighting system, the external light-dispersing features may include positive elements such as: pigmented dots; or micro-optical features such as spherical or elliptical lenses. Also in those examples [500] of the lighting system, the external light-dispersing features may include negative elements such as hot-pressed textured surfaces such as micro-patterns e.g. micro-grooves, lenticular patterns, prisms, fresnels, conical arrays, pyramids, domes, or laser-ablated regions. In addition in those examples [500] of the lighting system, the external light-dispersing features may have a gradually-increasing density in a direction from the peripheral edge [514] towards the longitudinal axis [508]; and the additional external light-dispersing features may have a gradually-increasing density in another direction from the another peripheral edge [532] towards the longitudinal axis [508].

In examples [500] of the lighting system, the another one [510] of the pair of panel surfaces may have a light-reflective layer [602]; and the another one [528] of the another pair of panel surfaces may have another light-reflective layer [604]. Further in those examples [500] of the lighting system, the another one [510] of the pair of panel surfaces may have a specular light-reflective layer [602]; and the another one [528] of the another pair of panel surfaces may have another specular light-reflective layer [604]. Additionally in those examples [500] of the lighting system, the another one [510] of the pair of panel surfaces may have a metallic light-reflective layer [602]; and the another one [528] of the another pair of panel surfaces may have another metallic light-reflective layer [604]. In some of those examples [500] of the lighting system, the metallic light-reflective layers [602], [604] may have a composition that includes: silver, platinum, palladium, aluminum, zinc, gold, iron, copper, tin, antimony, titanium, chromium, nickel, or molybdenum. In additional examples [500] of the lighting system, the another one [510] of the pair of panel surfaces may have a light-reflective layer [602]; and the another one [528] of the another pair of panel surfaces may have another light-reflective layer [604]; and each of the light-reflective layers [602], [604] may have a minimum visible-light reflection value from any incident angle being at least about ninety percent (90%) or being at least about ninety-five percent (95%).

In examples [500] of the lighting system, the plurality of the semiconductor light-emitting devices [520], [522] may include an array of the semiconductor light-emitting devices [520], [522] being mutually spaced apart along the longitudinal axis [508]; and the another plurality of the semiconductor light-emitting devices [538], [540] may include another array of the semiconductor light-emitting devices [538], [540] being mutually spaced apart along the longitudinal axis [508]. Additionally in those examples [500] of the lighting system, the further plurality of the semiconductor light-emitting devices [556], [558] may include a further array of the semiconductor light-emitting devices [556], [558] being mutually spaced apart along the longitudinal axis [508].

In examples [500] of the lighting system, the plurality of the semiconductor light-emitting devices [520], [522] may be collectively configured for generating the visible-light emissions [524], [526] as having a selectable perceived color; and the another plurality of the semiconductor light-emitting devices [538], [540] may be collectively configured for generating the additional visible-light emissions [542], [544] as having another selectable perceived color. Additionally in those examples [500] of the lighting system, the further plurality of the semiconductor light-emitting devices [556], [558] may be collectively configured for generating the further visible-light emissions [560], [562] and the other visible-light emissions [561], [563] as respectively having a further selectable perceived color and an other selectable perceived color.

In some examples [500] of the lighting system, the plurality of the semiconductor light-emitting devices [520], [522] may include a plurality of clusters of the semiconductor light-emitting devices [520], [522] being co-located together, each one of the plurality of clusters being collectively configured for generating the visible-light emissions [524], [526] as having a selectable perceived color; and the another plurality of the semiconductor light-emitting devices [538], [540] may include another plurality of clusters of the semiconductor light-emitting devices [538], [540] being co-located together, each one of the another plurality of clusters being collectively configured for generating the additional visible-light emissions [542], [544] as having another selectable perceived color. Also in that example [500] of the lighting system, the further plurality of the semiconductor light-emitting devices [556], [558] may include a further plurality of clusters of the semiconductor light-emitting devices [556], [558] being co-located together, each one of the further plurality of clusters being collectively configured for generating the further visible-light emissions [560], [562] as having a further selectable perceived color. Further in that example [500] of the lighting system, the additional plurality of the semiconductor light-emitting devices [557], [559] may include an additional plurality of clusters of the semiconductor light-emitting devices [557], [559] being co-located together, each one of the additional plurality of clusters being collectively configured for generating the other visible-light emissions [561], [563] as having an other selectable perceived color.

As an example [500] of the lighting system, each of the pluralities of clusters of the semiconductor light-emitting devices [520], [522], [538], [540], [556], [558], [557], [559] may include two or three or more co-located semiconductor light-emitting devices being configured for collectively generating the visible-light emissions [524], [526] and the additional visible-light emissions [542], [544] and the further visible-light emissions [560], [562] and the other visible-light emissions [561], [563] as having the respective selectable perceived colors.

In examples [500] of the lighting system, a plurality of semiconductor light-emitting devices [520], [522], or a plurality of semiconductor light-emitting devices [538], [540], or a plurality of semiconductor light-emitting devices [556], [558], or a plurality of semiconductor light-emitting devices [557], [559] may be arranged in a chip-on-board (not shown) array, or in a discrete (not shown) array on a printed circuit board (not shown). Semiconductor light-emitting device arrays including chip-on-board arrays and discrete arrays may be conventionally fabricated by persons of ordinary skill in the art. Further, the semiconductor light-emitting devices [520], [522], [538], [540], [556], [558], [557], [559] of the example [500] of the lighting system may be provided with drivers (not shown) and power supplies (not shown) being conventionally fabricated and configured by persons of ordinary skill in the art.

In examples [500], the lighting system may be configured for causing emission of a portion of the further visible-light emissions [560], [562], (or in an analogous manner, a portion of the other visible-light emissions of the additional total internal reflection lens [507]), as being within a field angle of the total internal reflection lens [506] and for causing emission of another portion of the further visible-light emissions [560], [562] as being outside the field angle of the total internal reflection lens [506]; and the emission aperture [564] may be configured for redirecting some of the another portion of the further visible-light emissions [560], [562]. Further in those examples [500] of the lighting system, the total internal reflection lens [506] may, as examples, have a beam angle being within a range of between about thirty degrees (30°) and about ten degrees (10°). Additionally in those examples [500] of the lighting system, the total internal reflection lens [506] may, as examples have a field angle being within a range of between about sixty degrees (60°) and about twenty degrees (20°).

In examples [500] of the lighting system, the emission aperture [564] may be positioned for redirecting a part of the another portion of the further visible-light emissions [560], [562] (or likewise of the other visible-light emissions [561], [563]) being emitted at the third light output interface [548] in directions deviating from the central light-emission axis [546] by greater than about seventy degrees (70°). In further examples [500] of the lighting system, the emission aperture [564] may be positioned for redirecting a part of the another portion of the further visible-light emissions [560], [562] being emitted at the third light output interface [548] in directions deviating from the central light-emission axis [546] by greater than about sixty degrees (60°).

As an example [500] of the lighting system, the lateral edges [578], [580], [582], [584] of the edge-lit lightguide panels [502], [504] may be linear; and the one [512] of the pair of panel surfaces may be generally flat; and the one [530] of the another pair of panel surfaces may be generally flat. Further in that example [500] of the lighting system, as can be seen in FIG. 6, the flat panel surfaces [512], [530] of the emission aperture [564] may be cooperatively positioned for mechanically shielding and thus redirecting some of the further visible-light emissions [560], [562] and some of the other visible-light emissions [561], [563] being respectively emitted at the third light output interface [548] and at the fourth light output interface [549] in directions deviating from the central light-emission axis [546] by greater than about sixty degrees (60°). Additionally in that example [500] of the lighting system, redirection of the further visible-light emissions [560], [562] being emitted at the third light output interface [548] and of the other visible-light emissions [561], [563] being emitted at the fourth light output interface [549] in high-angle directions being greater than about sixty degrees (60°) or seventy degrees (70°) may substantially reduce objectionable glare.

In examples [500] of the lighting system, the total internal reflection lens [506] (and likewise the additional internal lens [507]) may have a beam angle being within a range of between about thirty degrees (30°) and about twenty degrees (20°). Further in those examples [500] of the lighting system, the total internal reflection lens [506] may have a field angle being within a range of between about sixty degrees (60°) and about forty degrees (40°). Additionally in those examples [500], the lighting system may be configured for causing emission of a portion of the further visible-light emissions [560], [562] as being within the field angle of the total internal reflection lens [506] and for causing emission of another portion of the further visible-light emissions [560], [562] as being outside the field angle of the total internal reflection lens [506]; and the emission aperture [564] may be configured for redirecting some of the another portion of the further visible-light emissions [560], [562]. Further in those examples [500], the emission aperture [564] may be positioned for redirecting a part of the another portion of the further visible-light emissions [560], [562] being emitted at the third light output interface [548] in directions deviating from the central light-emission axis [546] by greater than about sixty degrees (60°), or deviating from the central light-emission axis by greater than about seventy degrees (70°).

In other examples [500] of the lighting system, the total internal reflection lens [506] (and likewise the additional total internal lens [507]) may have a beam angle being within a range of between about twenty degrees (20°) and about ten degrees (10°); or within a range of between about fifteen degrees (15°) and about ten degrees (10°). Further in those examples [500] of the lighting system, the total internal reflection lens [506] may have a field angle being respectively within a range of between about forty degrees (40°) and about twenty degrees (20°), or within a range of between about thirty degrees (30°) and about twenty degrees (20°). Further in those examples [500] of the lighting system, the third light output interface [548] may include internal or external light-dispersing features; and the third light output interface [548] may cause the total internal reflection lens [506] to have an effective field angle being within a range of between about sixty degrees (60°) and about forty degrees (40°). Additionally in those examples [500], the lighting system may be configured for causing emission of a portion of the further visible-light emissions [560], [562] as being within the effective field angle of the total internal reflection lens [506] and for causing emission of another portion of the further visible-light emissions [560], [562] as being outside the effective field angle of the total internal reflection lens [506]; and the emission aperture [564] may be configured for redirecting some of the another portion of the further visible-light emissions [560], [562]. Further in those examples [500], the emission aperture [564] may be positioned for redirecting a part of the another portion of the further visible-light emissions [560], [562] (or likewise the other visible-light emissions [561], [563]) being emitted at the third light output interface [548] in directions deviating from the central light-emission axis [546] by greater than about sixty degrees (60°), or deviating from the central light-emission axis by greater than about seventy degrees (70°).

In examples [500], the lighting system may include a controller (not shown) for the visible-light source [518] and for the another visible-light source [536] and for the further visible-light source [554] and for the additional visible-light source [555], the controller being configured for causing the visible-light emissions [524], [526] to have a selectable perceived color and for causing the additional visible-light emissions [542], [544] to have another selectable perceived color and for causing the further visible-light emissions [560], [562] to have a further selectable perceived color and for causing the other visible-light emissions [561], [563] to have an additional selectable perceived color. Further in those examples [500] of the lighting system, the controller may be configured for causing the visible-light emissions [524], [526] to have a selectable and adjustable intensity and for causing the additional visible-light emissions [542], [544] to have another selectable and adjustable intensity and for causing the further visible-light emissions [560], [562] to have a further selectable and adjustable intensity and for causing the other visible-light emissions [561], [563] to have an additional selectable and adjustable intensity. Additionally in those examples [500] of the lighting system, the controller may be configured for causing the combined visible-light emissions [566], [568] to generate a downlighting pattern being: wall graze, table with wall fill, wall wash left, wall wash right, double wall wash, wall wash left plus floor, wall wash right plus floor, room, or batwing. Also in those examples [500] of the lighting system, the controller may be configured for selection among a plurality of different pre-programmed combinations of the intensities for the visible-light emissions [524], [526], the additional visible-light emissions [542], [544], the further visible-light emissions [560], [562] and the other visible-light emissions [561], [563]. Further in those examples [500] of the lighting system, the controller may be configured for adjusting, over a selectable time period, the intensities for the visible-light emissions [524], [526], the additional visible-light emissions [542], [544], the further visible-light emissions [560], [562] and the other visible-light emissions [561], [563] from a one of the plurality of pre-programmed combinations to another one of the plurality of pre-programmed combinations. Additionally in those examples [500], the lighting system may further include an ambient light sensor (not shown); and the controller may be configured, in response to the ambient light sensor, for adjusting the intensities for the visible-light emissions [524], [526], the additional visible-light emissions [542], [544], the further visible-light emissions [560], [562], and the other visible-light emissions [561], [563].

In other examples [500], the lighting system may include a controller (not shown) for the visible-light source [518] being configured for causing the visible-light emissions [524], [526] to have a selectable perceived color; and may include another controller (not shown) for the another visible-light source [536] being configured for causing the additional visible-light emissions [542], [544] to have another selectable perceived color; and may include a further controller (not shown) for the further visible-light source [554] being configured for causing the further visible-light emissions [560], [562] to have a further selectable perceived color; and may include an additional controller (not shown) for the additional visible-light source [555] being configured for causing the other visible-light emissions [561], [563] to have an additional selectable perceived color. Further in those examples [500] of the lighting system, the controller may be configured for causing the visible-light emissions [524], [526] to have a selectable and adjustable intensity; and the another controller may be configured for causing the additional visible-light emissions [542], [544] to have another selectable and adjustable intensity; and the further controller may be configured for causing the further visible-light emissions [560], [562] to have a further selectable and adjustable intensity; and the additional controller may be configured for causing the other visible-light emissions [561], [563] to have an additional selectable and adjustable intensity. In those examples [500] of the lighting system, the controller and the another controller and the further controller and the additional controller may be collectively configured for causing the combined visible-light emissions [566], [568] to generate a down-lighting pattern being: wall graze, table with wall fill, wall wash left, wall wash right, double wall wash, wall wash left plus floor, wall wash right plus floor, room, or batwing. Additionally in those examples [500] of the lighting system, the controller and the another controller and the further controller and the additional controller may be collectively configured for selection among a plurality of different pre-programmed combinations of the intensities for the visible-light emissions [524], [526], the additional visible-light emissions [542], [544], the further visible-light emissions [560], [562]; and the other visible-light emissions [561], [563]. Further in those examples [500] of the lighting system, the controller and the another controller and the further controller and the additional controller may be collectively configured for adjusting, over a selectable time period, the intensities for the visible-light emissions [524], [526], the additional visible-light emissions [542], [544], the further visible-light emissions [560], [562], and the other visible-light emissions [561], [563], from a one of the plurality of pre-programmed combinations to another one of the plurality of pre-programmed combinations. In those examples [500], the lighting system may also include an ambient light sensor; and the controller and the another controller and the further controller and the additional controller may be collectively configured, in response to the ambient light sensor, for adjusting the intensities for the visible-light emissions [524], [526], the additional visible-light emissions [542], [544], and the further visible-light emissions [560], [562], and the other visible-light emissions [561], [563].

Figure 9:
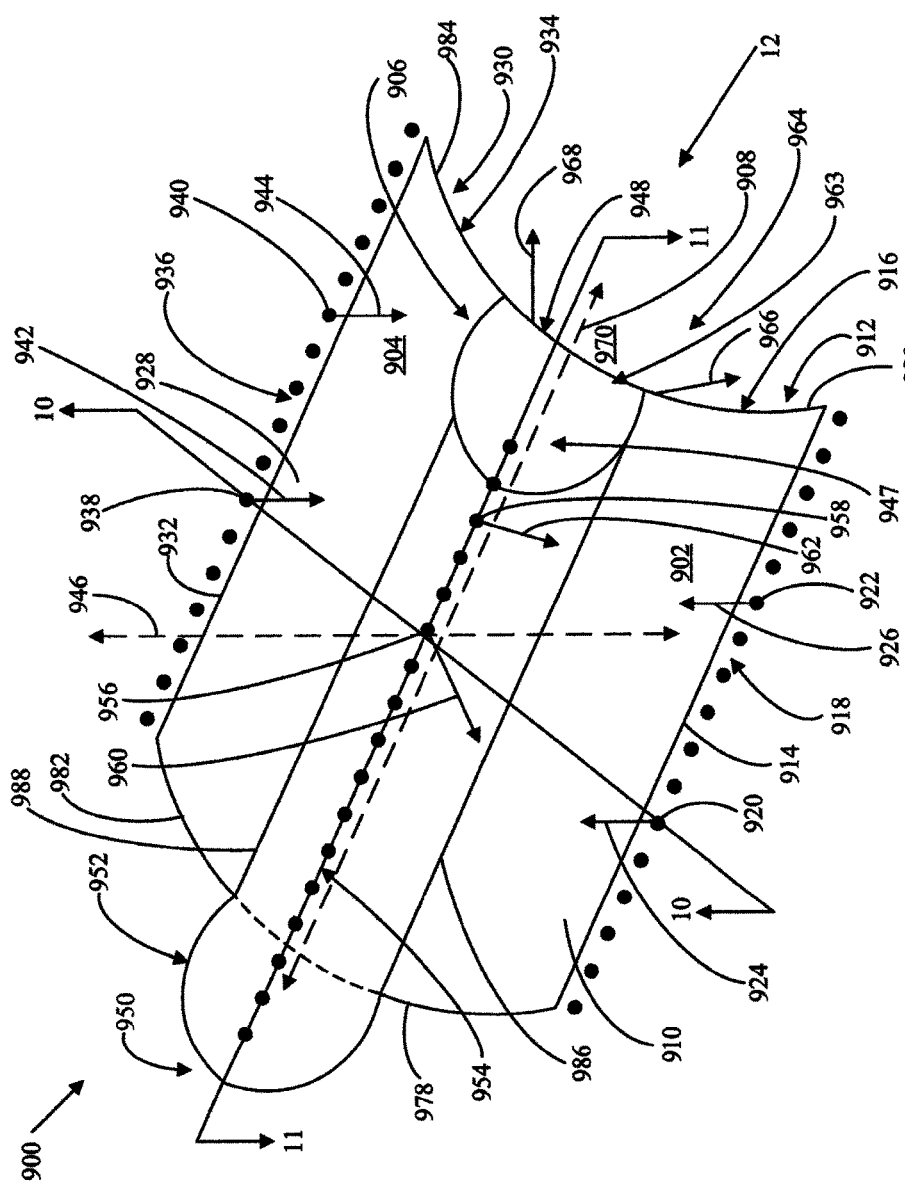
FIG. 9 is a schematic top perspective view showing an example [900] of an implementation of a lighting system.
Figure 10:
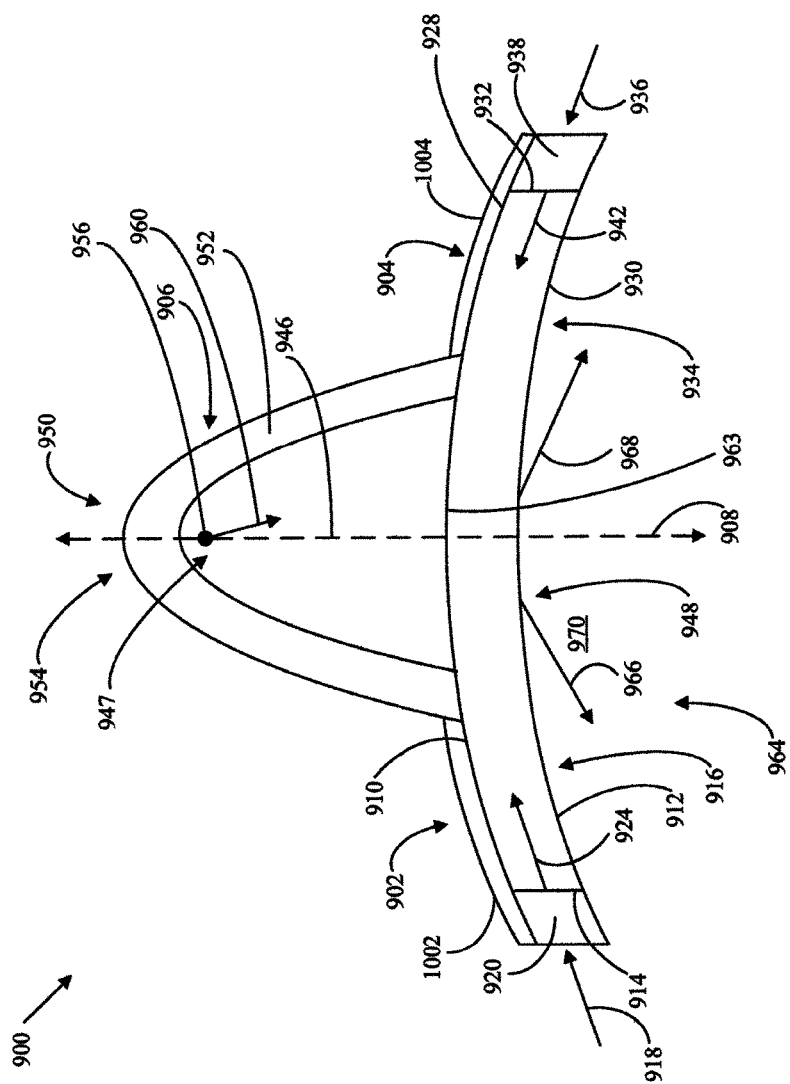
FIG. 10 is a schematic cross-sectional view taken along the line 10-10 showing the example [900] of the lighting system.
Figure 11:
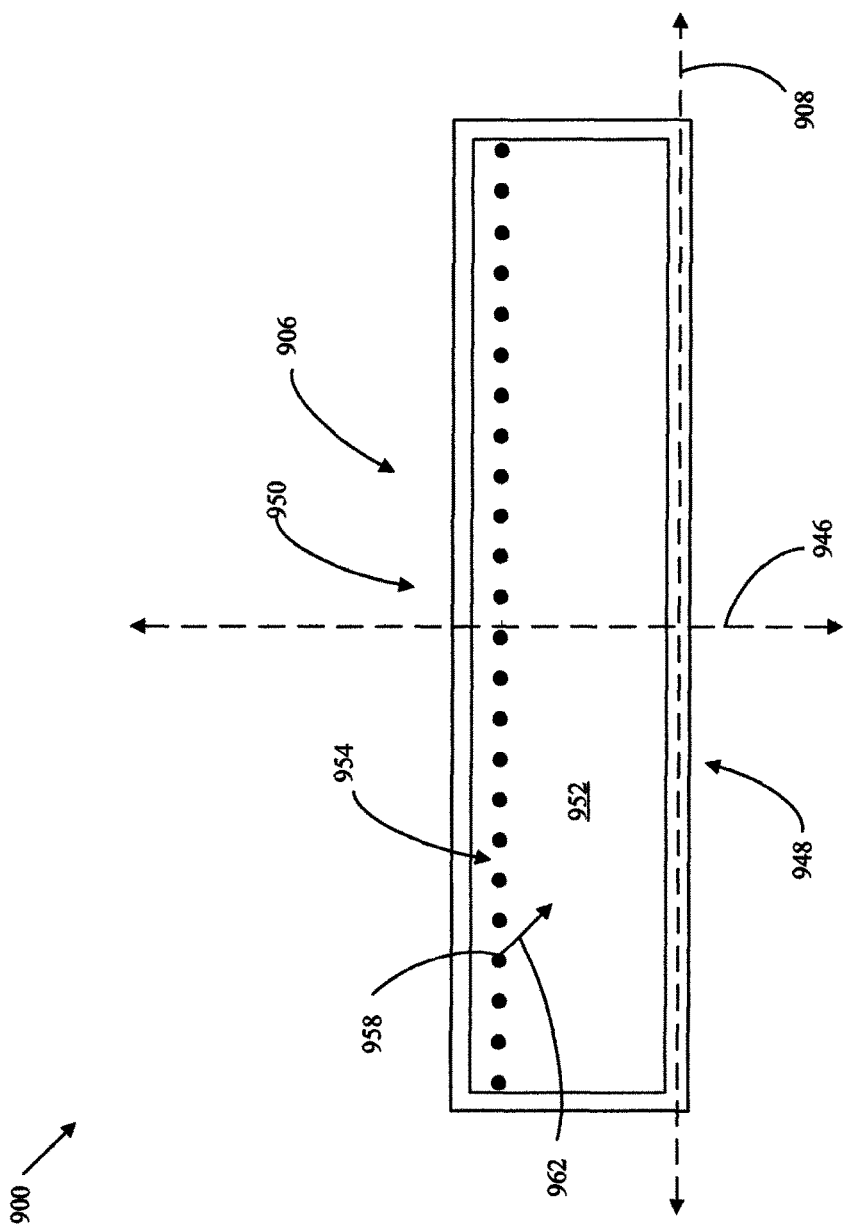
FIG. 11 is a schematic cross-sectional view taken along the line 11-11 showing the example [900] of the lighting system.
Figure 12:
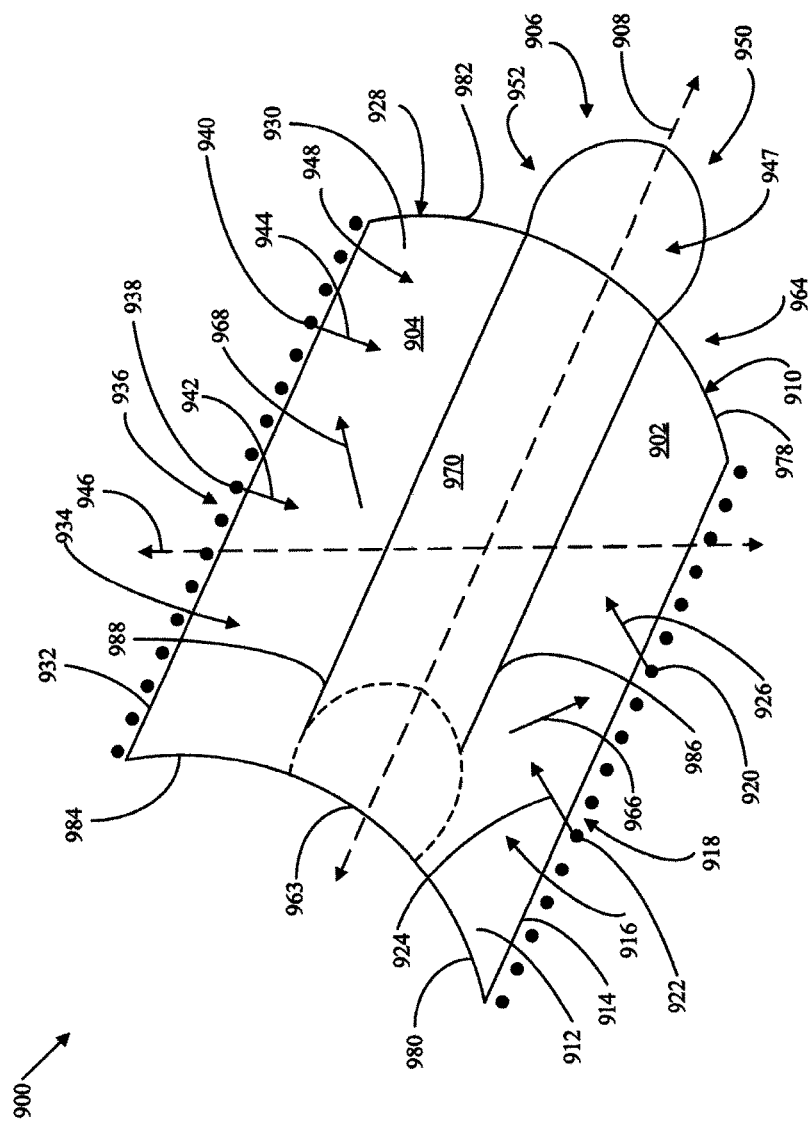
FIG. 12 is a schematic bottom perspective view taken along the line 12 showing the example [900] of an implementation of a lighting system.

FIG. 9 is a schematic top perspective view showing an example [900] of an implementation of a lighting system. FIG. 10 is a schematic cross-sectional view taken along the line 10-10 showing the example [900] of the lighting system. FIG. 11 is a schematic cross-sectional view taken along the line 11-11 showing the example [900] of the lighting system. FIG. 12 is a schematic bottom perspective view taken along the line 12 showing the example [900] of an implementation of a lighting system. Another example [100] of an implementation of the lighting system was discussed in connection with FIGS. 1-4. A further example [500] of an implementation of the lighting system was discussed in connection with FIGS. 5-8. An additional example [1300] of an implementation of the lighting system will be subsequently discussed in connection with FIGS. 13-16. It is understood throughout this specification that the example [900] of an implementation of the lighting system may be modified as including any of the features or combinations of features that are disclosed in connection with: the another example [100] of an implementation of the lighting system; and the further example [500] of an implementation of the lighting system; and the additional example [1300] of an implementation of the lighting system. Accordingly, FIGS. 1-8 and 13-16 and the entireties of the discussions of the examples [100], [500], [1300] of implementations of the lighting system are hereby incorporated into the following discussion of the example [900] of an implementation of the lighting system.

As shown in FIGS. 9-12, the example [900] of the implementation of the lighting system includes: an edge-lit lightguide panel [902]; another edge-lit lightguide panel [904]; and a bowl reflector [906]. In the example [900], the edge-lit lightguide panel [902] is extended along a longitudinal axis [908] of the lighting system. The edge-lit lightguide panel [902] in the example [900] of the lighting system further has a pair of mutually-opposing panel surfaces [910], [912]. The edge-lit lightguide panel [902] in the example [900] of the lighting system also has a peripheral edge [914] being extended along and spaced transversely away from the longitudinal axis [908]. In the example [900] of the lighting system, a one [912] of the pair of panel surfaces includes a first light output interface [916].

The example [900] of the lighting system also includes a visible-light source [918] including a plurality of semiconductor light-emitting devices [920], [922]. In the example [900] of the lighting system, the visible-light source [918] is configured for generating visible-light emissions [924], [926] from the plurality of semiconductor light-emitting devices [920], [922]. Further in the example [900] of the lighting system, the visible-light source [918] is located along the peripheral edge [914] for directing the visible-light emissions [924], [926] into the edge-lit lightguide panel [902].

In the example [900] of the lighting system, the another edge-lit lightguide panel [904] is extended along the longitudinal axis [908]. Additionally in the example [900] of the lighting system, the another edge-lit lightguide panel [904] has another pair of mutually-opposing panel surfaces [928], [930]. In the example [900] of the lighting system, the another edge-lit lightguide panel [904] has another peripheral edge [932] being extended along and spaced transversely away from the longitudinal axis [908]. Further, a one

[930] of the another pair of panel surfaces in the example [900] of the lighting system includes a second light output interface [934].

The example [900] of the lighting system additionally includes another visible-light source [936] including another plurality of semiconductor light-emitting devices [938], [940]. In the example [900] of the lighting system, the another visible-light source [936] is configured for generating additional visible-light emissions [942], [944] from the another plurality of semiconductor light-emitting devices [938], [940]. Further in the example [900] of the lighting system, the another visible-light source [936] is located along the another peripheral edge [932] for directing the additional visible-light emissions [942], [944] into the another edge-lit lightguide panel [904].

In the example [900] of the lighting system, the bowl reflector [906] has a central light-emission axis [946] being transverse to the longitudinal axis [908]. The bowl reflector [906] in the example [900] of the lighting system includes a third light output interface [948] being located between the first and second light output interfaces [916], [934]. In the example [900] of the lighting system, the third light output interface [948] is spaced apart from a central light input interface [950] by a visible-light-reflective side surface [952]. The visible-light-reflective side surface [952] in the example [900] of the lighting system is extended along the central light-emission axis [946] and defines a portion of a cavity [947]. In the example [900] of the lighting system, the bowl reflector [906] has a further visible-light source [954] including a further plurality of semiconductor light-emitting devices [956], [958]. The further visible-light source [954] in the example [900] of the lighting system is configured for generating further visible-light emissions [960], [962] from the further plurality of semiconductor light-emitting devices [956], [958]. In the example [900] of the lighting system, the further visible-light source [954] is located at the central light input interface [950] for directing the further visible-light emissions [960], [962] through the cavity [947] of the bowl reflector [906] to the third light output interface [948].

As examples, the edge-lit lightguide panel [902] may direct the visible-light emissions [924], [926] for emission from the first light output interface [916]; and the another edge-lit lightguide panel [904] may direct the additional visible-light emissions [942], [944] for emission from the second light output interface [934]; and the bowl reflector [906] may direct the further visible-light emissions [960], [962] for emission from the third light output interface [948].

In the example [900] of the lighting system, the first, second and third light output interfaces [916], [934], [948] cooperatively define an emission aperture [964] for forming combined visible-light emissions [966], [968] including the visible-light emissions [924], [926], the additional visible-light emissions [942], [944], and the further visible-light emissions [960], [962]. Further in the example [900] of the lighting system, the emission aperture [964] forms a shielding zone [970] for redirecting some of the combined visible-light emissions [966], [968].

In some examples [900] of the lighting system: the visible-light-reflective side surface [952] may be extended along the longitudinal axis [908] in addition to being extended along the central light-emission axis [946]; and the central light input interface [950] may be extended along the longitudinal axis [908]; and the further visible-light source [954] may be extended along the longitudinal axis [908]. Further in those examples [900] of the lighting system, the visible-light-reflective side surface [952] may have a frusto-conical cross-sectional profile in the direction of the line 10-10 being perpendicular to the longitudinal axis [908].

In some examples [900] of the lighting system, the bowl reflector [906] may be a converging bowl reflector [906] being configured for causing convergence of the further visible-light emissions [960], [962] in their travel along the central light-emission axis [946] toward the third light output interface [948]. Further in those examples [900] of the lighting system, the bowl reflector [906] may be a converging bowl reflector [906] being configured for causing convergence of the further visible-light emissions [960], [962] along the central light-emission axis [946] as having a beam angle being within a range of between about thirty degrees (30°) and about ten degrees (10°).

As additional examples [900] of the lighting system, the visible-light-reflective side surface [952] of the bowl reflector [906] may be a specular light-reflective surface. In further examples [900] of the lighting system, the visible-light-reflective side surface [952] of the bowl reflector [906] may be a metallic light-reflective surface. In some of those examples [900] of the lighting system, the metallic layer of the visible-light-reflective side surface [952] may have a composition that includes: silver, platinum, palladium, aluminum, zinc, gold, iron, copper, tin, antimony, titanium, chromium, nickel, or molybdenum.

In examples [900] of the lighting system, the visible-light-reflective side surface [952] of the bowl reflector [906] may have a minimum visible-light reflection value from any incident angle being: at least about ninety percent (90%); or at least about ninety-five percent (95%). As further examples [900] of the lighting system, the visible-light-reflective side surface [952] of the bowl reflector [906] may have a maximum visible-light transmission value from any incident angle being: no greater than about ten percent (10%); or no greater than about five percent (5%).

In examples [900] of the lighting system, the visible-light-reflective side surface [952] of the bowl reflector [906] may be configured for reflecting the further visible-light emissions [960], [962] toward a horizon [963] of the bowl reflector [906] as having a beam angle being within a range of between about ten degrees (10°) and about thirty degrees (30°).

As further examples [900] of the lighting system, the visible-light-reflective side surface [952] of the bowl reflector [906] may be configured for reflecting the further visible-light emissions [960], [962] toward the horizon [963] of the bowl reflector [906] as having a field angle being within a range of between about twenty degrees (20°) and about sixty degrees (60°).

In examples [900] of the lighting system, a portion of the visible-light-reflective side surface [952] of the bowl reflector [906] may be a parabolic surface. In further examples [900] of the lighting system, a portion of the visible-light-reflective side surface [952] of the bowl reflector [906] may be a part of an elliptic paraboloid or a part of a paraboloid of revolution. As further examples [900] of the lighting system, a portion of the visible-light-reflective side surface [952] of the bowl reflector [906] may be a multi-segmented parabolic surface.

In some examples [900] of the lighting system, the edge-lit lightguide panel [902] may have a first pair of lateral edges [978], [980] being mutually spaced apart along the longitudinal axis [908]; and the another edge-lit lightguide panel [904] may have a second pair of lateral edges [982], [984] being mutually spaced apart along the longitudinal axis [908]. Further in those examples [900] of the lighting system, each one of the lateral edges [978], [980], [982],

[984] may be curvilinear; and the one [912] of the pair of panel surfaces may be concave; and the one [930] of the another pair of panel surfaces may be concave.

In additional examples [900] of the lighting system, the edge-lit lightguide panel [902] may be configured for directing the visible-light emissions [924], [926] in first directions towards the longitudinal axis [908]; and the another edge-lit lightguide panel [904] may be configured for directing the additional visible-light emissions [942], [944] in second directions, being symmetrically opposed to the first directions, towards the longitudinal axis [908]. In those additional examples, the edge-lit lightguide panel [902] may further direct the visible-light emissions [924], [926] for emission from the first light output interface [916]; and the another edge-lit lightguide panel [904] may further direct the additional visible-light emissions [942], [944] for emission from the second light output interface [934]; and the bowl reflector [906] may direct the further visible-light emissions [960], [962] for emission from the third light output interface [948].

In some examples [900] of the lighting system, the edge-lit lightguide panel [902] and the another edge-lit lightguide panel [904] may be integrally formed together with the bowl reflector [906]. In other examples [900] of the lighting system, the edge-lit lightguide panel [902] may have a central edge represented by a dashed line [986] being extended along the longitudinal axis [908] and being spaced transversely away from the peripheral edge [914]; and the another edge-lit lightguide panel [904] may have another central edge represented by a dashed line [988] being extended along the longitudinal axis [908] and being spaced transversely away from the another peripheral edge [932]; and the bowl reflector [906] may be located between and attached to the central edge [986] and the another central edge [988].

In examples [900] of the lighting system, the edge-lit lightguide panel [902] may include internal light-dispersing features; and the another edge-lit lightguide panel [904] may include additional internal light-dispersing features. Further in those examples [900] of the lighting system, the internal light-dispersing features may include positive elements such as: particles having various shapes being e.g. spheroidal or polygonal; particles having various material compositions including, e.g., phosphors, quantum dots, and pigmented dots; micro-optical features such as spherical or elliptical lenses, and reflective micro-scale particles. Additionally in those examples [900] of the lighting system, the internal light-dispersing features may include negative elements such as: hot-pressed micro-patterns e.g. micro-grooves, lenticular patterns, prisms, fresnels, conical arrays, pyramids, or domes. Also in those examples [900] of the lighting system, the internal light-dispersing features may have a gradually-increasing density in a direction from the peripheral edge [914] towards the longitudinal axis [908]; and the additional internal light-dispersing features may have a gradually-increasing density in another direction from the another peripheral edge [932] towards the longitudinal axis [908].

In examples [900] of the lighting system, the edge-lit lightguide panel [902] may include external light-dispersing features on the one [912] or the another one [910] of the pair of panel surfaces; and the another edge-lit lightguide panel [904] may include additional external light-dispersing features on the one [930] or the another one [928] of the another pair of panel surfaces. Further in those examples [900] of the lighting system, the external light-dispersing features may include positive elements such as: pigmented dots; or micro-optical features such as spherical or elliptical lenses. Also in those examples [900] of the lighting system, the external light-dispersing features may include negative elements such as: hot-pressed textured surfaces such as micro-patterns e.g. micro-grooves, lenticular patterns, prisms, fresnels, conical arrays, pyramids, domes, or laser-ablated regions. In addition in those examples [900] of the lighting system, the external light-dispersing features may have a gradually-increasing density in a direction from the peripheral edge [914] towards the longitudinal axis [908]; and the additional external light-dispersing features may have a gradually-increasing density in another direction from the another peripheral edge [932] towards the longitudinal axis [908].

In examples [900] of the lighting system, the another one [910] of the pair of panel surfaces may have a light-reflective layer [1002]; and the another one [928] of the another pair of panel surfaces may have another light-reflective layer [1004]. Further in those examples [900] of the lighting system, the another one [910] of the pair of panel surfaces may have a specular light-reflective layer [1002]; and the another one [928] of the another pair of panel surfaces may have another specular light-reflective layer [1004]. Additionally in those examples [900] of the lighting system, the another one [910] of the pair of panel surfaces may have a metallic light-reflective layer [1002]; and the another one [928] of the another pair of panel surfaces may have another metallic light-reflective layer [1004]. In some of those examples [900] of the lighting system, the metallic light-reflective layers [1002], [1004] may have a composition that includes: silver, platinum, palladium, aluminum, zinc, gold, iron, copper, tin, antimony, titanium, chromium, nickel, or molybdenum. In additional examples [900] of the lighting system, the another one [910] of the pair of panel surfaces may have a light-reflective layer [1002]; and the another one [928] of the another pair of panel surfaces may have another light-reflective layer [1004]; and each of the light-reflective layers [1002], [1004] may have a minimum visible-light reflection value from any incident angle being at least about ninety percent (90%) or being at least about ninety-five percent (95%).

In examples [900] of the lighting system, the plurality of the semiconductor light-emitting devices [920], [922] may include an array of the semiconductor light-emitting devices [920], [922] being mutually spaced apart along the longitudinal axis [908]; and the another plurality of the semiconductor light-emitting devices [938], [940] may include another array of the semiconductor light-emitting devices [938], [940] being mutually spaced apart along the longitudinal axis [908]. Additionally in those examples [900] of the lighting system, the further plurality of the semiconductor light-emitting devices [956], [958] may include a further array of the semiconductor light-emitting devices [956], [958] being mutually spaced apart along the longitudinal axis [908].

In examples [900] of the lighting system, the plurality of the semiconductor light-emitting devices [920], [922] may be collectively configured for generating the visible-light emissions [924], [926] as having a selectable perceived color; and the another plurality of the semiconductor light-emitting devices [938], [940] may be collectively configured for generating the additional visible-light emissions [942], [944] as having another selectable perceived color. Additionally in those examples [900] of the lighting system, the further plurality of the semiconductor light-emitting devices [956], [958] may be collectively configured for generating the further visible-light emissions [960], [962] as having a further selectable perceived color.

In some examples [900] of the lighting system, the plurality of the semiconductor light-emitting devices [920], [922] may include a plurality of clusters of the semiconductor light-emitting devices [920], [922] being co-located together, each one of the plurality of clusters being collectively configured for generating the visible-light emissions [924], [926] as having a selectable perceived color; and the another plurality of the semiconductor light-emitting devices [938], [940] may include another plurality of clusters of the semiconductor light-emitting devices [938], [940] being co-located together, each one of the another plurality of clusters being collectively configured for generating the additional visible-light emissions [942], [944] as having another selectable perceived color. Also in that example [900] of the lighting system, the further plurality of the semiconductor light-emitting devices [956], [958] may include a further plurality of clusters of the semiconductor light-emitting devices [956], [958] being co-located together, each one of the further plurality of clusters being collectively configured for generating the further visible-light emissions [960], [962] as having a further selectable perceived color. As an example [900] of the lighting system, each of the pluralities of clusters of the semiconductor light-emitting devices [920], [922], [938], [940], [956], [958] may include two or three or more co-located semiconductor light-emitting devices being configured for collectively generating the visible-light emissions [924], [926] and the additional visible-light emissions [942], [944] and the further visible-light emissions [960], [962] as having the respective selectable perceived colors.

In examples [900] of the lighting system, a plurality of semiconductor light-emitting devices [920], [922], or a plurality of semiconductor light-emitting devices [938], [940], or a plurality of semiconductor light-emitting devices [956], [958] may be arranged in a chip-on-board (not shown) array, or in a discrete (not shown) array on a printed circuit board (not shown). Semiconductor light-emitting device arrays including chip-on-board arrays and discrete arrays may be conventionally fabricated by persons of ordinary skill in the art. Further, the semiconductor light-emitting devices [920], [922], [938], [940], [956], [958] of the example [900] of the lighting system may be provided with drivers (not shown) and power supplies (not shown) being conventionally fabricated and configured by persons of ordinary skill in the art.

In examples [900], the lighting system may be configured for causing emission of a portion of the further visible-light emissions [960], [962] as being within a field angle of the bowl reflector [906] and for causing emission of another portion of the further visible-light emissions [960], [962] as being outside the field angle of the bowl reflector [906]; and the emission aperture [964] may be configured for redirecting some of the another portion of the further visible-light emissions [960], [962]. Further in those examples [900] of the lighting system, the bowl reflector [906] may, as examples, have a beam angle being within a range of between about thirty degrees (30°) and about ten degrees (10°). Additionally in those examples [900] of the lighting system, the bowl reflector [906] may, as examples have a field angle being within a range of between about sixty degrees (60°) and about twenty degrees (20°).

In examples [900] of the lighting system, the emission aperture [964] may be positioned for redirecting a part of the another portion of the further visible-light emissions [960], [962] being emitted at the third light output interface [948] in directions deviating from the central light-emission axis [946] by greater than about seventy degrees (70°). In further examples [900] of the lighting system, the emission aperture [964] may be positioned for redirecting a part of the another portion of the further visible-light emissions [960], [962] being emitted at the third light output interface [948] in directions deviating from the central light-emission axis [946] by greater than about sixty degrees (60°).

As an example [900] of the lighting system, the lateral edges [978], [980], [982], [984] of the edge-lit lightguide panels [902], [904] may be curvilinear; and the one [912] of the pair of panel surfaces may be concave; and the one [930] of the another pair of panel surfaces may be concave. Further in that example [900] of the lighting system, as can be seen in FIG. 10, the concave panel surfaces [912], [930] of the emission aperture [964] may be cooperatively positioned for mechanically shielding and thus redirecting some of the further visible-light emissions [960], [962] being emitted at the third light output interface [948] in directions deviating from the central light-emission axis [946] by greater than about sixty degrees (60°). Additionally in that example [900] of the lighting system, redirection of the visible-light emissions [960], [962] being emitted at the third light output interface [948] in high-angle directions being greater than about sixty degrees (60°) or seventy degrees (70°) may substantially reduce objectionable glare.

In examples [900] of the lighting system, the bowl reflector [906] may have a beam angle being within a range of between about thirty degrees (30°) and about twenty degrees (20°). Further in those examples [900] of the lighting system, the bowl reflector [906] may have a field angle being within a range of between about sixty degrees (60°) and about forty degrees (40°). Additionally in those examples [900], the lighting system may be configured for causing emission of a portion of the further visible-light emissions [960], [962] as being within the field angle of the bowl reflector [906] and for causing emission of another portion of the further visible-light emissions [960], [962] as being outside the field angle of the bowl reflector [906]; and the emission aperture [964] may be configured for redirecting some of the another portion of the further visible-light emissions [960], [962]. Further in those examples [900], the emission aperture [964] may be positioned for redirecting a part of the another portion of the further visible-light emissions [960], [962] being emitted at the third light output interface [948] in directions deviating from the central light-emission axis [946] by greater than about sixty degrees (60°), or deviating from the central light-emission axis by greater than about seventy degrees (70°).

In other examples [900] of the lighting system, the bowl reflector [906] may have a beam angle being within a range of between about twenty degrees (20°) and about ten degrees (10°); or within a range of between about fifteen degrees (15°) and about ten degrees (10°). Further in those examples [900] of the lighting system, the bowl reflector [906] may have a field angle being respectively within a range of between about forty degrees (40°) and about twenty degrees (20°), or within a range of between about thirty degrees (30°) and about twenty degrees (20°). Further in those examples [900] of the lighting system, the third light output interface [948] may include internal or external light-dispersing features; and the third light output interface [948] may cause the bowl reflector [906] to have an effective field angle being within a range of between about sixty degrees (60°) and about forty degrees (40°). Additionally in those examples [900], the lighting system may be configured for causing emission of a portion of the further visible-light emissions [960], [962] as being within the effective field angle of the bowl reflector [906] and for causing emission of another portion of the further visible-light emissions [960], [962] as being outside the effective field angle of the bowl reflector [906]; and the emission aperture [964] may be configured for redirecting some of the another portion of the further visible-light emissions [960], [962]. Further in those examples [900], the emission aperture [964] may be positioned for redirecting a part of the another portion of the further visible-light emissions [960], [962] being emitted at the third light output interface [948] in directions deviating from the central light-emission axis [946] by greater than about sixty degrees (60°), or deviating from the central light-emission axis by greater than about seventy degrees (70°).

In examples [900], the lighting system may include a controller (not shown) for the visible-light source [918] and for the another visible-light source [936] and for the further visible-light source [954], the controller being configured for causing the visible-light emissions [924], [926] to have a selectable perceived color and for causing the additional visible-light emissions [942], [944] to have another selectable perceived color and for causing the further visible-light emissions [960], [962] to have a further selectable perceived color. Further in those examples [900] of the lighting system, the controller may be configured for causing the visible-light emissions [924], [926] to have a selectable and adjustable intensity and for causing the additional visible-light emissions [942], [944] to have another selectable and adjustable intensity and for causing the further visible-light emissions [960], [962] to have a further selectable and adjustable intensity. Additionally in those examples [900] of the lighting system, the controller may be configured for causing the combined visible-light emissions [966], [968] to generate a down-lighting pattern being: wall graze, table with wall fill, wall wash left, wall wash right, double wall wash, wall wash left plus floor, wall wash right plus floor, room, or batwing. Also in those examples [900] of the lighting system, the controller may be configured for selection among a plurality of different pre-programmed combinations of the intensities for the visible-light emissions [924], [926], the additional visible-light emissions [942], [944], and the further visible-light emissions [960], [962]. Further in those examples [900] of the lighting system, the controller may be configured for adjusting, over a selectable time period, the intensities for the visible-light emissions [924], [926], the additional visible-light emissions [942], [944], and the further visible-light emissions [960], [962] from a one of the plurality of pre-programmed combinations to another one of the plurality of pre-programmed combinations. Additionally in those examples [900], the lighting system may further include an ambient light sensor (not shown); and the controller may be configured, in response to the ambient light sensor, for adjusting the intensities for the visible-light emissions [924], [926], the additional visible-light emissions [942], [944], and the further visible-light emissions [960], [962].

In other examples [900], the lighting system may include a controller (not shown) for the visible-light source [918] being configured for causing the visible-light emissions [924], [926] to have a selectable perceived color; and may include another controller (not shown) for the another visible-light source [936] being configured for causing the additional visible-light emissions [942], [944] to have another selectable perceived color; and may include a further controller (not shown) for the further visible-light source [954] being configured for causing the further visible-light emissions [960], [962] to have a further selectable perceived color. Further in those examples [900] of the lighting system, the controller may be configured for causing the visible-light emissions [924], [926] to have a selectable and adjustable intensity; and the another controller may be configured for causing the additional visible-light emissions [942], [944] to have another selectable and adjustable intensity; and the further controller may be configured for causing the further visible-light emissions [960], [962] to have a further selectable and adjustable intensity. In those examples [900] of the lighting system, the controller and the another controller and the further controller may be collectively configured for causing the combined visible-light emissions [966], [968] to generate a down-lighting pattern being: wall graze, table with wall fill, wall wash left, wall wash right, double wall wash, wall wash left plus floor, wall wash right plus floor, room, or batwing. Additionally in those examples [900] of the lighting system, the controller and the another controller and the further controller may be collectively configured for selection among a plurality of different pre-programmed combinations of the intensities for the visible-light emissions [924], [926], the additional visible-light emissions [942], [944], and the further visible-light emissions [960], [962]. Further in those examples [900] of the lighting system, the controller and the another controller and the further controller may be collectively configured for adjusting, over a selectable time period, the intensities for the visible-light emissions [924], [926], the additional visible-light emissions [942], [944], and the further visible-light emissions [960], [962] from a one of the plurality of pre-programmed combinations to another one of the plurality of pre-programmed combinations. In those examples [900], the lighting system may also include an ambient light sensor; and the controller and the another controller and the further controller may be collectively configured, in response to the ambient light sensor, for adjusting the intensities for the visible-light emissions [924], [926], the additional visible-light emissions [942], [944], and the further visible-light emissions [960], [962].

Figure 13:
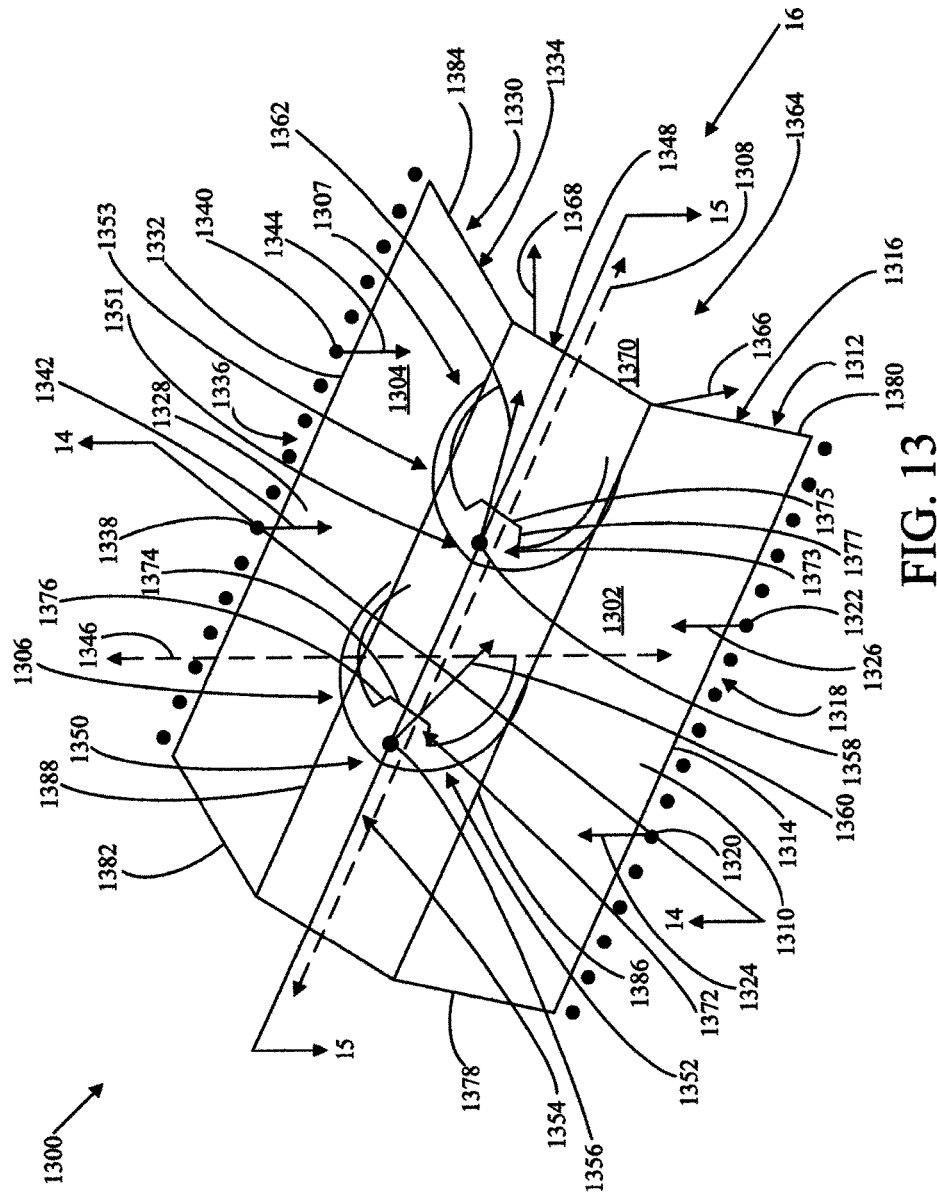
FIG. 13 is a schematic top perspective view showing an example [1300] of an implementation of a lighting system.
Figure 14:
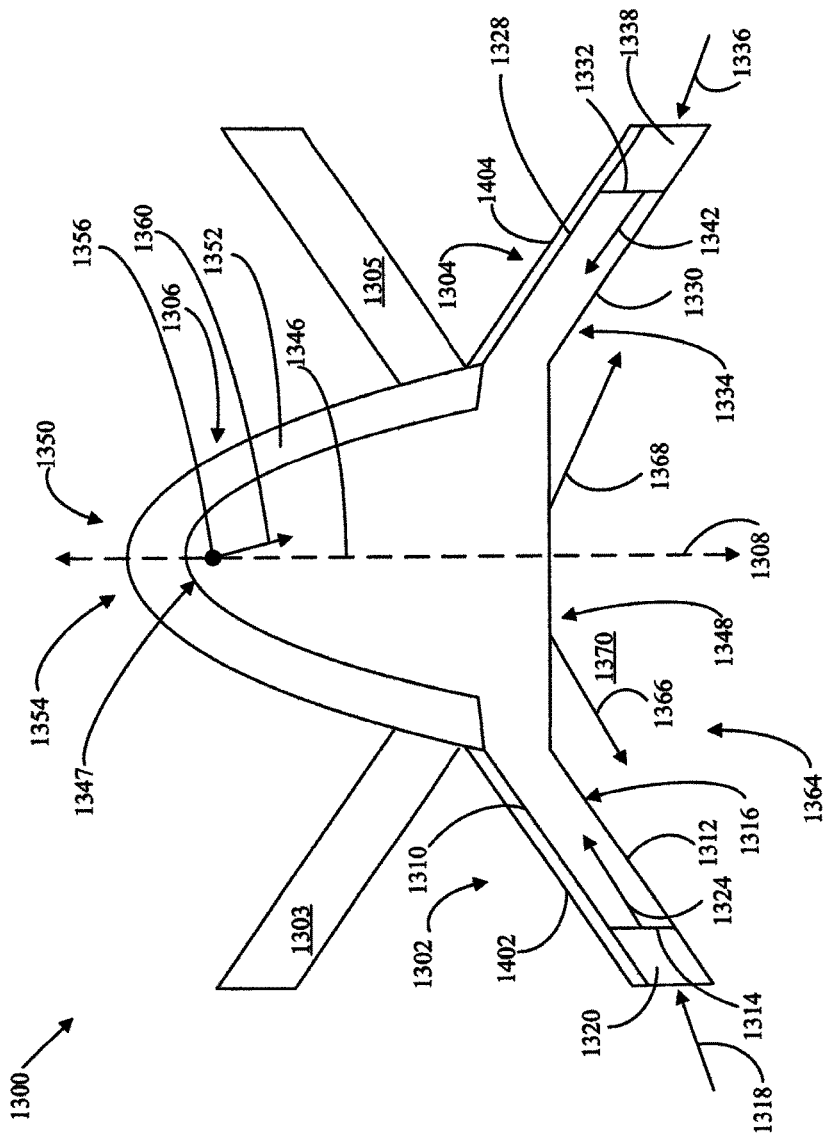
FIG. 14 is a schematic cross-sectional view taken along the line 14-14 showing the example [1300] of the lighting system.
Figure 15:
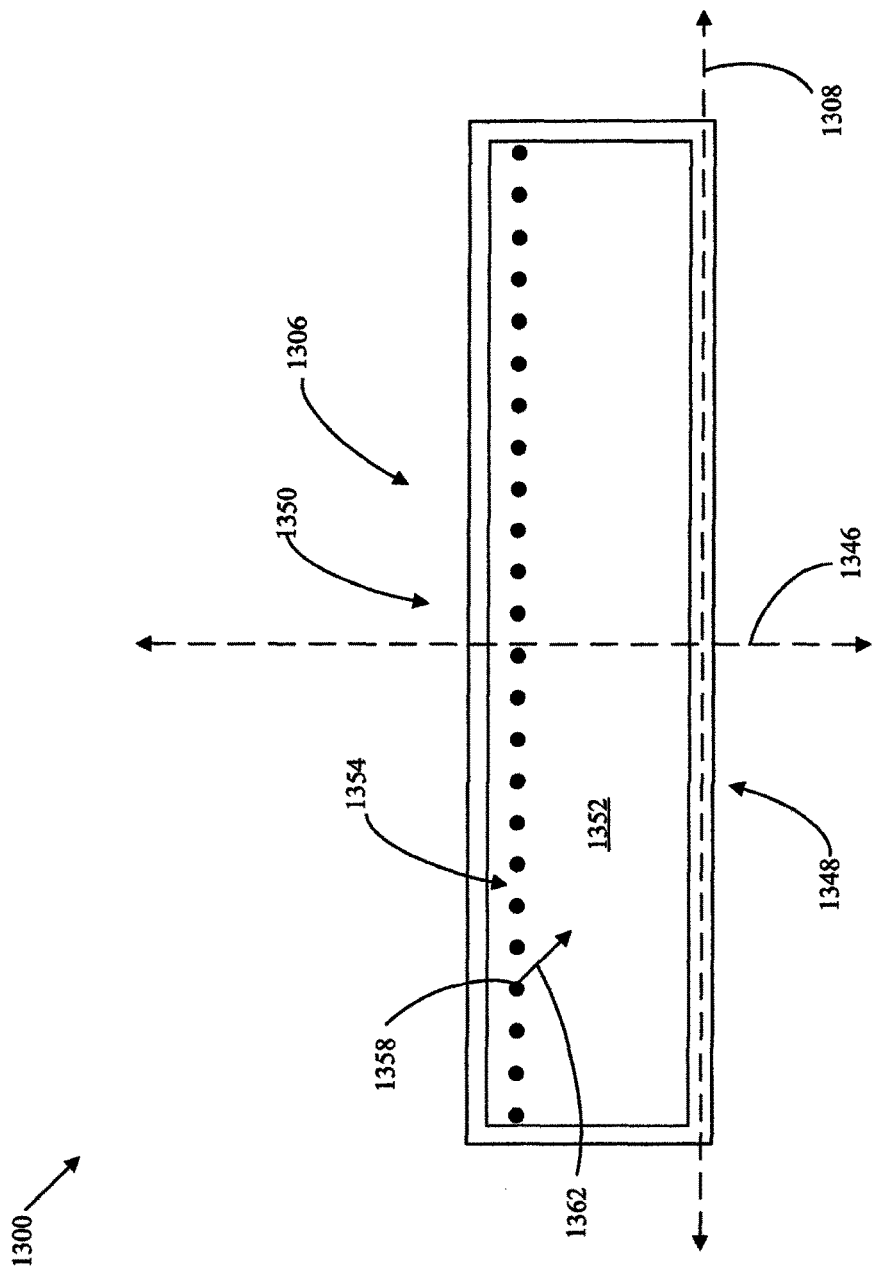
FIG. 15 is a schematic cross-sectional view taken along the line 15-15 showing the example [1300] of the lighting system.
Figure 16:
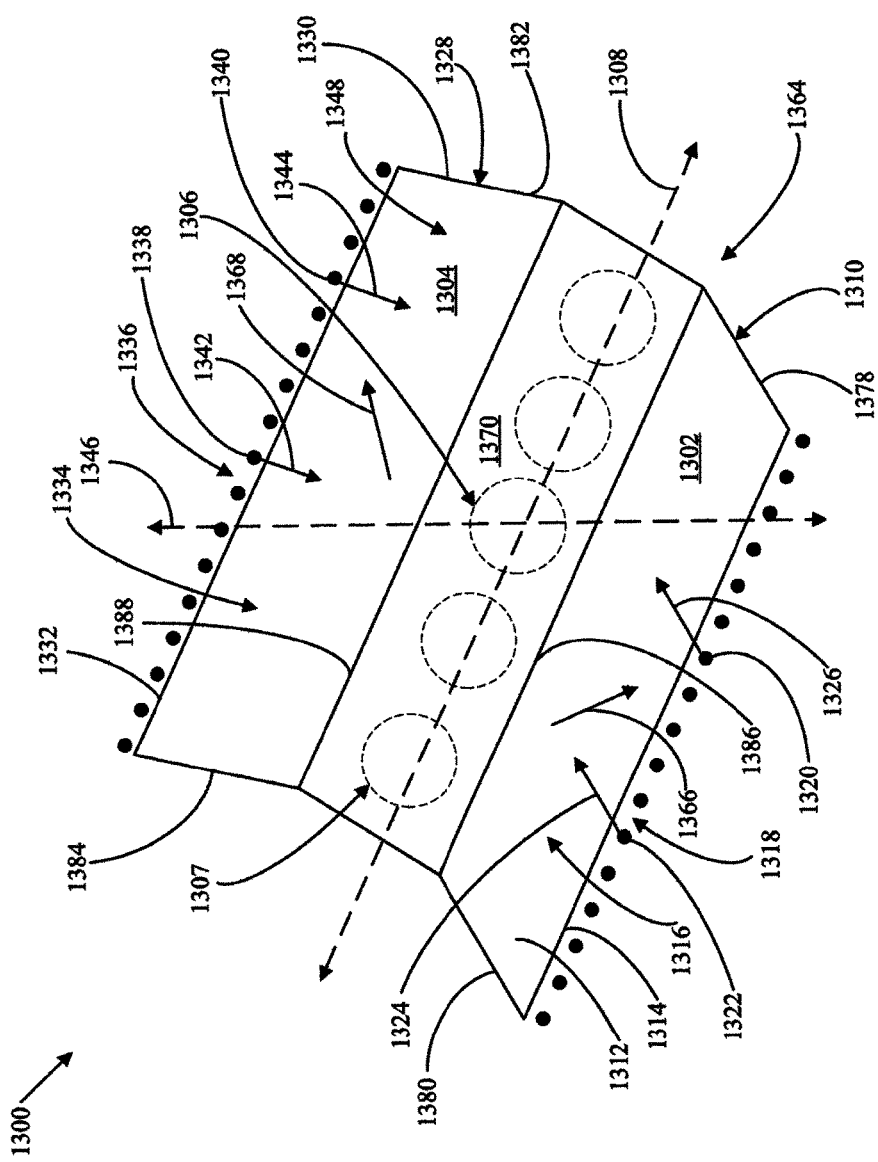
FIG. 16 is a schematic bottom perspective view taken along the line 16 showing the example [1300] of an implementation of a lighting system.

FIG. 13 is a schematic top perspective view showing an example [1300] of an implementation of a lighting system. FIG. 14 is a schematic cross-sectional view taken along the line 14-14 showing the example [1300] of the lighting system. FIG. 15 is a schematic cross-sectional view taken along the line 15-15 showing the example [1300] of the lighting system. FIG. 16 is a schematic bottom perspective view taken along the line 16 showing the example [1300] of an implementation of a lighting system. Another example [100] of an implementation of the lighting system was discussed in connection with FIGS. 1-4. A further example [500] of an implementation of the lighting system was discussed in connection with FIGS. 5-8. An additional example [900] of an implementation of the lighting system was discussed in connection with FIGS. 9-12. It is understood throughout this specification that the example [1300] of an implementation of the lighting system may be modified as including any of the features or combinations of features that are disclosed in connection with: the example [100] of an implementation of the lighting system; and the further example [500] of an implementation of the lighting system; and the additional example [900] of an implementation of the lighting system. Accordingly, FIGS. 1-12 and the entireties of the discussions of the examples [100], [500], [900] of implementations of the lighting system are hereby incorporated into the following discussion of the example [1300] of an implementation of the lighting system.

As shown in FIGS. 13-16, the example [1300] of the implementation of the lighting system includes: an edge-lit lightguide panel [1302]; another edge-lit lightguide panel

[1304]; a bowl reflector [1306]; and an additional bowl reflector [1307]. In the example [1300], the edge-lit lightguide panel [1302] is extended along a longitudinal axis [1308] of the lighting system. The edge-lit lightguide panel [1302] in the example [1300] of the lighting system further has a pair of mutually-opposing panel surfaces [1310], [1312]. The edge-lit lightguide panel [1302] in the example [1300] of the lighting system also has a peripheral edge [1314] being extended along and spaced transversely away from the longitudinal axis [1308]. In the example [1300] of the lighting system, a one [1312] of the pair of panel surfaces includes a first light output interface [1316].

The example [1300] of the lighting system also includes a visible-light source [1318] including a plurality of semiconductor light-emitting devices [1320], [1322]. In the example [1300] of the lighting system, the visible-light source [1318] is configured for generating visible-light emissions [1324], [1326] from the plurality of semiconductor light-emitting devices [1320], [1322]. Further in the example [1300] of the lighting system, the visible-light source [1318] is located along the peripheral edge [1314] for directing the visible-light emissions [1324], [1326] into the edge-lit lightguide panel [1302].

In the example [1300] of the lighting system, the another edge-lit lightguide panel [1304] is extended along the longitudinal axis [1308]. Additionally in the example [1300] of the lighting system, the another edge-lit lightguide panel [1304] has another pair of mutually-opposing panel surfaces [1328], [1330]. In the example [1300] of the lighting system, the another edge-lit lightguide panel [1304] has another peripheral edge [1332] being extended along and spaced transversely away from the longitudinal axis [1308]. Further, a one [1330] of the another pair of panel surfaces in the example [1300] of the lighting system includes a second light output interface [1334].

The example [1300] of the lighting system additionally includes another visible-light source [1336] including another plurality of semiconductor light-emitting devices [1338], [1340]. In the example [1300] of the lighting system, the another visible-light source [1336] is configured for generating additional visible-light emissions [1342], [1344] from the another plurality of semiconductor light-emitting devices [1338], [1340]. Further in the example [1300] of the lighting system, the another visible-light source [1336] is located along the another peripheral edge [1332] for directing the additional visible-light emissions [1342], [1344] into the another edge-lit lightguide panel [1304].

In the example [1300] of the lighting system, the bowl reflector [1306] has a central light-emission axis [1346] being transverse to the longitudinal axis [1308]. The bowl reflector [1306] in the example [1300] of the lighting system includes a third light output interface [1348] being located between the first and second light output interfaces [1316], [1334]. In the example [1300] of the lighting system, the third light output interface [1348] is spaced apart from a central light input interface [1350] by a visible-light-reflective side surface [1352]. The visible-light-reflective side surface [1352] in the example [1300] of the lighting system is extended along the central light-emission axis [1346] and defines a portion of a cavity [1347]. In the example [1300] of the lighting system, the bowl reflector [1306] has a further visible-light source [1354] including a further plurality of semiconductor light-emitting devices [1356], [1358]. The further visible-light source [1354] in the example [1300] of the lighting system is configured for generating further visible-light emissions [1360], [1362] from the further plurality of semiconductor light-emitting devices [1356], [1358]. In the example [1300] of the lighting system, the further visible-light source [1354] is located at the central light input interface [1350] for directing the further visible-light emissions [1360], [1362] through the cavity [1347] of the bowl reflector [1306] to the third light output interface [1348].

In the example [1300] of the lighting system, the additional bowl reflector [1307] has an additional central light-emission axis [1347] being transverse to the longitudinal axis [1308]. The additional bowl reflector [1307] in the example [1300] of the lighting system includes a fourth light output interface [1349] being spaced apart along the longitudinal axis [1308] away from the third light output interface [1348] and being located between the first and second light output interfaces [1316], [1334]. In the example [1300] of the lighting system, the fourth light output interface [1349] is spaced apart from an additional central light input interface [1351] by an additional visible-light-reflective side surface [1353]. The additional visible-light-reflective side surface [1353] in the example [1300] of the lighting system is extended along the additional central light-emission axis [1347] and defines a portion of an additional cavity [1347]. In the example [1300] of the lighting system, the additional bowl reflector [1307] has an additional visible-light source [1355] including an additional plurality of semiconductor light-emitting devices [1357], [1359]. The additional visible-light source [1355] in the example [1300] of the lighting system is configured for generating other visible-light emissions [1361], [1363] from the additional plurality of semiconductor light-emitting devices [1357], [1359]. In the example [1300] of the lighting system, the additional visible-light source [1355] is located at the additional central light input interface [1351] for directing the other visible-light emissions [1361], [1363] through the additional cavity [1347] of the additional bowl reflector [1307] to the fourth light output interface [1349].

As examples, the edge-lit lightguide panel [1302] may direct the visible-light emissions [1324], [1326] for emission from the first light output interface [1316]; and the another edge-lit lightguide panel [1304] may direct the additional visible-light emissions [1342], [1344] for emission from the second light output interface [1334]; and the bowl reflector [1306] may direct the further visible-light emissions [1360], [1362] for emission from the third light output interface [1348]; and the additional bowl reflector [1307] may direct the other visible-light emissions [1361], [1363] for emission from the fourth light output interface [1349].

In the example [1300] of the lighting system, the first, second, third and fourth light output interfaces [1316], [1334], [1348], [1349] cooperatively define an emission aperture [1364] for forming combined visible-light emissions [1366], [1368] including the visible-light emissions [1324], [1326], the additional visible-light emissions [1342], [1344], the further visible-light emissions [1360], [1362], and the other visible-light emissions [1361], [1363]. Further in the example [1300] of the lighting system, the emission aperture [1364] forms a shielding zone [1370] for redirecting some of the combined visible-light emissions [1366], [1368].

In examples [1300] of the lighting system, the visible-light-reflective side surface [1352] and the additional visible-light-reflective side surface [1353] each may have a frusto-conical cross-sectional profile in both of the directions of the lines 14-14 and 15-15 being perpendicular to the longitudinal axis [1308]. In further examples [1300] of the lighting system, the additional bowl reflector [1307] may have any combination of the further structural and performance features discussed herein with regard to the bowl reflector [1306]. As additional examples [1300], the lighting system may include (not shown) further bowl reflectors in addition to the bowl reflectors [1306], [1307]. In examples [1300] of the lighting system, such further bowl reflectors may have any combination of the further structural and performance features discussed herein with regard to the bowl reflectors [1306] and [1307], and may be mutually spaced apart in the same manner by which the bowl reflectors [1306], [1307] are spaced apart along the longitudinal axis [1308].

In some examples [1300] of the lighting system, the bowl reflector [1306] (and likewise the additional bowl reflector [1307]) may be a converging bowl reflector [1306] being configured for causing convergence of the further visible-light emissions [1360], [1362] in their travel along the central light-emission axis [1346] toward the third light output interface [1348]. In examples [1300] of the lighting system, the visible-light-reflective side surface [1352] of the bowl reflector [1306] may be configured for reflecting the further visible-light emissions [1360], [1362] toward a horizon [1363] of the bowl reflector [1306] as having a beam angle being within a range of between about ten degrees (10°) and about thirty degrees (30°). As further examples [1300] of the lighting system, the visible-light-reflective side surface [1352] of the bowl reflector [1306] may be configured for reflecting the further visible-light emissions [1360], [1362] toward a horizon [1363] of the bowl reflector [1306] as having a field angle being within a range of between about twenty degrees (20°) and about sixty degrees (60°).

As additional examples [1300] of the lighting system, the visible-light-reflective side surface [1352] of the bowl reflector [1306] (and likewise of the additional bowl reflector [1307]) may be a specular light-reflective surface. In further examples [1300] of the lighting system, the visible-light-reflective side surface [1352] of the bowl reflector [1306] (and likewise the additional bowl reflector [1307]) may be a metallic light-reflective surface. In some of those examples [1300] of the lighting system, the metallic layer of the visible-light-reflective side surface [1352] may have a composition that includes: silver, platinum, palladium, aluminum, zinc, gold, iron, copper, tin, antimony, titanium, chromium, nickel, or molybdenum.

In examples [1300] of the lighting system, the visible-light-reflective side surface [1352] of the bowl reflector [1306] (and likewise of the additional bowl reflector [1307]) may have a minimum visible-light reflection value from any incident angle being: at least about ninety percent (90%); or at least about ninety-five percent (95%). As further examples [1300] of the lighting system, the visible-light-reflective side surface [1352] of the bowl reflector [1306] may have a maximum visible-light transmission value from any incident angle being: no greater than about ten percent (10%); or no greater than about five percent (5%).

In examples [1300] of the lighting system, a portion of the visible-light-reflective side surface [1352] of the bowl reflector [1306] (and likewise of the additional bowl reflector [1307]) may be a parabolic surface. In further examples [1300] of the lighting system, a portion of the visible-light-reflective side surface [1352] of the bowl reflector [1306] (and likewise of the additional bowl reflector [1307]) may be a part of an elliptic paraboloid or a part of a paraboloid of revolution.

As further examples [1300] of the lighting system, a portion of the visible-light-reflective side surface [1352] of the bowl reflector [1306] (and likewise of the additional bowl reflector [1307]) may be a multi-segmented parabolic surface. In additional examples [1300] of the lighting system, the visible-light-reflective side surface [1352] may include a plurality of vertically-faceted sections being mutually spaced apart around and joined together around the central light-emission axis [1346]. Also in those additional examples [1300] of the lighting system, each one of the vertically-faceted sections may have a generally pie-wedge-shaped perimeter. Further in those additional examples [1300] of the lighting system, each one of the vertically-faceted sections may form a one of a plurality of facets of the visible-light-reflective side surface [1352]; and each one of the facets may have a concave visible-light reflective surface [1352]. Also in those additional examples [1300] of the lighting system, each one of the vertically-faceted sections may form a one of a plurality of facets of the visible-light-reflective side surface [1352]; and each one of the facets may have a convex visible-light reflective surface [1352]. Further in those additional examples [1300] of the lighting system, each one of the vertically-faceted sections may form a one of a plurality of facets of the visible-light-reflective side surface [1352]; and each one of the facets may have a generally flat visible-light reflective surface. As further examples [1300] of the lighting system, either or both of the bowl reflectors [1306], [1307], and any further such bowl reflectors included in the example [1300] of the lighting system, may be substituted by a lighting system as is disclosed in commonly-owned Xin Zhang et al., Patent Cooperation Treaty International patent application serial No. PCT/US2018/016662 filed on Feb. 2, 2018 and entitled "Lighting Systems Generating Partially-Collimated Light Emissions," the entirety of which hereby is incorporated herein by reference.

In some examples [1300] of the lighting system, the edge-lit lightguide panel [1302] may have a first pair of lateral edges [1378], [1380] being mutually spaced apart along the longitudinal axis [1308]; and the another edge-lit lightguide panel [1304] may have a second pair of lateral edges [1382], [1384] being mutually spaced apart along the longitudinal axis [1308]. Further in those examples [1300] of the lighting system, each one of the lateral edges [1378], [1380], [1382], [1384] may be linear; and the one [1312] of the pair of panel surfaces may be generally flat; and the one [1330] of the another pair of panel surfaces may be generally flat.

In additional examples [1300] of the lighting system, the edge-lit lightguide panel [1302] may be configured for directing the visible-light emissions [1324], [1326] in first directions towards the longitudinal axis [1308]; and the another edge-lit lightguide panel [1304] may be configured for directing the additional visible-light emissions [1342], [1344] in second directions, being symmetrically opposed to the first directions, towards the longitudinal axis [1308]. In those additional examples, the edge-lit lightguide panel [1302] may further direct the visible-light emissions [1324], [1326] for emission from the first light output interface [1316]; and the another edge-lit lightguide panel [1304] may further direct the additional visible-light emissions [1342], [1344] for emission from the second light output interface [1334]; and the bowl reflector [1306] may direct the further visible-light emissions [1360], [1362] for emission from the third light output interface [1348]; and the another bowl reflector [1307] may direct the other visible-light emissions [1361], [1363] for emission from the fourth light output interface [1349].

In some examples [1300] of the lighting system, the edge-lit lightguide panel [1302] and the another edge-lit lightguide panel [1304] may be integrally formed together with the bowl reflectors [1306], [1307]. In other examples [1300] of the lighting system, the edge-lit lightguide panel [1302] may have a central edge represented by a dashed line [1386] being extended along the longitudinal axis [1308] and being spaced transversely away from the peripheral edge [1314]; and the another edge-lit lightguide panel [1304] may have another central edge represented by a dashed line [1388] being extended along the longitudinal axis [1308] and being spaced transversely away from the another peripheral edge [1332]; and the bowl reflectors [1306], [1307] may be located between and attached to the central edge [1386] and the another central edge [1388].

In examples [1300] of the lighting system, the edge-lit lightguide panel [1302] may include internal light-dispersing features; and the another edge-lit lightguide panel [1304] may include additional internal light-dispersing features. Further in those examples [1300] of the lighting system, the internal light-dispersing features may include positive elements such as: particles having various shapes being e.g. spheroidal or polygonal; particles having various material compositions including, e.g., phosphors, quantum dots, and pigmented dots; micro-optical features such as spherical or elliptical lenses, and reflective micro-scale particles. Additionally in those examples [1300] of the lighting system, the internal light-dispersing features may include negative elements such as: hot-pressed micro-patterns e.g. micro-grooves, lenticular patterns, prisms, fresnels, conical arrays, pyramids, or domes. Also in those examples [1300] of the lighting system, the internal light-dispersing features may have a gradually-increasing density in a direction from the peripheral edge [1314] towards the longitudinal axis [1308]; and the additional internal light-dispersing features may have a gradually-increasing density in another direction from the another peripheral edge [1332] towards the longitudinal axis [1308].

In examples [1300] of the lighting system, the edge-lit lightguide panel [1302] may include external light-dispersing features on the one [1312] or the another one [1310] of the pair of panel surfaces; and the another edge-lit lightguide panel [1304] may include additional external light-dispersing features on the one [1330] or the another one [1328] of the another pair of panel surfaces. Further in those examples [1300] of the lighting system, the external light-dispersing features may include positive elements such as: pigmented dots; or micro-optical features such as spherical or elliptical lenses. Also in those examples [1300] of the lighting system, the external light-dispersing features may include negative elements such as: hot-pressed textured surfaces such as micro-patterns e.g. micro-grooves, lenticular patterns, prisms, fresnels, conical arrays, pyramids, domes, or laser-ablated regions. In addition in those examples [1300] of the lighting system, the external light-dispersing features may have a gradually-increasing density in a direction from the peripheral edge [1314] towards the longitudinal axis [1308]; and the additional external light-dispersing features may have a gradually-increasing density in another direction from the another peripheral edge [1332] towards the longitudinal axis [1308].

In examples [1300] of the lighting system, the another one [1310] of the pair of panel surfaces may have a light-reflective layer [1402]; and the another one [1328] of the another pair of panel surfaces may have another light-reflective layer [1404]. Further in those examples [1300] of the lighting system, the another one [1310] of the pair of panel surfaces may have a specular light-reflective layer [1402]; and the another one [1328] of the another pair of panel surfaces may have another specular light-reflective layer [1404]. Additionally in those examples [1300] of the lighting system, the another one [1310] of the pair of panel surfaces may have a metallic light-reflective layer [1402]; and the another one [1328] of the another pair of panel surfaces may have another metallic light-reflective layer [1404]. In some of those examples [1300] of the lighting system, the metallic light-reflective layers [1402], [1404] may have a composition that includes: silver, platinum, palladium, aluminum, zinc, gold, iron, copper, tin, antimony, titanium, chromium, nickel, or molybdenum. In additional examples [1300] of the lighting system, the another one [1310] of the pair of panel surfaces may have a light-reflective layer [1402]; and the another one [1328] of the another pair of panel surfaces may have another light-reflective layer [1404]; and each of the light-reflective layers [1402], [1404] may have a minimum visible-light reflection value from any incident angle being at least about ninety percent (90%) or being at least about ninety-five percent (95%).

In examples [1300] of the lighting system, the plurality of the semiconductor light-emitting devices [1320], [1322] may include an array of the semiconductor light-emitting devices [1320], [1322] being mutually spaced apart along the longitudinal axis [1308]; and the another plurality of the semiconductor light-emitting devices [1338], [1340] may include another array of the semiconductor light-emitting devices [1338], [1340] being mutually spaced apart along the longitudinal axis [1308]. Additionally in those examples [1300] of the lighting system, the further plurality of the semiconductor light-emitting devices [1356], [1358] may include a further array of the semiconductor light-emitting devices [1356], [1358] being mutually spaced apart along the longitudinal axis [1308]. Further in those examples [1300] of the lighting system, the additional plurality of the semiconductor light-emitting devices [1357], [1359] may include an additional array of the semiconductor light-emitting devices [1357], [1359] being mutually spaced apart along the longitudinal axis [1308].

In examples [1300] of the lighting system, the plurality of the semiconductor light-emitting devices [1320], [1322] may be collectively configured for generating the visible-light emissions [1324], [1326] as having a selectable perceived color; and the another plurality of the semiconductor light-emitting devices [1338], [1340] may be collectively configured for generating the additional visible-light emissions [1342], [1344] as having another selectable perceived color. Additionally in those examples [1300] of the lighting system, the further plurality of the semiconductor light-emitting devices [1356], [1358] may be collectively configured for generating the further visible-light emissions [1360], [1362] as having a further selectable perceived color. Further in those examples [1300] of the lighting system, the additional plurality of the semiconductor light-emitting devices [1357], [1359] may be collectively configured for generating the other visible-light emissions [1361], [1363] as having an other selectable perceived color.

In some examples [1300] of the lighting system, the plurality of the semiconductor light-emitting devices [1320], [1322] may include a plurality of clusters of the semiconductor light-emitting devices [1320], [1322] being co-located together, each one of the plurality of clusters being collectively configured for generating the visible-light emissions [1324], [1326] as having a selectable perceived color; and the another plurality of the semiconductor light-emitting devices [1338], [1340] may include another plurality of clusters of the semiconductor light-emitting devices [1338], [1340] being co-located together, each one of the another plurality of clusters being collectively configured for generating the additional visible-light emissions [1342], [1344] as having another selectable perceived color. Also in that example [1300] of the lighting system, the further plurality of the semiconductor light-emitting devices [1356], [1358] may include a further plurality of clusters of the semiconductor light-emitting devices [1356], [1358] being co-located together, each one of the further plurality of clusters being collectively configured for generating the further visible-light emissions [1360], [1362] as having a further selectable perceived color. Additionally in that example [1300] of the lighting system, the additional plurality of the semiconductor light-emitting devices [1357], [1359] may include an additional plurality of clusters of the semiconductor light-emitting devices [1357], [1359] being co-located together, each one of the additional plurality of clusters being collectively configured for generating the other visible-light emissions [1361], [1363] as having an other selectable perceived color.

As an example [1300] of the lighting system, each of the pluralities of clusters of the semiconductor light-emitting devices [1320], [1322], [1338], [1340], [1356], [1358], [1357], [1359] may include two or three or more co-located semiconductor light-emitting devices being configured for collectively generating the visible-light emissions [1324], [1326] and the additional visible-light emissions [1342], [1344] and the further visible-light emissions [1360], [1362] and the other visible-light emissions [1361], [1363] as having the respective selectable perceived colors.

In examples [1300] of the lighting system, a plurality of semiconductor light-emitting devices [1320], [1322], or a plurality of semiconductor light-emitting devices [1338], [1340], or a plurality of semiconductor light-emitting devices [1356], [1358], or a plurality of semiconductor light-emitting devices [1357], [1359], may be arranged in a chip-on-board (not shown) array, or in a discrete (not shown) array on a printed circuit board (not shown). Semiconductor light-emitting device arrays including chip-on-board arrays and discrete arrays may be conventionally fabricated by persons of ordinary skill in the art. Further, the semiconductor light-emitting devices [1320], [1322], [1338], [1340], [1356], [1358], [1357], [1359] of the example [1300] of the lighting system may be provided with drivers (not shown) and power supplies (not shown) being conventionally fabricated and configured by persons of ordinary skill in the art.

In examples [1300], the lighting system may be configured for causing emission of a portion of the further visible-light emissions [1360], [1362] (and likewise the other visible-light emissions [1361], [1363]) as being within a field angle of the bowl reflector [1306] (or likewise of the bowl reflector [1307]) and for causing emission of another portion of the further visible-light emissions [1360], [1362] as being outside the field angle of the bowl reflector [1306]; and the emission aperture [1364] may be configured for redirecting some of the another portion of the further visible-light emissions [1360], [1362]. Further in those examples [1300] of the lighting system, the bowl reflector [1306] may, as examples, have a beam angle being within a range of between about thirty degrees (30°) and about ten degrees (10°). Additionally in those examples [1300] of the lighting system, the bowl reflector [1306] may, as examples have a field angle being within a range of between about sixty degrees (60°) and about twenty degrees (20°).

In examples [1300] of the lighting system, the emission aperture [1364] may be positioned for redirecting a part of the another portion of the further visible-light emissions [1360], [1362] (or likewise of the other visible-light emissions [1361], [1363]) being emitted at the third light output interface [1348] in directions deviating from the central light-emission axis [1346] by greater than about seventy degrees (70°). In further examples [1300] of the lighting system, the emission aperture [1364] may be positioned for redirecting a part of the another portion of the further visible-light emissions [1360], [1362] being emitted at the third light output interface [1348] in directions deviating from the central light-emission axis [1346] by greater than about sixty degrees (60°).

As an example [1300] of the lighting system, the lateral edges [1378], [1380], [1382], [1384] of the edge-lit light-guide panels [1302], [1304] may be linear; and the one [1312] of the pair of panel surfaces may be generally flat; and the one [1330] of the another pair of panel surfaces may be generally flat. Further in that example [1300] of the lighting system, as can be seen in FIG. 14, the flat panel surfaces [1312], [1330] of the emission aperture [1364] may be cooperatively positioned for mechanically shielding and thus redirecting some of the further visible-light emissions [1360], [1362] being emitted at the third light output interface [1348] in directions deviating from the central light-emission axis [1346] by greater than about sixty degrees (60°). Additionally in that example [1300] of the lighting system, redirection of the visible-light emissions [1360], [1362] being emitted at the third light output interface [1348] in high-angle directions being greater than about sixty degrees (60°) or seventy degrees (70°) may substantially reduce objectionable glare.

In examples [1300] of the lighting system, the bowl reflector [1306] (or likewise the additional bowl reflector [1307]) may have a beam angle being within a range of between about thirty degrees (30°) and about twenty degrees (20°). Further in those examples [1300] of the lighting system, the bowl reflector [1306] may have a field angle being within a range of between about sixty degrees (60°) and about forty degrees (40°). Additionally in those examples [1300], the lighting system may be configured for causing emission of a portion of the further visible-light emissions [1360], [1362] as being within the field angle of the bowl reflector [1306] and for causing emission of another portion of the further visible-light emissions [1360], [1362] as being outside the field angle of the bowl reflector [1306]; and the emission aperture [1364] may be configured for redirecting some of the another portion of the further visible-light emissions [1360], [1362]. Further in those examples [1300], the emission aperture [1364] may be positioned for redirecting a part of the another portion of the further visible-light emissions [1360], [1362] being emitted at the third light output interface [1348] in directions deviating from the central light-emission axis [1346] by greater than about sixty degrees (60°), or deviating from the central light-emission axis by greater than about seventy degrees (70°).

In other examples [1300] of the lighting system, the bowl reflector [1306] (or likewise the additional bowl reflector [1307]) may have a beam angle being within a range of between about twenty degrees (20°) and about ten degrees (10°); or within a range of between about fifteen degrees (15°) and about ten degrees (10°). Further in those examples [1300] of the lighting system, the bowl reflector [1306] may have a field angle being respectively within a range of between about forty degrees (40°) and about twenty degrees (20°), or within a range of between about thirty degrees (30°) and about twenty degrees (20°). Further in those examples [1300] of the lighting system, the third light output interface [1348] may include internal or external light-dispersing features; and the third light output interface [1348] may cause the bowl reflector [1306] to have an effective field angle being within a range of between about sixty degrees (60°) and about forty degrees (40°). Additionally in those examples [1300], the lighting system may be configured for causing emission of a portion of the further visible-light emissions [1360], [1362] as being within the effective field angle of the bowl reflector [1306] and for causing emission of another portion of the further visible-light emissions [1360], [1362] as being outside the effective field angle of the bowl reflector [1306]; and the emission aperture [1364] may be configured for redirecting some of the another portion of the further visible-light emissions [1360], [1362]. Further in those examples [1300], the emission aperture [1364] may be positioned for redirecting a part of the another portion of the further visible-light emissions [1360], [1362] being emitted at the third light output interface [1348] in directions deviating from the central light-emission axis [1346] by greater than about sixty degrees (60°), or deviating from the central light-emission axis by greater than about seventy degrees (70°).

In examples [1300], the lighting system may include a controller (not shown) for the visible-light source [1318] and for the another visible-light source [1336] and for the further visible-light source [1354] and for the additional visible-light source [1355], the controller being configured for causing the visible-light emissions [1324], [1326] to have a selectable perceived color and for causing the additional visible-light emissions [1342], [1344] to have another selectable perceived color and for causing the further visible-light emissions [1360], [1362] to have a further selectable perceived color and for causing the other visible-light emissions [1361], [1363] to have an additional selectable perceived color. Further in those examples [1300] of the lighting system, the controller may be configured for causing the visible-light emissions [1324], [1326] to have a selectable and adjustable intensity and for causing the additional visible-light emissions [1342], [1344] to have another selectable and adjustable intensity and for causing the further visible-light emissions [1360], [1362] to have a further selectable and adjustable intensity and for causing the other visible-light emissions [1361], [1363] to have an additional selectable and adjustable intensity. Additionally in those examples [1300] of the lighting system, the controller may be configured for causing the combined visible-light emissions [1366], [1368] to generate a down-lighting pattern being: wall graze, table with wall fill, wall wash left, wall wash right, double wall wash, wall wash left plus floor, wall wash right plus floor, room, or batwing. Also in those examples [1300] of the lighting system, the controller may be configured for selection among a plurality of different pre-programmed combinations of the intensities for the visible-light emissions [1324], [1326], the additional visible-light emissions [1342], [1344], the further visible-light emissions [1360], [1362] and the other visible-light emissions [1361], [1363]. Further in those examples [1300] of the lighting system, the controller may be configured for adjusting, over a selectable time period, the intensities for the visible-light emissions [1324], [1326], the additional visible-light emissions [1342], [1344], the further visible-light emissions [1360], [1362] and the other visible-light emissions [1361], [1363] from a one of the plurality of pre-programmed combinations to another one of the plurality of pre-programmed combinations. Additionally in those examples [1300], the lighting system may further include an ambient light sensor (not shown); and the controller may be configured, in response to the ambient light sensor, for adjusting the intensities for the visible-light emissions [1324], [1326], the additional visible-light emissions [1342], [1344], the further visible-light emissions [1360], [1362], and the other visible-light emissions [1361], [1363].

In other examples [1300], the lighting system may include a controller (not shown) for the visible-light source [1318] being configured for causing the visible-light emissions [1324], [1326] to have a selectable perceived color; and may include another controller (not shown) for the another visible-light source [1336] being configured for causing the additional visible-light emissions [1342], [1344] to have another selectable perceived color; and may include a further controller (not shown) for the further visible-light source [1354] being configured for causing the further visible-light emissions [1360], [1362] to have a further selectable perceived color; and may include an additional controller (not shown) for the additional visible-light source [1355] being configured for causing the other visible-light emissions [1361], [1363] to have an additional selectable perceived color. Further in those examples [1300] of the lighting system, the controller may be configured for causing the visible-light emissions [1324], [1326] to have a selectable and adjustable intensity; and the another controller may be configured for causing the additional visible-light emissions [1342], [1344] to have another selectable and adjustable intensity; and the further controller may be configured for causing the further visible-light emissions [1360], [1362] to have a further selectable and adjustable intensity; and the additional controller may be configured for causing the other visible-light emissions [1361], [1363] to have an additional selectable and adjustable intensity. In those examples [1300] of the lighting system, the controller and the another controller and the further controller and the additional controller may be collectively configured for causing the combined visible-light emissions [1366], [1368] to generate a down-lighting pattern being: wall graze, table with wall fill, wall wash left, wall wash right, double wall wash, wall wash left plus floor, wall wash right plus floor, room, or batwing. Additionally in those examples [1300] of the lighting system, the controller and the another controller and the further controller and the additional controller may be collectively configured for selection among a plurality of different pre-programmed combinations of the intensities for the visible-light emissions [1324], [1326], the additional visible-light emissions [1342], [1344], the further visible-light emissions [1360], [1362]; and the other visible-light emissions [1361], [1363]. Further in those examples [1300] of the lighting system, the controller and the another controller and the further controller and the additional controller may be collectively configured for adjusting, over a selectable time period, the intensities for the visible-light emissions [1324], [1326], the additional visible-light emissions [1342], [1344], the further visible-light emissions [1360], [1362], and the other visible-light emissions [1361], [1363], from a one of the plurality of pre-programmed combinations to another one of the plurality of pre-programmed combinations. In those examples [1300], the lighting system may also include an ambient light sensor; and the controller and the another controller and the further controller and the additional controller may be collectively configured, in response to the ambient light sensor, for adjusting the intensities for the visible-light emissions [1324], [1326], the additional visible-light emissions [1342], [1344], and the further visible-light emissions [1360], [1362], and the other visible-light emissions [1361], [1363].

In other examples [1300], the lighting system may further include an auxiliary edge-lit lightguide panel [1303] and another auxiliary edge-lit lightguide panel [1305]. In those other examples [1300] of the lighting system, the auxiliary edge-lit lightguide panel [1303] may be extended along the longitudinal axis [1308]. Further in those other examples [1300] of the lighting system, the auxiliary edge-lit lightguide panel [1303] may have an auxiliary pair of mutually-opposing panel surfaces [1309], [1311]; and the auxiliary edge-lit lightguide panel [1303] may have an auxiliary peripheral edge [1313] being extended along and spaced transversely away from the longitudinal axis [1308]. Also in those other examples [1300] of the lighting system, a one [1309] of the auxiliary pair of panel surfaces may form an auxiliary light output interface [1315]. Additionally in those other examples [1300], the lighting system may have an auxiliary visible-light source [1317] including an auxiliary plurality of semiconductor light-emitting devices [1319], [1321]. In those other examples [1300] of the lighting system, the auxiliary visible-light source [1317] may be configured for generating auxiliary visible-light emissions [1323], [1325] from the auxiliary plurality of semiconductor light-emitting devices [1319], [1321]; and the auxiliary visible-light source [1317] may be located along the auxiliary peripheral edge [1313] for directing the auxiliary visible-light emissions [1323], [1325] into the auxiliary edge-lit lightguide panel [1303].

In those other examples [1300] of the lighting system, the another auxiliary edge-lit lightguide panel [1305] may be extended along the longitudinal axis [1308]. Further in those other examples [1300] of the lighting system, the another auxiliary edge-lit lightguide panel [1305] may have another auxiliary pair of mutually-opposing panel surfaces [1327], [1329]; and the another auxiliary edge-lit lightguide panel [1305] may have another auxiliary peripheral edge [1331] being extended along and spaced transversely away from the longitudinal axis [1308]. Also in those other examples [1300] of the lighting system, a one [1327] of the another auxiliary pair of panel surfaces may form another auxiliary light output interface [1333]. Additionally in those other examples [1300], the lighting system may have another auxiliary visible-light source [1335] including another auxiliary plurality of semiconductor light-emitting devices [1337], [1339]. In those other examples [1300] of the lighting system, the another auxiliary visible-light source [1335] may be configured for generating additional auxiliary visible-light emissions [1341], [1343] from the another auxiliary plurality of semiconductor light-emitting devices [1337], [1339]; and the another auxiliary visible-light source [1335] may be located along the another auxiliary peripheral edge [1331] for directing the additional auxiliary visible-light emissions [1341], [1343] into the another auxiliary edge-lit lightguide panel [1305].

Additionally in those other examples [1300], the first, second and third light output interfaces [1316], [1334], [1348] may cooperatively define the emission aperture [1364] for forming the combined visible-light emissions [1360], [1362] as being down-light emissions; and the auxiliary light output interface [1315] and the another auxiliary light output interface [1333] may cooperatively define another emission aperture [1345] for forming combined visible up-light emissions [1347], [1349] including the auxiliary visible-light emissions [1323], [1325] and the additional auxiliary visible-light emissions [1341], [1343].

In further examples (not shown), an example [100], [500] or [900] of the lighting system may further include auxiliary edge-lit lightguide panels having structural and performance features being analogous to such features of the auxiliary edge-lit lightguide panel [1303] and the another auxiliary edge-lit lightguide panel [1305].

The examples [100], [500], [900], [1300] may provide lighting systems having low profile structures with reduced glare and offering greater control over propagation directions of visible-light emissions. Accordingly, the examples [100], [500], [900], [1300] of the lighting system may generally be utilized in end-use applications where light is needed having a selectable and controllable distribution, and where a low-profile lighting system structure is needed, and where light is needed as being emitted in partially-controlled directions for reduced glare. The light emissions from these examples of lighting systems [100], [500], [900], [1300] may further, as examples, be utilized in generating specialty lighting effects such as wall graze, table with wall fill, wall wash left, wall wash right, double wall wash, wall wash left plus floor, wall wash right plus floor, room, and batwing. The visible-light emissions from these lighting systems may, for the foregoing reasons, accordingly be perceived as having, as examples: an aesthetically-pleasing appearance without perceived glare; selectable color points; selectable brightness; and selectable light distribution.

While the present invention has been disclosed in a presently defined context, it will be recognized that the present teachings may be adapted to a variety of contexts consistent with this disclosure and the claims that follow. For example, the lighting systems and processes shown in the figures and discussed above can be adapted in the spirit of the many optional parameters described.

I claim:

1. A lighting system, comprising:

an edge-lit lightguide panel being extended along a longitudinal axis of the lighting system, the edge-lit lightguide panel having a pair of mutually-opposing panel surfaces and having a peripheral edge being extended along and spaced transversely away from the longitudinal axis, wherein one of the pair of panel surfaces includes a first light output interface;

a visible-light source including a plurality of semiconductor light-emitting devices, the visible-light source being configured for generating visible-light emissions from the plurality of semiconductor light-emitting devices and being located along the peripheral edge for directing the visible-light emissions into the edge-lit lightguide panel;

another edge-lit lightguide panel being extended along the longitudinal axis, the another edge-lit lightguide panel having another pair of mutually-opposing panel surfaces and having another peripheral edge being extended along and spaced transversely away from the longitudinal axis, wherein one of the another pair of panel surfaces includes a second light output interface;

another visible-light source including another plurality of semiconductor light-emitting devices, the another visible-light source being configured for generating additional visible-light emissions from the another plurality of semiconductor light-emitting devices and being located along the another peripheral edge for directing the additional visible-light emissions into the another edge-lit lightguide panel;

a total internal reflection lens, having a central light-emission axis being transverse to the longitudinal axis, the total internal reflection lens including a third light output interface being located between the first and second light output interfaces, the third light output interface being spaced apart from a central light input interface by a total internal reflection side surface, the total internal reflection side surface being extended along the central light-emission axis, the total internal reflection lens having a further visible-light source including a further plurality of semiconductor light-emitting devices, the further visible-light source being configured for generating further visible-light emissions from the further plurality of semiconductor light-emitting devices and being located at the central light input interface for directing the further visible-light emissions through the total internal reflection lens to the third light output interface;

wherein the first, second and third light output interfaces cooperatively define an emission aperture for forming combined visible-light emissions including the visible-light emissions, the additional visible-light emissions, and the further visible-light emissions; and wherein the emission aperture forms a shielding zone for redirecting some of the combined visible-light emissions.

2. The lighting system of claim 1, wherein the total internal reflection side surface is extended along the central light-emission axis and extended along the longitudinal axis, and wherein the central light input interface is extended along the longitudinal axis, and wherein the further visible-light source is extended along the longitudinal axis.

3. The lighting system of claim 2, wherein the total internal reflection side surface has a frusto-conical cross-sectional profile in a direction being perpendicular to the longitudinal axis.

4. The lighting system of claim 1, wherein the total internal reflection lens is a converging lens being configured for causing convergence of the further visible-light emissions along the central light-emission axis.

5. The lighting system of claim 1, wherein the total internal reflection lens is a converging lens being configured for causing convergence of the further visible-light emissions along the central light-emission axis as having a beam angle being within a range of between about 30 degrees and about 10 degrees.

6. The lighting system of claim 1, including an additional total internal reflection lens having an additional central light-emission axis being transverse to the longitudinal axis, the additional total internal reflection lens including a fourth light output interface being spaced apart along the longitudinal axis away from the third light output interface and being located between the first and second light output interfaces, the fourth light output interface being spaced apart from an additional central light input interface by an additional total internal reflection side surface, the additional total internal reflection side surface being extended along the additional central light-emission axis, the additional total internal reflection lens having an additional visible-light source including an additional plurality of semiconductor light-emitting devices, the additional visible-light source being configured for generating other visible-light emissions from the additional plurality of semiconductor light-emitting devices and being located at the additional central light input interface for directing the other visible-light emissions through the additional total internal reflection lens to the fourth light output interface;

wherein the fourth light output interface, together with the first, second and third light output interfaces, cooperatively define the emission aperture for forming the combined visible-light emissions as further including the other visible-light emissions.

7. The lighting system of claim 1, wherein the edge-lit lightguide panel has a first pair of lateral edges being mutually spaced apart along the longitudinal axis; and wherein the another edge-lit lightguide panel has a second pair of lateral edges being mutually spaced apart along the longitudinal axis; and wherein each one of the lateral edges is curvilinear; and wherein the one of the pair of panel surfaces is concave; and wherein the one of the another pair of panel surfaces is concave.

8. The lighting system of claim 1, wherein the edge-lit lightguide panel has a first pair of lateral edges being mutually spaced apart along the longitudinal axis; and wherein the another edge-lit lightguide panel has a second pair of lateral edges being mutually spaced apart along the longitudinal axis; and wherein each one of the lateral edges is linear.

9. The lighting system of claim 1, wherein the edge-lit lightguide panel is configured for directing the visible-light emissions in first directions towards the longitudinal axis; and wherein the another edge-lit lightguide panel is configured for directing the additional visible-light emissions in second directions, being symmetrically opposed to the first directions, towards the longitudinal axis.

10. The lighting system of claim 9, wherein the edge-lit lightguide panel is configured for further directing the visible-light emissions for emission from the first light output interface; and wherein the another edge-lit lightguide panel is configured for further directing the additional visible-light emissions for emission from the second light output interface; and wherein the total internal reflection lens is configured for directing the further visible-light emissions for emission from the third light output interface.

11. The lighting system of claim 1, wherein the edge-lit lightguide panel and the another edge-lit lightguide panel are integrally formed together with the total internal reflection lens.

12. The lighting system of claim 1, wherein the edge-lit lightguide panel has a central edge being extended along the longitudinal axis and being spaced transversely away from the peripheral edge; and wherein the another edge-lit lightguide panel has another central edge being extended along the longitudinal axis and being spaced transversely away from the another peripheral edge; and wherein the total internal reflection lens is located between the central edge and the another central edge.

13. The lighting system of claim 1, wherein the edge-lit lightguide panel includes internal light-dispersing features; and wherein the another edge-lit lightguide panel includes additional internal light-dispersing features.

14. The lighting system of claim 13, wherein the internal light-dispersing features have a gradually-increasing density in a direction from the peripheral edge towards the longitudinal axis; and wherein the additional internal light-dispersing features have a gradually-increasing density in another direction from the another peripheral edge towards the longitudinal axis.

15. The lighting system of claim 1, wherein the edge-lit lightguide panel includes external light-dispersing features on the one or the another one of the pair of panel surfaces; and wherein the another edge-lit lightguide panel includes additional external light-dispersing features on the one or the another one of the another pair of panel surfaces.

16. The lighting system of claim 15, wherein the external light-dispersing features have a gradually-increasing density in a direction from the peripheral edge towards the longitudinal axis; and wherein the additional external light-dispersing features have a gradually-increasing density in another direction from the another peripheral edge towards the longitudinal axis.

17. The lighting system of claim 1, wherein the another one of the pair of panel surfaces has a light-reflective layer; and wherein the another one of the another pair of panel surfaces has another light-reflective layer.

18. The lighting system of claim 1, wherein the another one of the pair of panel surfaces has a light-reflective layer; and wherein the another one of the another pair of panel surfaces has another light-reflective layer; and wherein each of the light-reflective layers has a minimum visible-light reflection value from any incident angle being at least about 90 percent.

19. The lighting system of claim 1, wherein the plurality of the semiconductor light-emitting devices includes an array of the semiconductor light-emitting devices being mutually spaced apart along the longitudinal axis; and wherein the another plurality of the semiconductor light-emitting devices includes another array of the semiconductor light-emitting devices being mutually spaced apart along the longitudinal axis.

20. The lighting system of claim 19, wherein the further plurality of the semiconductor light-emitting devices includes a further array of the semiconductor light-emitting devices being mutually spaced apart along the longitudinal axis.

21. The lighting system of claim 1, wherein the plurality of the semiconductor light-emitting devices is collectively configured for generating the visible-light emissions as having a selectable perceived color; and wherein the another plurality of the semiconductor light-emitting devices is collectively configured for generating the additional visible-light emissions as having another selectable perceived color.

22. The lighting system of claim 21, wherein the further plurality of the semiconductor light-emitting devices is collectively configured for generating the further visible-light emissions as having a further selectable perceived color.

23. The lighting system of claim 1, wherein the plurality of the semiconductor light-emitting devices includes a plurality of clusters of the semiconductor light-emitting devices being co-located together, each one of the plurality of clusters being collectively configured for generating the visible-light emissions as having a selectable perceived color; and wherein the another plurality of the semiconductor light-emitting devices includes another plurality of clusters of the semiconductor light-emitting devices being co-located together, each one of the another plurality of clusters being collectively configured for generating the additional visible-light emissions as having another selectable perceived color.

24. The lighting system of claim 23, wherein the further plurality of the semiconductor light-emitting devices includes a further plurality of clusters of the semiconductor light-emitting devices being co-located together, each one of the further plurality of clusters being collectively configured for generating the further visible-light emissions as having a further selectable perceived color.

25. The lighting system of claim 1, being configured for causing emission of a portion of the further visible-light emissions as being within a field angle of the total internal reflection lens and for causing emission of another portion of the further visible-light emissions as being outside the field angle of the total internal reflection lens; and wherein the emission aperture is configured for redirecting some of the another portion of the further visible-light emissions.

26. The lighting system of claim 25, wherein the total internal reflection lens has a beam angle being within a range of between about 30 degrees and about 10 degrees.

27. The lighting system of claim 26, wherein the total internal reflection lens has a field angle being within a range of between about 60 degrees and about 20 degrees.

28. The lighting system of claim 25, wherein the emission aperture is positioned for redirecting a part of the another portion of the further visible-light emissions being emitted at the third light output interface in directions deviating from the central light-emission axis by greater than about 60 degrees.

29. The lighting system of claim 25, wherein the emission aperture is positioned for redirecting a part of the another portion of the further visible-light emissions being emitted at the third light output interface in directions deviating from the central light-emission axis by greater than about 70 degrees.

30. The lighting system of claim 1, wherein the total internal reflection lens has a beam angle being within a range of between about 30 degrees and about 20 degrees.

31. The lighting system of claim 30, wherein the total internal reflection lens has a field angle being within a range of between about 60 degrees and about 40 degrees.

32. The lighting system of claim 31, being configured for causing emission of a portion of the further visible-light emissions as being within the field angle of the total internal reflection lens and for causing emission of another portion of the further visible-light emissions as being outside the field angle of the total internal reflection lens; and wherein the emission aperture is configured for redirecting some of the another portion of the further visible-light emissions.

33. The lighting system of claim 31, wherein the emission aperture is positioned for redirecting a part of the another portion of the further visible-light emissions being emitted at the third light output interface in directions deviating from the central light-emission axis by greater than about 60 degrees.

34. The lighting system of claim 31, wherein the emission aperture is positioned for redirecting a part of the another portion of the further visible-light emissions being emitted at the third light output interface in directions deviating from the central light-emission axis by greater than about 70 degrees.

35. The lighting system of claim 1, being configured for causing emission of a portion of the further visible-light emissions as being within a field angle of the total internal reflection lens and for causing emission of another portion of the further visible-light emissions as being outside the field angle of the total internal reflection lens; and wherein the emission aperture is configured for redirecting some of the another portion of the further visible-light emissions.

36. The lighting system of claim 35, wherein the total internal reflection lens has a beam angle being within a range of between about 20 degrees and about 10 degrees.

37. The lighting system of claim 35, wherein the total internal reflection lens has a beam angle being within a range of between about 15 degrees and about 10 degrees.

38. The lighting system of claim 35, wherein the total internal reflection lens has a field angle being within a range of between about 30 degrees and about 20 degrees.

39. The lighting system of claim 38, wherein the third light output interface includes light-dispersing features; and wherein the third light output interface causes the further visible light emissions to have a field angle being within a range of between about 60 degrees and about 40 degrees.

40. The lighting system of claim 39, wherein the emission aperture is positioned for redirecting a part of the another portion of the further visible-light emissions being emitted at the third light output interface in directions deviating from the central light-emission axis by greater than about 60 degrees.

41. The lighting system of claim 39, wherein the emission aperture is positioned for redirecting a part of the another portion of the further visible-light emissions being emitted at the third light output interface in directions deviating from the central light-emission axis by greater than about 70 degrees.

42. The lighting system of claim 1, including a controller for the visible-light source and for the another visible-light source and for the further visible-light source, the controller being configured for causing the visible-light emissions to have a selectable perceived color and for causing the additional visible-light emissions to have another selectable perceived color and for causing the further visible-light emissions to have a further selectable perceived color.

43. The lighting system of claim 42, wherein the controller is configured for causing the visible-light emissions to have a selectable and adjustable intensity and for causing the additional visible-light emissions to have another selectable and adjustable intensity and for causing the further visible-light emissions to have a further selectable and adjustable intensity.

44. The lighting system of claim 42, wherein the controller is configured for causing the combined visible-light emissions to generate a down-lighting pattern being: wall graze, table with wall fill, wall wash left, wall wash right, double wall wash, wall wash left plus floor, wall wash right plus floor, room, or batwing.

45. The lighting system of claim 42, wherein the controller is configured for selection among a plurality of different pre-programmed combinations of the intensities for the visible-light emissions, the additional visible-light emissions, and the further visible-light emissions.

46. The lighting system of claim 45, wherein the controller is configured for adjusting, over a selectable time period, the intensities for the visible-light emissions, the additional visible-light emissions, and the further visible-light emissions from a one of the plurality of pre-programmed combinations to another one of the plurality of pre-programmed combinations.

47. The lighting system of claim 45 further including an ambient light sensor, wherein the controller is configured, in response to the ambient light sensor, for adjusting the intensities for the visible-light emissions, the additional visible-light emissions, and the further visible-light emissions.

48. The lighting system of claim 1, including a controller for the visible-light source being configured for causing the visible-light emissions to have a selectable perceived color; and including another controller for the another visible-light source being configured for causing the additional visible-light emissions to have another selectable perceived color; and including a further controller for the further visible-light source being configured for causing the further visible-light emissions to have a further selectable perceived color.

49. The lighting system of claim 48, wherein the controller is configured for causing the visible-light emissions to have a selectable and adjustable intensity; and wherein the another controller is configured for causing the additional visible-light emissions to have another selectable and adjustable intensity; and wherein the further controller is configured for causing the further visible-light emissions to have a further selectable and adjustable intensity.

50. The lighting system of claim 48, wherein the controller and the another controller and the further controller are collectively configured for causing the combined visible-light emissions to generate a down-lighting pattern being: wall graze, table with wall fill, wall wash left, wall wash right, double wall wash, wall wash left plus floor, wall wash right plus floor, room, or batwing.

51. The lighting system of claim 48, wherein the controller and the another controller and the further controller are collectively configured for selection among a plurality of different pre-programmed combinations of the intensities for the visible-light emissions, the additional visible-light emissions, and the further visible-light emissions.

52. The lighting system of claim 51, wherein the controller and the another controller and the further controller are collectively configured for adjusting, over a selectable time period, the intensities for the visible-light emissions, the additional visible-light emissions, and the further visible-light emissions from a one of the plurality of pre-programmed combinations to another one of the plurality of pre-programmed combinations.

53. The lighting system of claim 51 further including an ambient light sensor, wherein the controller and the another controller and the further controller are collectively configured, in response to the ambient light sensor, for adjusting the intensities for the visible-light emissions, the additional visible-light emissions, and the further visible-light emissions.

54. The lighting system of claim 1, further including:
an auxiliary edge-lit lightguide panel being extended along the longitudinal axis, the auxiliary edge-lit lightguide panel having an auxiliary pair of mutually-opposing panel surfaces and having an auxiliary peripheral edge being extended along and spaced transversely away from the longitudinal axis, a one of the auxiliary pair of panel surfaces forming an auxiliary light output interface;
an auxiliary visible-light source including an auxiliary plurality of semiconductor light-emitting devices, the auxiliary visible-light source being configured for generating auxiliary visible-light emissions from the auxiliary plurality of semiconductor light-emitting devices and being located along the auxiliary peripheral edge for directing the auxiliary visible-light emissions into the auxiliary edge-lit lightguide panel;
another auxiliary edge-lit lightguide panel being extended along the longitudinal axis, the another auxiliary edge-lit lightguide panel having another auxiliary pair of mutually-opposing panel surfaces and having another auxiliary peripheral edge being extended along and spaced transversely away from the longitudinal axis, a one of the another auxiliary pair of panel surfaces including another auxiliary light output interface;
another auxiliary visible-light source including another auxiliary plurality of semiconductor light-emitting devices, the another auxiliary visible-light source being configured for generating additional auxiliary visible-light emissions from the another auxiliary plurality of semiconductor light-emitting devices and being located along the another auxiliary peripheral edge for directing the additional auxiliary visible-light emissions into the another auxiliary edge-lit lightguide panel;
wherein the first, second and third light output interfaces cooperatively define the emission aperture for forming the combined visible-light emissions as being down-light emissions; and
wherein the auxiliary light output interface and the another auxiliary light output interface cooperatively define another emission aperture for forming combined visible up-light emissions including the auxiliary visible-light emissions and the additional auxiliary visible-light emissions.

55. A lighting system, comprising:
an edge-lit lightguide panel being extended along a longitudinal axis of the lighting system, the edge-lit lightguide panel having a pair of mutually-opposing panel surfaces and having a peripheral edge being extended along and spaced transversely away from the longitudinal axis, wherein one of the pair of panel surfaces includes a first light output interface;
a visible-light source including a plurality of semiconductor light-emitting devices, the visible-light source being configured for generating visible-light emissions from the plurality of semiconductor light-emitting devices and being located along the peripheral edge for directing the visible-light emissions into the edge-lit lightguide panel;
another edge-lit lightguide panel being extended along the longitudinal axis, the another edge-lit lightguide panel having another pair of mutually-opposing panel surfaces and having another peripheral edge being extended along and spaced transversely away from the longitudinal axis, wherein one of the another pair of panel surfaces includes a second light output interface;
another visible-light source including another plurality of semiconductor light-emitting devices, the another visible-light source being configured for generating additional visible-light emissions from the another plurality of semiconductor light-emitting devices and being located along the another peripheral edge for directing the additional visible-light emissions into the another edge-lit lightguide panel;
a bowl reflector having a central light-emission axis being transverse to the longitudinal axis, the bowl reflector including a third light output interface being located between the first and second light output interfaces, the third light output interface being spaced apart from a central light input interface by a visible-light-reflective side surface, the visible-light-reflective side surface being extended along the central light-emission axis and defining a portion of a cavity, the bowl reflector having a further visible-light source including a further plurality of semiconductor light-emitting devices, the further visible-light source being configured for generating further visible-light emissions from the further plurality of semiconductor light-emitting devices and being located at the central light input interface for directing the further visible-light emissions through the cavity to the third light output interface;
wherein the first, second and third light output interfaces cooperatively define an emission aperture for forming combined visible-light emissions including the visible-light emissions, the additional visible-light emissions, and the further visible-light emissions; and
wherein the emission aperture forms a shielding zone for redirecting some of the combined visible-light emissions.

56. The lighting system of claim 55, wherein the visible-light-reflective side surface is extended along the central light-emission axis and extended along the longitudinal axis, and wherein the central light input interface is extended along the longitudinal axis, and wherein the further visible-light source is extended along the longitudinal axis.

57. The lighting system of claim 55, including an additional bowl reflector having an additional central light-emission axis being transverse to the longitudinal axis, the additional bowl reflector including a fourth light output interface being spaced apart along the longitudinal axis away from the third light output interface and being located between the first and second light output interfaces, the fourth light output interface being spaced apart from an additional central light input interface by an additional visible-light reflective side surface, the additional visible-light reflective side surface being extended along the additional central light-emission axis and defining a portion of another cavity, the additional bowl reflector having an additional visible-light source including an additional plurality of semiconductor light-emitting devices, the additional visible-light source being configured for generating other visible-light emissions from the additional plurality of semiconductor light-emitting devices and being located at the additional central light input interface for directing the other visible-light emissions through the additional cavity to the fourth light output interface;
wherein the fourth light output interface, together with the first, second and third light output interfaces, cooperatively define the emission aperture for forming the combined visible-light emissions as further including the other visible-light emissions.

58. The lighting system of claim 55, wherein a portion of the visible-light-reflective side surface is a parabolic surface.

59. The lighting system of claim 55, wherein the visible-light-reflective side surface has a minimum visible-light reflection value from any incident angle being at least about 90 percent.

60. The lighting system of claim 55, wherein the visible-light reflective side surface is configured for reflecting the further visible-light emissions toward the horizon of the bowl reflector as having a beam angle being within a range of between about 10 degrees and about 30 degrees.

61. The lighting system of claim 55, wherein the visible-light reflective side surface is configured for reflecting the further visible-light emissions toward the horizon of the bowl reflector as having a field angle being within a range of between about 20 degrees and about 60 degrees.

62. The lighting system of claim 55, wherein the visible-light-reflective side surface has a frusto-conical cross-sectional profile in a direction being perpendicular to the longitudinal axis.

63. The lighting system of claim 55, wherein the bowl reflector is a converging lens being configured for causing convergence of the further visible-light emissions along the central light-emission axis.

64. The lighting system of claim 55, wherein the edge-lit lightguide panel has a first pair of lateral edges being mutually spaced apart along the longitudinal axis; and wherein the another edge-lit lightguide panel has a second pair of lateral edges being mutually spaced apart along the longitudinal axis; and wherein each one of the lateral edges is curvilinear; and wherein the one of the pair of panel surfaces is concave; and wherein the one of the another pair of panel surfaces is concave.

65. The lighting system of claim 55, wherein the edge-lit lightguide panel has a first pair of lateral edges being mutually spaced apart along the longitudinal axis; and wherein the another edge-lit lightguide panel has a second pair of lateral edges being mutually spaced apart along the longitudinal axis; and wherein each one of the lateral edges is linear.

66. The lighting system of claim 55, wherein the edge-lit lightguide panel is configured for directing the visible-light emissions in first directions towards the longitudinal axis; and wherein the another edge-lit lightguide panel is configured for directing the additional visible-light emissions in second directions, being symmetrically opposed to the first directions, towards the longitudinal axis.

67. The lighting system of claim 66, wherein the edge-lit lightguide panel is configured for further directing the visible-light emissions for emission from the first light output interface; and wherein the another edge-lit lightguide panel is configured for further directing the additional visible-light emissions for emission from the second light output interface; and wherein the bowl reflector is configured for directing the further visible-light emissions for emission from the third light output interface.

68. The lighting system of claim 55, wherein the edge-lit lightguide panel and the another edge-lit lightguide panel are integrally formed together with the bowl reflector.

69. The lighting system of claim 55, wherein the edge-lit lightguide panel has a central edge being extended along the longitudinal axis and being spaced transversely away from the peripheral edge; and wherein the another edge-lit lightguide panel has another central edge being extended along the longitudinal axis and being spaced transversely away from the another peripheral edge; and wherein the bowl reflector is located between the central edge and the another central edge.

70. The lighting system of claim 55, wherein the edge-lit lightguide panel includes internal light-dispersing features; and wherein the another edge-lit lightguide panel includes additional internal light-dispersing features.

71. The lighting system of claim 55, wherein the internal light-dispersing features have a gradually-increasing density in a direction from the peripheral edge towards the longitudinal axis; and wherein the additional internal light-dispersing features have a gradually-increasing density in another direction from the another peripheral edge towards the longitudinal axis.

72. The lighting system of claim 55, wherein the edge-lit lightguide panel includes external light-dispersing features on the one or the another one of the pair of panel surfaces; and wherein the another edge-lit lightguide panel includes additional external light-dispersing features on the one or the another one of the another pair of panel surfaces.

73. The lighting system of claim 55, wherein the external light-dispersing features have a gradually-increasing density in a direction from the peripheral edge towards the longitudinal axis; and wherein the additional external light-dispersing features have a gradually-increasing density in another direction from the another peripheral edge towards the longitudinal axis.

74. The lighting system of claim 55, wherein the another one of the pair of panel surfaces has a light-reflective layer; and wherein the another one of the another pair of panel surfaces has another light-reflective layer.

75. The lighting system of claim 55, wherein the another one of the pair of panel surfaces has a light-reflective layer; and wherein the another one of the another pair of panel surfaces has another light-reflective layer; and wherein each of the light-reflective layers has a minimum visible-light reflection value from any incident angle being at least about 90 percent.

76. The lighting system of claim 55, wherein the plurality of the semiconductor light-emitting devices includes an array of the semiconductor light-emitting devices being mutually spaced apart along the longitudinal axis; and wherein the another plurality of the semiconductor light-emitting devices includes another array of the semiconductor light-emitting devices being mutually spaced apart along the longitudinal axis.

77. The lighting system of claim 76, wherein the further plurality of the semiconductor light-emitting devices includes a further array of the semiconductor light-emitting devices being mutually spaced apart along the longitudinal axis.

78. The lighting system of claim 55, wherein the plurality of the semiconductor light-emitting devices is collectively configured for generating the visible-light emissions as having a selectable perceived color; and wherein the another plurality of the semiconductor light-emitting devices is collectively configured for generating the additional visible-light emissions as having another selectable perceived color.

79. The lighting system of claim 78, wherein the further plurality of the semiconductor light-emitting devices is collectively configured for generating the further visible-light emissions as having a further selectable perceived color.

80. The lighting system of claim 55, wherein the plurality of the semiconductor light-emitting devices includes a plurality of clusters of the semiconductor light-emitting devices being co-located together, each one of the plurality of clusters being collectively configured for generating the visible-light emissions as having a selectable perceived color; and wherein the another plurality of the semiconductor light-emitting devices includes another plurality of clusters of the semiconductor light-emitting devices being co-located together, each one of the another plurality of clusters being collectively configured for generating the additional visible-light emissions as having another selectable perceived color.

81. The lighting system of claim 80, wherein the further plurality of the semiconductor light-emitting devices includes a further plurality of clusters of the semiconductor light-emitting devices being co-located together, each one of the further plurality of clusters being collectively configured for generating the further visible-light emissions as having a further selectable perceived color.

82. The lighting system of claim 55, being configured for causing emission of a portion of the further visible-light emissions as being within a field angle of the bowl reflector and for causing emission of another portion of the further visible-light emissions as being outside the field angle of the bowl reflector; and wherein the emission aperture is configured for redirecting some of the another portion of the further visible-light emissions.

83. The lighting system of claim 82, wherein the bowl reflector has a beam angle being within a range of between about 30 degrees and about 10 degrees.

84. The lighting system of claim 83, wherein the bowl reflector has a field angle being within a range of between about 60 degrees and about 20 degrees.

85. The lighting system of claim 83, wherein the emission aperture is positioned for redirecting a part of the another portion of the further visible-light emissions being emitted at the third light output interface in directions deviating from the central light-emission axis by greater than about 60 degrees.

86. The lighting system of claim 83, wherein the emission aperture is positioned for redirecting a part of the another portion of the further visible-light emissions being emitted at the third light output interface in directions deviating from the central light-emission axis by greater than about 70 degrees.

87. The lighting system of claim 55, wherein the bowl reflector has a beam angle being within a range of between about 30 degrees and about 20 degrees.

88. The lighting system of 87, wherein the bowl reflector has a field angle being within a range of between about 60 degrees and about 40 degrees.

89. The lighting system of claim 88, being configured for causing emission of a portion of the further visible-light emissions as being within the field angle of the bowl reflector and for causing emission of another portion of the further visible-light emissions as being outside the field angle of the bowl reflector; and wherein the emission aperture is configured for redirecting some of the another portion of the further visible-light emissions.

90. The lighting system of claim 88, wherein the emission aperture is positioned for redirecting a part of the another portion of the further visible-light emissions being emitted at the third light output interface in directions deviating from the central light-emission axis by greater than about 60 degrees.

91. The lighting system of claim 88, wherein the emission aperture is positioned for redirecting a part of the another portion of the further visible-light emissions being emitted at the third light output interface in directions deviating from the central light-emission axis by greater than about 70 degrees.

92. The lighting system of claim 55, being configured for causing emission of a portion of the further visible-light emissions as being within a field angle of the bowl reflector and for causing emission of another portion of the further visible-light emissions as being outside the field angle of the bowl reflector; and wherein the emission aperture is configured for redirecting some of the another portion of the further visible-light emissions.

93. The lighting system of claim 92, wherein the bowl reflector has a beam angle being within a range of between about 20 degrees and about 10 degrees.

94. The lighting system of claim 92, wherein the bowl reflector has a beam angle being within a range of between about 15 degrees (15°) and about 10 degrees.

95. The lighting system of 94, wherein the bowl reflector has a field angle being within a range of between about 30 degrees and about 20 degrees.

96. The lighting system of claim 95, wherein the third light output interface includes light-dispersing features; and wherein the third light output interface causes the further visible light emissions to have a field angle being within a range of between about 60 degrees and about 40 degrees.

97. The lighting system of claim 96, wherein the emission aperture is positioned for redirecting a part of the another portion of the further visible-light emissions being emitted at the third light output interface in directions deviating from the central light-emission axis by greater than about 60 degrees.

98. The lighting system of claim 96, wherein the emission aperture is positioned for redirecting a part of the another portion of the further visible-light emissions being emitted at the third light output interface in directions deviating from the central light-emission axis by greater than about 70 degrees.

99. The lighting system of claim 55, including a controller for the visible-light source and for the another visible-light source and for the further visible-light source, the controller being configured for causing the visible-light emissions to have a selectable perceived color and for causing the additional visible-light emissions to have another selectable perceived color and for causing the further visible-light emissions to have a further selectable perceived color.

100. The lighting system of claim 99, wherein the controller is configured for causing the visible-light emissions to have a selectable and adjustable intensity and for causing the additional visible-light emissions to have another selectable and adjustable intensity and for causing the further visible-light emissions to have a further selectable and adjustable intensity.

101. The lighting system of claim 99, wherein the controller is configured for causing the combined visible-light emissions to generate a down-lighting pattern being: wall graze, table with wall fill, wall wash left, wall wash right, double wall wash, wall wash left plus floor, wall wash right plus floor, room, or batwing.

102. The lighting system of claim 99, wherein the controller is configured for selection among a plurality of different pre-programmed combinations of the intensities for the visible-light emissions, the additional visible-light emissions, and the further visible-light emissions.

103. The lighting system of claim 99, wherein the controller is configured for adjusting, over a selectable time period, the intensities for the visible-light emissions, the additional visible-light emissions, and the further visible-light emissions from a one of the plurality of pre-programmed combinations to another one of the plurality of pre-programmed combinations.

104. The lighting system of claim 102 further including an ambient light sensor, wherein the controller is configured, in response to the ambient light sensor, for adjusting the intensities for the visible-light emissions, the additional visible-light emissions, and the further visible-light emissions.

105. The lighting system of claim 55, including a controller for the visible-light source being configured for causing the visible-light emissions to have a selectable perceived color; and including another controller for the another visible-light source being configured for causing the additional visible-light emissions to have another selectable perceived color; and including a further controller for the further visible-light source being configured for causing the further visible-light emissions to have a further selectable perceived color.

106. The lighting system of claim 105, wherein the controller is configured for causing the visible-light emissions to have a selectable and adjustable intensity; and wherein the another controller is configured for causing the additional visible-light emissions to have another selectable and adjustable intensity; and wherein the further controller is configured for causing the further visible-light emissions to have a further selectable and adjustable intensity.

107. The lighting system of claim 105, wherein the controller and the another controller and the further controller are collectively configured for causing the combined visible-light emissions to generate a down-lighting pattern being: wall graze, table with wall fill, wall wash left, wall wash right, double wall wash, wall wash left plus floor, wall wash right plus floor, room, or batwing.

108. The lighting system of claim 105, wherein the controller and the another controller and the further controller are collectively configured for selection among a plurality of different pre-programmed combinations of the intensities for the visible-light emissions, the additional visible-light emissions, and the further visible-light emissions.

109. The lighting system of claim 108, wherein the controller and the another controller and the further controller are collectively configured for adjusting, over a selectable time period, the intensities for the visible-light emissions, the additional visible-light emissions, and the further visible-light emissions from a one of the plurality of pre-programmed combinations to another one of the plurality of pre-programmed combinations.

110. The lighting system of claim 108 further including an ambient light sensor, wherein the controller and the another controller and the further controller are collectively configured, in response to the ambient light sensor, for adjusting the intensities for the visible-light emissions, the additional visible-light emissions, and the further visible-light emissions.

111. The lighting system of claim 55, further including:
an auxiliary edge-lit lightguide panel being extended along the longitudinal axis, the auxiliary edge-lit lightguide panel having an auxiliary pair of mutually-opposing panel surfaces and having an auxiliary peripheral edge being extended along and spaced transversely away from the longitudinal axis, a one of the auxiliary pair of panel surfaces forming an auxiliary light output interface;
an auxiliary visible-light source including an auxiliary plurality of semiconductor light-emitting devices, the auxiliary visible-light source being configured for generating auxiliary visible-light emissions from the auxiliary plurality of semiconductor light-emitting devices and being located along the auxiliary peripheral edge for directing the auxiliary visible-light emissions into the auxiliary edge-lit lightguide panel;
another auxiliary edge-lit lightguide panel being extended along the longitudinal axis, the another auxiliary edge-lit lightguide panel having another auxiliary pair of mutually-opposing panel surfaces and having another auxiliary peripheral edge being extended along and spaced transversely away from the longitudinal axis, a one of the another auxiliary pair of panel surfaces including another auxiliary light output interface;
another auxiliary visible-light source including another auxiliary plurality of semiconductor light-emitting devices, the another auxiliary visible-light source being configured for generating additional auxiliary visible-light emissions from the another auxiliary plurality of semiconductor light-emitting devices and being located along the another auxiliary peripheral edge for directing the additional auxiliary visible-light emissions into the another auxiliary edge-lit lightguide panel;
wherein the first, second and third light output interfaces cooperatively define the emission aperture for forming the combined visible-light emissions as being down-light emissions; and
wherein the auxiliary light output interface and the another auxiliary light output interface cooperatively define another emission aperture for forming combined visible up-light emissions including the auxiliary visible-light emissions and the additional auxiliary visible-light emissions.

* * * * *